US012031895B2

(12) United States Patent
Steltenkamp et al.

(10) Patent No.: US 12,031,895 B2
(45) Date of Patent: Jul. 9, 2024

(54) METHOD OF IDENTIFYING BIOLOGIC PARTICLES

(71) Applicant: OP-Hygiene IP GmbH, Niederbipp (CH)

(72) Inventors: Siegfried Steltenkamp, Bonn (DE); Heiner Ophardt, Arisdorf (CH); Albrecht Lang, Niederbipp (CH)

(73) Assignee: OP-Hygiene IP GmbH, Niederbipp (CH)

( * ) Notice: Subject to any disclaimer, the term of this patent is extended or adjusted under 35 U.S.C. 154(b) by 718 days.

(21) Appl. No.: 17/081,585

(22) Filed: Oct. 27, 2020

(65) Prior Publication Data

US 2021/0123851 A1 Apr. 29, 2021

Related U.S. Application Data

(60) Provisional application No. 62/926,704, filed on Oct. 28, 2019.

(51) Int. Cl.
*G01N 15/1031* (2024.01)
*B01L 3/00* (2006.01)
(Continued)

(52) U.S. Cl.
CPC .... *G01N 15/1031* (2013.01); *B01L 3/502715* (2013.01); *B01L 3/502761* (2013.01);
(Continued)

(58) Field of Classification Search
CPC ........... G01N 15/1031; G01N 15/1056; G01N 15/14; G01N 15/1429; G01N 15/1475;
(Continued)

(56) References Cited

U.S. PATENT DOCUMENTS 6,664,104 B2  12/2003  Pourahmadi
7,143,785 B2  12/2006  Maerkl
(Continued)

FOREIGN PATENT DOCUMENTS

CN  109222717  1/2019
EP  0925494  12/2001
(Continued)

OTHER PUBLICATIONS

Comanns, Philipp et al; Directional, passive liquid transport: the Texas horned lizard as a model for a biomimetic "liquid diode"; J.R. Soc. Interface 12: Apr. 15, 2015. (9 pages). http://dx.doi.org/10.1098/rsif.2015.0415.
(Continued)

*Primary Examiner* — Benjamin R Schmitt
(74) *Attorney, Agent, or Firm* — Thorpe North & Western, LLP

(57) ABSTRACT

A method of analysing and identifying particles in an input fluid by electrical field analysis preferably in combination with imaging analysis and towards establishing characterises of the particles that can be compared with characteristics of known particles, preferably biologic particles such as bacteria and viruses. Preferably in a focusing step, the particles are focused as in a microfluidic particle sorting cartridge followed by electrical field analysis to determine impedance data. Preferably, the electrical field analysis is carried out in a water and alcohol solution.

20 Claims, 28 Drawing Sheets

(51) Int. Cl.
  *G01N 15/10* (2006.01)
  *G01N 15/14* (2006.01)
  *G01N 15/1429* (2024.01)
  *G01N 15/1433* (2024.01)
(52) U.S. Cl.
  CPC ......... *G01N 15/1023* (2024.01); *G01N 15/14* (2013.01); *G01N 15/1429* (2013.01); *G01N 15/1433* (2024.01); *B01L 2200/0647* (2013.01); *B01L 2200/0652* (2013.01); *B01L 2300/0645* (2013.01); *B01L 2300/0681* (2013.01); *B01L 2300/087* (2013.01); *G01N 2015/1006* (2013.01); *G01N 2015/1024* (2024.01)
(58) Field of Classification Search
  CPC .... G01N 2015/1006; G01N 2015/1062; B01L 3/502715; B01L 3/502761; B01L 2200/0647; B01L 2200/0652; B01L 2300/0645; B01L 2300/0681; B01L 2300/087
  See application file for complete search history.

(56) References Cited

U.S. PATENT DOCUMENTS

| | | | |
|---|---|---|---|
| 8,852,925 B2 | 10/2014 | Halberstadt | |
| 9,134,221 B2 | 9/2015 | Lo et al. | |
| 9,149,806 B2 | 10/2015 | Collins | |
| 9,437,103 B2 | 9/2016 | Ophardt | |
| 9,821,310 B2 | 11/2017 | Guidiken | |
| 2003/0139886 A1* | 7/2003 | Bodzin | G01N 21/47 702/28 |
| 2012/0232225 A1* | 9/2012 | Baker, Jr. | C08G 83/004 525/418 |
| 2015/0268244 A1* | 9/2015 | Cho | G01N 15/1459 435/7.23 |
| 2016/0167043 A1 | 6/2016 | Comanns | |
| 2016/0316975 A1 | 11/2016 | Ophardt | |
| 2018/0284061 A1 | 10/2018 | Gulak et al. | |
| 2018/0318837 A1 | 11/2018 | Sulchek et al. | |
| 2019/0232290 A1 | 8/2019 | Kashanin | |

FOREIGN PATENT DOCUMENTS

| | | |
|---|---|---|
| WO | 95/33848 | 12/1995 |
| WO | 0010584 | 3/2000 |
| WO | 2014062719 | 4/2014 |
| WO | 2016005173 | 1/2016 |
| WO | 2020243581 | 12/2020 |

OTHER PUBLICATIONS

Comanns, Philipp et al; Moisture harvesting and water transport through specialized micro-structures on the integument of lizards. Beilstein Journal of Nanotechnology. 2011, 2, 204-214. doi:10.3762/bjnano.2.24.

Lee, Anna et al; Water harvest via dewing; Langmuir 2012, 28, pp. 10183-10191; ACS Publications.

WIKIPEDIA—Phase-contrast microscopy; 5 pgs; Jul. 2019. https://en.wikipedia.org/wiki/Phase-contrast_microscopy.

Noble, Rachel T. and Weisberg, Stephen B.; A review of technologies for rapid detection of bacteria in recreational waters. Journal of Water and Health, 03.4, 2005. pp. 381-392; IWA Publishing 2005.

Catarino, Susana O et al; Blood Cells Separation and Sorting Techniques of Passive Microfluidic Devices: From Fabrication to Applications: 20 pgs. Micromachines 2019, 10, 593; doi:10.3390/mi10090593.

Cruz, F.J. and Hjort, K.; High pressure Inertial focusing for separation and concentration of bacteria at high throughput. 28th Micromechanics and Microsystems Europe Workshop; IOP Conf. Series: Journal of Physics: Conf. Series 922 (2017) 012001; doi:10.1088/1742-6596/922/1/012001.

Amini, Hamed et al; Inertial microfluidic physics; Lab on a Chip, 2014, 14, 2739-2761; The Royal Society of Chemistry 2014.

Cruz, Javier et al; Inertial focusing with sub-micron resolution for separation of bacteria; Lab on a Chip, 2019, 19, 1257-1266; The Royal Society of Chemistry 2019.

Di Carlo, Dino; Inertial microfluidics; Lab on a Chip, 2009, 9, 3038-3046; The Royal Society of Chemistry 2009.

Di Carlo, Dino et al; Continuous inertial focusing, ordering, and separation of particles in microchannels; PNAS; vol. 104, No. 48; Nov. 27, 2007; pp. 18892-18897.

Hussain, Rubaiya et al; An ultra-compact particle size analyser using a CMOS image sensor and machine learning; Light: Science & Applications (2020) 9:21; Official Journal of the CIOMP 2047-7538; 11 pgs https://doi.org/10.1038/s41377-020-0255-6.

Brosel-Oliu, Sergi et al; Impedimetric Sensors for Bacteria Detention; Web of Science; Chapter 9; pp. 257-288; http://dx.doi.org/10.5772/60741.

Sultan KS, Ali TA, Fahmy NA, El-Shibiny A; Using millimeter-waves for rapid detection of pathogenic bacteria in food base on bacteriophage. Engineering Reports. 2019;e12026. 15 Pages; https://doi.org/10.1002/eng2.12026.

Alazzam, Anas et al; Dielectrophoresis Multipath Focusing of Microparticles through Perforated Electrodes in Microfluidic Channels; Biosensors 2019, 9, 99; doi: 10.3390/bios9030099; 14 Pages.

Raoufi, Mohammad Amin et al; Experimental and Numerical Study of Elasto-Inertial Focusing in Straight Channels; Biomicrofluidics 13, 034103 (2019); 13 Pages; https://doi.org/10.1063/1.5093345.

Song, Youyi et al; Segmentation, Splitting, and Classification of Overlapping Bacteria in Microscope Images for Automatic Bacterial Vaginosis Diagnosis; IEEE Journal of Biomedical and Health Informatics; vol. 21, No. 4, Jul. 2017; pp. 1095-1104.

Constantinou, Iordania et al; Self-Learning Microfluidic Platform for Single-Cell Imaging and Classification in Flow; 21 Pages; Micromachines 2019, 10, 311; doi:10.3390/mi10050311.

Ahmed, Tasnim et al; Combining Deep Convolutional Neural Network With Support Vector Machine to Classify Microscopic Bacteria Images; 5 Pages; 2019 International Conference on Electrical, Computer and Communication Engineering (ECCE), Feb. 7-9, 2019.

Lab Chip, 2019, 19, 1257-1266, 2019; DOI: 10.1039/c91c00080a; rsc.li/loc: Inertial focusing with sub-micron resolution for separation of bacteria; Cruz, Javier et al.

Yeh, P.Y. et al; An Efficient Spiral Microchannel for Continuous Small Particle Separations; Sensors and Actuators B: Chemical. https://doi.org/10/1016/j.snb.2017.06.037.

Jimenez, Melanie et al; Efficient Separation of Small Microparticles at High Flowrates Using Spiral Channels: Application to Waterborne Pathogens; Chemical Engineering Science 157 (2017) 257-254.

Ahmed, Asif et al; Biosensors for Whole-Cell Bacterial Detection; Clinical Microbiology Reviews; vol. 27, No. 3; Jul. 2014; pp. 631-646.

Cruz, Javier et al; (2017); High Pressure Inertial Focusing for Separating and Concentrating Bacteria at High Throughput. Journal of Micromechanics and Microengineering, 27(8): 084001. https://doi.org/10.1088/1361-6439/aa6b14.

Santos, Denis R. et al; "Label-Free Detection of Biomolecules in Microfluidic Systems Using On-Chip UV and Impedimetric Sensors"; IEEE Sensors Journal; vol. 19, No. 18; Sep. 15, 2019; pp. 7803-7812; XP011740179; New York, NY, USA.

Lu, Zhao; Towards Single Bacterium Detection: A Microelectronic/Microfluidic Hybrid System Based on a CMOS Technology; Jan. 1, 2012; XP055457834;URL:https://publications.polymt1.ca/836/1/2012_ZhaoLu.pdf; University of Montreal.

Konermann, Camilla et al; "[mu]fluidic Sensor for Optical Monitoring of Bacteria Growth with Improved Limit of Detection"; IEEE Sensors; IEEE; Oct. 28, 2018, pp. 1-4; XP033477332; University of Bremen, Germany.

* cited by examiner

Table 1

| Name of Parameter | | Formula | Signification |
|---|---|---|---|
| Area | | Number Of Pixels In The Zone Of The Bacterium | Global Size And Shape of Clusters |
| Perimeter | | Number Of Pixels Around The Bacteria | Global Size And Shape of Clusters |
| Circularity | | $4\pi \times [Area]/[Perimeter]^2$ | 1 = Perfect Circle<br>Near 0 = Very Long Shape |
| Aspect Ration (AR) | | [Major Axis]/[Minor Axis] | +inf = Very Long Shape<br>Near 1 = Perfect Circle |
| Solidity | | [Area]/[Convex Area] | 1 = Perfect Convex<br>Near 0 = Not Convex At All |
| (Maximum) Feret's Diameter | | Maximal Distance | Size |
| Integrated Density | | Area*Mean Gray Value | Intensity Of Bacteria On Images |

FIG. 9

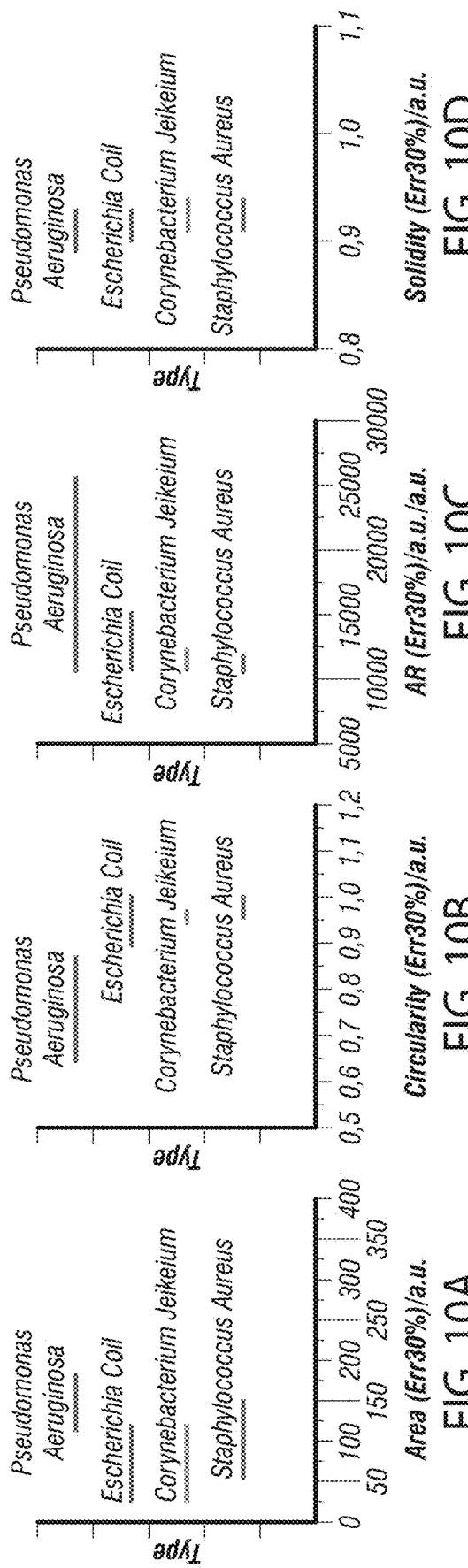
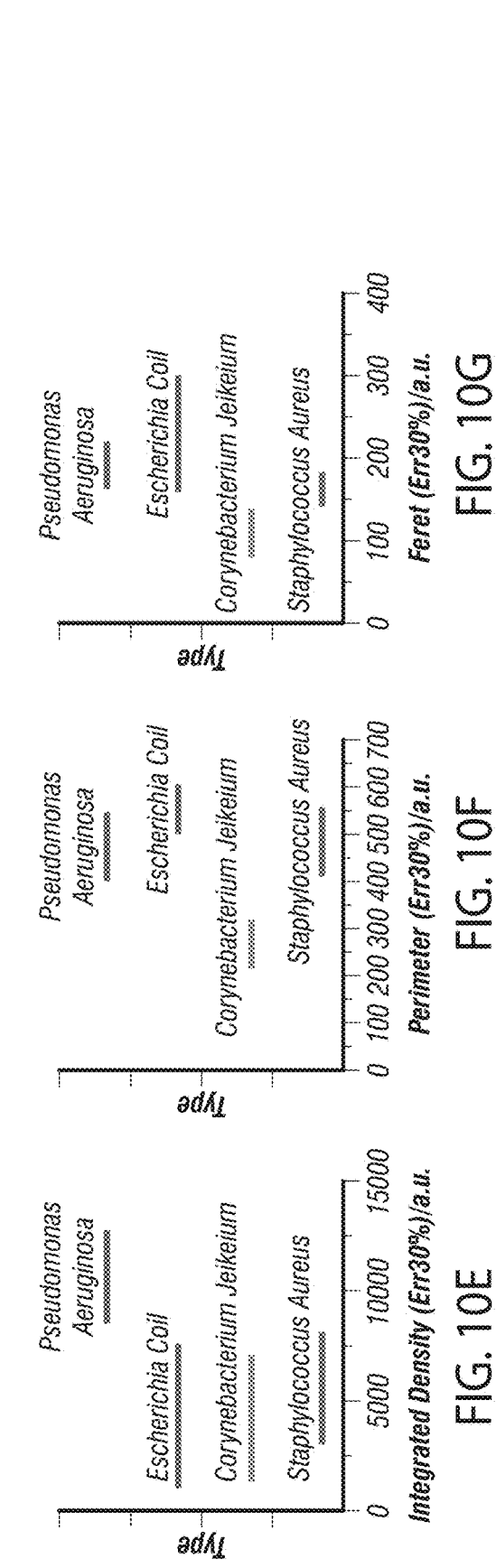

|  | CJ | EC | PA | SA | SE | SP |
|---|---|---|---|---|---|---|
| CJ | 51% | 9% | 22% | 14% | 4% | 1% |
| EC | 4% | 72% | 16% | 7% | 1% | <1% |
| PA | 5% | 4% | 90% | 1% | <1% | <1% |
| SA | 13% | 13% | 5% | 59% | 7% | 3% |
| SE | 2% | 5% | 2% | 4% | 83% | 4% |
| SP | 6% | 9% | 9% | 4% | 28% | 45% |

True Class (y-axis) / Predicted Class (x-axis)

FIG. 12

METHOD OF IDENTIFYING BIOLOGIC PARTICLES

SCOPE OF THE INVENTION

This invention relates to the use of impedance data for distinguishing a particle in a fluid from other particles and, more particularly, to the use of data derived data of Impedance/Frequency Data for a particle in a fluid preferably first derivation data and second derivation data of the Impedance/Frequency Data for a particle in a fluid towards distinguishing a particle from other particles, preferably in association with concentration data regarding the concentration of the particles in the fluid.

This invention also relates to a method of identifying particles in an input stream, preferably by both electrical field analysis and electromagnetic radiation imaging analysis and towards establishing characterises of the particles that can be compared with characteristics of known particles, preferably biologic particles such as bacteria.

This invention also relates to a method of identifying particles in an input stream, preferably by focusing the particles in a microfluidic particle sorting cartridge followed by electrical field analysis to determine impedance data.

This invention also relates to a method of identifying particles in an input stream, preferably by focusing the particles in a microfluidic particle sorting cartridge followed by electromagnetic radiation imaging analysis and electrical field analysis towards establishing characterises of the particles that can be compared with characteristics of known particles, preferably biologic particles such as bacteria.

This invention also relates to a microfluidic particle sorting cartridge including a microfluidic sorting channel compatible with of an electromagnetic imaging apparatus and an electrical field measurement apparatus.

This invention also relates to a method of electrical field analysis of determining with an electrical field measurement apparatus electrical field characteristics of particles in an alcohol water solution input fluid.

BACKGROUND OF THE INVENTION

The growth and presence of contaminants has become increasingly problematic. For example, the growth and presence of pathogens such as bacteria and viruses in facilities notably hospitals has become a significant problem. Present methods of detection of such contaminants have disadvantages that they are not adequate and notably do not provide timely warnings of dangerous levels of contaminants. Present detection systems typically have the disadvantageous that warnings of dangerous contaminant situations arise only after patients have been negatively affected and exhibit symptoms of the pathogens. The presence of biologic particles including particularly biological pathogens is an increasing concern given the increase in antibiotic resistant pathogens which increases the risks for epidemics and general transmission of infections. Infections from biological pathogens cause many deaths and enormous costs to heath care systems.

Prior art methods of distinguishing or identifying biological particles such as bacteria and viruses have the disadvantage that they are not label free or low cost and do not provide for prompt identification. Previously known systems do not, for example, provide for identification of bacteria in short periods of time such as within a manner of minutes.

Prior art methods of identifying bacteria are not amendable to be incorporated onto a microfluidic sensor unit which can be produced at relatively low cost and which may be disposable and reusable as by cleaning.

The applicant's U.S. Pat. No. 9,437,103 to Ophardt, issued Sep. 6, 2016 teaches a hand cleaning fluid dispenser including a contaminant sensor and method of use of such a fluid dispenser to monitor contaminants alone or preferably in an array of similar dispensers within a facility. The disclosure of U.S. Pat. No. 9,437,103 is incorporated herein by reference.

Electrical impedance is the measure of the opposition that a circuit presents to a current when a voltage is applied. The term complex impedance may be used interchangeably with impedance.

Quantitatively, the impedance of a two-terminal circuit element is the ratio of the complex representation of a sinusoidal voltage between its terminals to the complex representation of the current flowing through it. In general, it depends upon the frequency of the sinusoidal voltage.

Impedance extends the concept of resistance to AC circuits, and possesses both magnitude and phase, unlike resistance, which has only magnitude. When a circuit is driven with direct current (DC), there is no distinction between impedance and resistance; the latter can be thought of as impedance with zero phase angle.

Impedance is a complex number, with the same units as resistance, for which the SI unit is the ohm ($\Omega$). Its symbol is usually Z, and it may be represented by writing its magnitude and phase in the form $|Z|\angle\theta$. However, Cartesian complex number representation is often more powerful for circuit analysis purposes.

SUMMARY OF THE INVENTION

To at least partially overcome some of these disadvantages, the present invention uses impedance data for distinguishing a particle in a fluid from other particles and, more particularly, to the use of data derived from Impedance/Frequency Data, preferably the first and/or the second derivation of Impedance/Frequency Data for a particle in a fluid towards distinguishing the particle from other particles, preferably in association with concentration data regarding the concentration of the particles in the fluid.

To at least partially overcome some of these disadvantages of previously known methods, the present invention provides a method of identifying particles, preferably biologic particles, including an electrical field analysis step and an imaging analysis step. The method in accordance with the present invention is preferably includes a focusing step as preferably adapted to be carried out with focusing in a microfluidic cartridge including using a microfluidic particle sorting channel to focus particles in the input fluid.

To at least partially overcome other disadvantages of previously known methods and devices, the present invention also provides a microfluidic cartridge incorporating a microfluidic particle sorting channel. The microfluidic cartridge is compatible with an electromagnetic imaging apparatus and an electrical field measurement apparatus, preferably with at least some components of these apparatuses provided on the microfluidic cartridge and/or on a microfluidic sensor unit including the cartridge and these apparatus.

Objects of the present invention include providing improved methods of identifying particles and, more preferably, improved methods of identifying biological particles in an input fluid adapted for preferred incorporation into a microfluidic cartridge preferably incorporating a microfluidic sorting channel and compatible with an electromagnetic imaging apparatus and an electrical field measurement apparatus.

Method

The present invention in one aspect identifies derivations of Impedance/Frequency Data for a particle in a fluid, preferably the first derivation and/or the second derivation of magnitude of Impedance/Frequency Data for a particle in a fluid as data useful for distinguishing the particle from other particles, preferably in association with concentration data regarding the concentration of the particle in the fluid.

In another aspect, the present invention provides a method of identifying particles, preferably biologic particles, in an input fluid. The method includes various analysis steps of analysing the particles in the input stream. Preferably, the method includes an electrical field analysis step of determining with an electrical field measurement apparatus electrical field characteristics of the particles in the focused fluid stream. Preferably, the method includes an imaging analysis step of determining with a first electromagnetic imaging apparatus image characteristics of the particles in the focused fluid stream. The method may include a focusing step in which the input fluid is sorted into a focused fluid stream including particles from the input stream in a desired range of particles and/or a desired range of particle shapes, or a desired range of other features of the particles and combinations. The method may include other analysis steps.

The method includes identification methods. The identification methods in one embodiment include using an image identification method comprising imaging analysis of the image characteristics to estimate a primary estimated identity of the particles in the focused fluid stream preferably as a primary probability profile of one or more known biologic particles. The method includes estimating an estimated concentration of particles in the focused fluid stream when the electrical field characteristics are being determined. The method includes using an electrical field identification method to estimate a second estimated identity of the particles in the focused fluid stream based on the determined electrical field characteristics and the estimated concentration and preferably providing the second estimated identity as a secondary probability profile of one or more known biologic profiles. The method also preferably includes using the primary estimated identity and the second estimated identity to estimate a final estimated identity of the particles in the focused fluid stream preferably as a final probability profile of one or more known biologic particles.

Input Fluid

The input fluid may comprise any input fluid that may carry particles, preferably biologic particles, whose identity is desired to be identified.

In a preferred embodiment, the input fluid may comprise a fluid that has dripped off a person's hands while the person is in the process of cleaning the hands using a precursor fluid. The precursor fluid such as a hand cleaning or disinfecting fluid may be dispensed onto a person's hand to engage the person's hand with the precursor fluid for the purposes of cleaning and/or disinfecting the user's hands. In the course of the person washing their hands, particles, notably biologic particles, that come to be within the precursor fluid and in the precursor fluid drip from the user's hands to form the input fluid which may contain biologic particles from the user's hands. Such fluid which drips from a person's hands is often herein referred to as "overspray". The overspray is gathered as the input fluid and to which the method of identifying particles, preferably biologic particles, in the input fluid is applied.

The input fluid may, however, be provided from many different sources. For example, particles, preferably biologic particles, could be gathered by almost any method and then placed into a precursor fluid to form the input fluid. As well, the input fluid could be fluid from any source such as drinking water, ponds, streams, body fluids and the like which might be suspected to contain particles, preferably biologic particles, that may be desired to be analyzed by the method for the purpose of identifying whether there are any particles in the input fluid or identifying particles, preferably biologic particles, that might be in the input fluid.

The particular nature of the precursor fluid that is to form the input fluid is not limited, however, the input fluid would need to be able to be processed or conditioned such that it may be used in accordance with the method including particularly the focusing step and also the analysis steps.

In accordance with the present invention, the input fluid preferably comprises an aqueous solution of water and alcohol. Such an aqueous solution of water and alcohol is a non-polar solution that has low conductivity and high resistance. In accordance with the present invention, the precursor fluid may be a hand cleaning or disinfecting fluid and the method may include dispensing the precursor fluid from a hand cleaning dispenser in a manner such as, for example, disclosed in above-mentioned U.S. Pat. No. 9,437,103.

The use of an aqueous solution of water and alcohol as the input fluid is not necessary but is believed to be preferred. The input fluid may be any suitable fluid. For example, rather than an aqueous solution of alcohol and water, the input fluid could comprise buffered fluids that are highly conductive and have low resistance to electrical flow through them and such fluids within which impedance detection is typically carried out.

One advantage in the use of an alcohol and water fluid is that insofar as an aqueous solution of water and alcohol is chosen, the overspray from a hand cleaning fluid dispenser that uses water and alcohol can readily be used as the input fluid that may contain biologic particles. Another advantage is that aqueous solutions of water and alcohol can be selected to have a disinfecting effect and effectively kill biologic particles, such as many known bacteria on contact, assisting in avoiding the spreading of pathogens during the process of carrying out the method in accordance with the present invention. A further advantage is that evaporation of alcohol can lead to a concentration of the particles in the input fluid. A further advantage is that the aqueous solution of water and alcohol without particles can be used as a cleaning fluid to be passed through a microfluidic cartridge towards cleaning the cartridge. The hand cleaning fluid dispenser may dispense the hand cleaning or disinfecting fluid, for example, merely as a liquid onto a user's hands or as a foam of a gas and a liquid.

In a preferred embodiment of the method of the present application, the input fluid comprises an alcohol water solution. Preferably, the alcohol water solution includes an alcohol selected from isopropanol, ethanol and mixtures of isopropanol and ethanol. The alcohol water solution may have varying ranges of the alcohol in the water. The alcohol water solution may comprise in the range of 25% to 80% alcohol by volume or at least 40% alcohol, or at least 60% alcohol and, preferably, at least 40% by volume water or at least 50% by volume water. Preferably, the alcohol water solutions may comprise at least 40% by volume isopropanol.

The alcohol water solution may consist of water and alcohol preferably with at least 40% by volume isopropanol.

Particles

The method of the present invention is applicable for identifying particles. Preferably, in accordance with the present invention, the particles comprise biologic particles. However, this is not necessary and in accordance with the invention the particles may comprise both organic including biologic particles and non-organic particles and non-biologic particles such as known plastic particles and beads, and particles formed from metal, ceramics, and concrete.

The known particles are preferably selected from known particles that are desired to be identified and/or may be expected to arise in a particular environment. The known biologic particles preferably comprise biological pathogens or particles derived from biologic pathogens. The biologic particles may be selected from the group of biologic particles including bacteria and viruses, however, are not limited to bacteria and viruses and the method can be considered as possibly applicable to particles which are: cysts such as Giardia; fungi such as *Candida* and mycobacteria such as Tuberculosis.

As a preferred example in the environment of human hands, the method includes an assessment of biologic particles that are often found on human hands and the known particles may be selected to be a particular group of, for example, bacteria frequently found on human hands. The applicants have performed an assessment of bacteria frequently found on human hands and have determined that each of the following bacteria most frequently found on human hands in Germany: *Pseudomonas aeruginosa* (PA), *Streptococcus pneumoniae* (SP), *Staphylococcus aureus* (SA), *Escherichia coli* (*E. coli* or EC), and *Staphylococcus epidermidis* (SE). The known particles may also be selected to be a particular group of, for example, bacteria that may be found on human hands and are particularly problematic or for which their presence may be expected such as, for example: *Clostridium: difficile*(c-diff), Methicillin-resistant *Staphylococcus aureus* (MRSA). *Streptococcus pneumoniae* (SP) and *E. coli*. The limiting of the known particles against which particles are to be compared in accordance with the present invention can assist in reducing the extent that the data of known particles needs to include numerous particles and possibly reducing the computing capability and processing time for the method. As is apparent to a person skilled in the art, the particular nature of the particles and, more preferably, the biologic particles for which the method of the present invention is used will be, in part, subject to the practical limits on the sizes and shapes of the particles that can be focused in the focusing step and imaged in the imaging analysis step.

As to particular bacteria that can comprise the known biologic particles, these can include, for example, without limitation: *Clostridium: difficile*(c-diff), *Pseudomonas aeruginosa* (PA), *Streptococcus pneumoniae* (SP). *Staphylococcus aureus* (SA), Methicillin-resistant *Staphylococcus aureus* (MRSA), *Escherichia coli* (*E. coli*), and *Staphylococcus epidermidis* (SE) without limitation. The bacteria may comprise gram-negative bacteria such as SA and MRSA and gram-positive bacteria such as *E. coli*.

Sorting

The method may optionally utilize a focusing step in which the input fluid is sorted into a focused fluid stream preferably including particles from the input stream in a desired range of particle sizes and/or a desired range of particle shapes, and combinations of particle sizes and particle shapes. The sorting may be carried out by any methods. Preferably, the focusing step includes passing the input fluid through a microfluidic cartridge having a microfluidic particle sorting channel to provide the focused fluid stream in an analysis channel. Preferably, the microfluidic particle sorting channel includes a sorting channel portion that is a curve or a spiral. The focusing step preferably includes manipulating the focused fluid stream to provide individual particles from the input fluid to flow through the analysis channel sequentially as individual separate particles sequentially separated from other particles in the focus fluid stream. The focusing step preferably involves passing the input fluid through a plurality of microfluidic sorting channels to provide a plurality of streams of particles, each with a different desired range of particle sizes and/or particle shapes.

In one embodiment, the focusing step can include a focusing sub-step (a) of passing the input fluid through an upstream microfluidic particle sorting channel to provide fluid flow through the upstream microfluidic channel that produces at different locations in the upstream microfluidic channel relative a cross-sectional normal the upstream microfluidic channel a plurality of streams of the input fluid containing particles with each stream having at least one of a different concentration of particles, a different range of particle sizes and a different particle shape than that of other of the streams, directing each stream into a corresponding one of a plurality of downstream microfluidic channels to separate the streams from each other and, subsequently, selecting one or more of the streams to be a focused fluid stream that becomes in whole or in part subjected to analysis steps.

Preferably, the focusing step further includes a focusing sub-step (b) of repeating the above focusing sub-step (a) with any downstream microfluidic channel to be considered an upstream microfluidic channel and thus producing additional separated streams in successive downstream microfluidic channels, one or more which can be selected to be a focused fluid stream to be subjected to an analysis step. Insofar as the focusing step generates a plurality of streams of the input fluid, then only selected of the streams of the particles are subjected to the analysis step such as, for example, with only selected streams submitted to the imaging analysis step and/or the electrical field analysis step. Preferably, the streams of particles that are not selected are discarded. The focusing step thus provides in a preferred embodiment, one or more streams of particles that have different ranges of particle sizes. The microfluidic sorting channel can be configured as is known to persons skilled in the art to provide different streams which have different ranges of particle sizes. The range of particle sizes is to be selected having regard to the nature of the particles that are desired to be analyzed and, as well, having regard to the nature of the analysis steps to which each stream of particles is to be subjected.

Preferably, the focusing step sorts particles to have a desired range of particle sizes selected from the group consisting of:
greater than 0.1 um;
greater than 0.5 um;
less than 10 um;
less than 5 um;
less than 3 um;
in the range of 0.1 um to 10 um;

in the range of 0.5 um to 10 um;
in the range of 0.1 um to 0.5 um;
in the range of 0.1 um to 0.7 um;
in the range of 0.5 um to 0.7 um;
in the range of 0.7 um to 0.1 um;
in the range of 0.7 um to 1 um;
in the range of 1 um to 2 um;
in the range of 1 um to 3 um;
in the range of 1 um to 5 um;
in the range of 2 um to 3 um;
in the range of 2 um to 5 um;
in the range of 3 um to 5 um;
in the range of 3 um to 10 um and
in the range of 5 um to 10 um.

Preferably, the focusing step limits the focused fluid stream by sorting the particles from the input stream such that the desired range of biologic particles in the stream is in the range of 0.1 um to 10 um, particularly when viruses and bacteria are the biologic particles.

Preferred methods of the present invention for the focusing step provides at least two streams of biologic particles with the desired range of particle sizes for a first of the selected streams being greater than 0.1 um and less than a selected value between 1 and 10 um and the desired range of particle sizes for a second of the selected streams being greater than the selected value and less than 10 um. When the biologic particles are bacteria, the range of particles are preferably in the range of 0.5 um to 10 um, more preferably, 0.5 um to 5 um. When the biologic particles are viruses, the range of particle sizes is preferably in the range of 0.1 um to 5 um or 0.1 um to 3 um and, more preferably, 0.5 um to 1 um.

Microfluidic particle sorting is a technology which is known to persons skilled in the art and microfluidic cartridges with microfluidic particle sorting channels are known and commercially available to provide for focused fluid streams in an analysis channel sorted by particle size and/or particle shapes. Microfluidic sorting has the advantage of requiring small sample volumes. Microfluidic cartridges having sorting channels are small in size and can be manufactured economically.

Microfluidic particle sorting can be carried out using either passive or active sorting techniques. In accordance with the present invention, preferred sorting techniques are passive sorting techniques which do not require the application of external fields for sorting and is based on the interaction between particles, fluid flow and the channel structure. However, in accordance with the present invention, an active sorting technique that uses, for example, external fields such as acoustical, magnetic or electrical fields could be utilized. Preferred microfluidic particle sorting in accordance with the present invention uses passive sorting techniques based on hydrodynamics of the microfluidic cartridge, the design of which is known to persons skilled in the art.

Preferably, the focusing step utilizes inertial focusing whereby particles in a flow are separated by size in a microfluidic channel. As is known, the particles migrate in the flow across stream lines and focus at well-defined, size dependent equilibrium points of the cross-sectioned flow. Preferably, inertial focusing provides velocity gradients in the fluid to influence particles while laminar flow is maintained. Preferred microfluidic channels for inertial focusing have a curved or spiral shape as is known and is disclosed, for example, in Cruz #1; properly cited as Lab Chip, 019, 19, 1257-1266, 2019 DOI: 10.1039/c9lc00080a rsc.li/loc: Inertial focusing with sub-micron resolution for separation of bacteria† Javier Cruz, Tiscar Graells, Mats Walldén and Klas Hjort, Cruz #2, properly cited as: Cruz, J., Zadeh, S H., Graells. T., Andersson, M., Malmström, J. et al. (2017). High pressure inertial focusing for separating and concentrating bacteria at high throughput. Journal of Micromechanics and Microengineering, 27(8): 084001, https://doi.org/10.1088/1361-6439/aa6b14, and Johnson, properly cited as Microfluidics and Nanofluidics, September 2014, Volume 17, Issue 3, pp 509-518|Dean flow focusing and separation of small microspheres within a narrow size range, D. Johnston et al; the disclosures of which are incorporated herein by reference. Inertia focusing of particles in curved microfluidic channels is also taught by Yehn, properly cited as: Yeh et al, An efficient spiral microchannel for continuous small particle separations Sensors and Actuators B: Chemical, Volume 252, November 2017, Pages 606-615, https://doi.org/10/1016/j.snb.2017.06.037, the disclosures of which are incorporated herein by reference. Yeh et al teaches providing a passive sorting technique and shows an example of a spiral micro channel as enhanced by deflection in a straight micro channel. Microfluidic sorting devices are also taught in U.S. Pat. No. 9,134,221 to Lo et al, issued Sep. 15, 2015 and U.S. Pat. No. 9,149,806 to Collins, issued Oct. 6, 2019. It is within the skill of persons skilled in the art to develop a suitable microfluidic sorting channel that will manipulate the fluid stream to provide individual of the particles from the input fluid to flow through an analysis channel sequentially as individual separate particles sequentially separated from other particles in the focus fluid stream. The focusing step may be carried out using a Dean-Flow Vortexsorter.

The method of the present invention may include a splitting step of dividing the focused fluid stream to flow as a first portion through a first divider channel in a microfluidic cartridge and a second portion through a second divider channel in the microfluidic cartridge, preferably, with the first portion and the second portion having substantially the same composition.

Microfluidic Preparation

Microfluidic processing of a fluid containing particles can be subjected to a variety of techniques towards preparing the fluid containing particles for sorting or in conducting microfluidic sorting. Such techniques include conditioning techniques, scrubbing techniques and elongation techniques. Conditioning can involve, for example, the addition of components, markers, particles, and the adjustment of the fluid, its pH, viscosity and optical properties and temperature as by heating and cooling. Scrubbing can involve, for example, separations by adding, for example, spacer fluids. Elongation can involve, for example, techniques for separation from other samples.

Imaging

The method of this invention preferably includes as one of the analysis steps an imaging analysis step of determining with a first electromagnetic imaging apparatus image characteristics of the particles. The imaging analysis step may optionally be carried out with the particle in a fluid, optionally with the particle in one or more focused fluid streams although this is not necessary. As a simple example, the first electromagnetic imaging apparatus preferably comprises an emitter of emitted electromagnetic radiation and a sensor of electromagnetic radiation. Preferably, the method includes directing the emitted electromagnetic radiation onto the particles and sensing with the sensor electromagnetic radiation, preferably, emitted electromagnetic radiation that is scattered, reflected, emitted and/or transmitted from, through or about a particle in the fluid, as for example a particle in a focused fluid stream.

Preferably, the first electromagnetic imaging apparatus may comprise a device such as an optical microscope and the method includes providing for electromagnetic detection based on optical or phased contrast microscopy.

The imaging analysis step may optionally include flowing a focused fluid stream containing the particle through the first electromagnetic imaging apparatus. The first electromagnetic imaging apparatus preferably can determine the image characteristics of individual particles in the focused fluid stream and preferably while the particles are within a microfluidic cartridge preferably within a microfluidic analysis channel. However, the imaging analysis step may be carried out on a particle of the particles in the focused fluid stream while the fluid of the focused fluid stream is moving at a reduced velocity or not moving.

The image characteristics that are determined by the first electromagnetic imaging apparatus are not limited. The image characteristics can comprise but simple images of a particle. Preferably, however, the image characteristics represent data based on imaging of a particle, with such data represented by various different measured characteristics preferably selected from one or more of the characteristics of: area perimeter, circularity, aspect ratio, roundness, maximum diameter, solidity and integrated density of the particles, as defined in Table 1 reproduced below, and with each characteristic schematically illustrated in FIG. 9.

TABLE 1

| Name of Parameter | Formula | Signification |
| --- | --- | --- |
| Area | Number of pixels in the zone of the bacterium | Global size and shape of clusters |
| Perimeter | Number of pixels around the bacteria | Global size and shape of clusters |
| Circularity | $4\pi \times [Area]/[Perimeter]^2$ | 1 = perfect circle near 0 = very long shape |
| Aspect Ratio (AR) | [Major Axis]/[Minor Axis] | +inf = very long shape near 1 = perfect circle |
| Solidity | [Area]/[Convex area] | 1 = perfectly convex near 0 = not convex at all |
| (Maximum) Feret's diameter | Maximal distance | Size |
| Integrated Density | Area*Mean Grey Value | Intensity of bacteria on images |

The method of the invention involves using an image identification method comprising a review of the image characteristics from the imaging analysis step so as to determine a primary estimated identity of the particle such as a biologic particle. The primary estimated identity is preferably provided as a primary probability profile of one or more known particles such as biologic particles. In a simplest case, insofar as a known particle might have a distinctive appearance as seen in an image, then by comparison of the image of the particle as determined in the imaging analysis step, with a pre-established image of the known particle, the particle analyzed could be estimated with a high probability as being the known particle, such as a known biologic particle.

Preferably, the review of the image characteristics comprises an image characteristics comparison step of comparing the one or more image characteristics of each separate particle with image characteristics of selected known particles, preferably known biologic particles, in an image characteristics reference database and an image characteristics identification step of identifying each separate particle as being one or more of the selected known particles, preferably biologic particles, more preferably bacteria, based on the results of the image characteristics comparison step. For example, the method may include identifying each separate particle as being one or more of the selected known biologic particles based on the results of the image characteristics comparison step selecting one or more of the selected known biologic particles based on a determination as to the image characteristics of selected known biologic particles that are closest to the image characteristics of a separate particle. The words "closest to" cover various ways that compared image characteristics may be similar or the same or related in whole or in part without limitation. The method may also preferably include indicating based on the image characteristics comparison step that the particle is not identified as any one of the selected known biologic particle.

In accordance with the present invention, the method may include creating image characteristics of the selected known particles, preferably biologic particles, and recording the image characteristics of the known particles in the image characteristics database. The image characteristics of the selected known particles can be obtained by passing known particles through an apparatus for imaging analysis and operating the apparatus to create images of the known particles and recording the image characteristics in the image characteristics reference database. Thus, insofar as a particular protocol and method in accordance with the present invention is developed and adapted for use in a particular apparatus, input fluid carrying the known particles, preferably known biologic particles, may be input into the apparatus and the apparatus operated to capture and record the image characteristics of the known particles.

Preferably, the image characteristics comprise or are derived from one or more characterizations of electromagnetic imaging or images of each separate particle and providing each separate particle with a unique image identification name and correlating the image characteristics with each separate particle by the image identification name.

While the imaging analysis step and image identification method has been described with as particles, biologic particles, in the same manner non-biologic particles may be subjected to a similar imaging analysis step and image identification method with comparison to know non-biologic particles.

Electrical Fields

The method of this invention preferably includes as an analysis step an electrical field analysis step of determining with an electrical field measurement apparatus electrical field characteristics of the particles in the fluid. The electrical field analysis step may be carried out in a focused fluid stream of the fluid containing the particles, however, this is not necessary. Preferably, the electrical field measurement apparatus comprises an apparatus for generating one or more electrical fields and measuring the one or more electrical fields while each separate particle in a focused fluid stream is in the one or more electric fields. The electrical field characteristics preferably comprise one or more electrical field measurements for each separate particle with the electrical field analysis preferably including providing each separate particle with a unique field identification name and correlating the electric field characteristics for each separate particle with each separate particle by the field identification name.

Optionally, the electrical field analysis step may include flowing the focused fluid stream through the electrical field measurement apparatus, preferably with the analysis carried out while the particles are within a microfluidic cartridge preferably within a microfluidic analysis channel. The electrical field measurement apparatus may have a plurality of spaced electrodes along a path of the focused fluid stream of a liquid containing the particles.

Preferably, the electrical field analysis measures one or more of electrical impedance, electrical resistance and electrical capacity. Most preferably, an electrical field identification method uses impedance spectroscopy involving measuring the impedance at least two different frequencies and preferably at a plurality of different frequencies, for example, 4 or 5 or 10, or 25 frequencies, without limitation. Preferably, the electrical field analysis step involves measuring at least one of phase and amplitude of an electrical characteristic of an electrical field. Preferably, the electrical field analysis step involves developing derivatives of impedance magnitude vs frequency data for fluids having different concentrations of the same particle.

In a preferred arrangement of the present invention, an input fluid in which the particles are provided is an alcohol water solution most preferably isopropanol and ethanol solutions preferably, for example, at least 40% propanol or 65% to 70% isopropanol. Such an aqueous solution of water and ethanol is advantageous for the electrical field analysis step. Such an aqueous solution of water and ethanol is a non-polar solution and has low conductivity and high resistance with the aqueous solution having a conductivity that is less than the conductivity of many of the biologic particles and, for example, less than the conductivity of bacteria. As a result, as a concentration of the biologic particles, for example, bacteria increases, the resistance to electrical flow decreases. This relationship needs to be borne in mind during the electrical field analysis step as, for example, in impedance detection.

The electrical field analysis may be carried out using other input fluids than an alcohol water solution. Impedance detection is known to be carried out in buffered liquids that are highly conductive and thus have low resistance to electrical flow through them. With such fluids that are highly conductive, the biologic particles such as bacteria particles have a higher resistance than the resistance of the fluid and an increase in biologic particles such as bacteria particles increases the resistance of electrical flow. The nature of the fluid through which the electrical field analysis step is carried out needs to be considered in the determination of electrical field characteristics of the particles in the focused fluid stream.

Concentrations

The method of this invention preferably includes estimating an estimated concentration of particles in the focused fluid stream when and on which the electrical field characteristics are determined. Estimating the estimated concentration of particles in the liquid can be carried out by a wide variety of different known methods.

In one method, the particles can be passed as a focused fluid stream through the electrical field measurement apparatus with the particles counted over time and together with a determination as to the volume of flow of such focused fluid stream, the concentration of particles can be estimated.

The counting analysis step could be carried out by flowing a focused fluid stream through a second electromagnetic imaging apparatus and determining with the second electromagnetic imaging apparatus count characteristics of the particles in the focused fluid stream and estimating numbers of the particles passing through the electrical field measurement apparatus based on the count characteristics. The second electromagnetic imaging apparatus could involve an emitter of electromagnetic radiation and a sensor of electromagnetic radiation and provide for a counting as, for example, based on the electromagnetic radiation emitted that is sensed with time. Insofar as, for example, a microfluidic cartridge has an analysis channel for a focused fluid stream that is to pass through both the first electromagnetic imaging apparatus and the electrical field apparatus, then the first electromagnetic imaging apparatus could be used to count particles with time. The volume of flow of a focused fluid stream through the electrical field measurement apparatus may be estimated based on flow rates through other portions of the apparatus such as from a pump that directs input fluid through the microfluidic cartridge and with knowledge, for example, of a proportional amount of the total input fluid that would pass through the electrical field measurement apparatus.

The method of the invention preferably uses an electrical field identification method to estimate a secondary estimated identity of the particles in the liquid based on the determined electrical field characteristics and the estimated concentration. The secondary estimated identity is preferably provided as a secondary probability profile of one or more known biologic particles. The electrical field identification method preferably comprises:
  i) creating correlated field/concentration data for each separate particle of (a) the one or more electrical field measurements of each separate particle, and (b) the estimated concentration of the particles in the fluid when the one or more electrical field measurements for that particle is measured, and
  ii) a field/concentration comparison step of comparing for each particle the correlated field/concentration data of the electrical field measurements including data derived therefrom and the estimated concentration for each separate particle with correlated field/concentration data of electrical field measurements including data derived therefrom and concentration of selected known particles, preferably biologic particles, more preferably bacteria in a field/concentration reference database, and
  iii) a field/concentration identification step of identifying each separate particle as being one or more of the selected known particles based on the results of the field/concentration comparison step.

Preferably, identifying each separate particle as being the one or more of the selected known biologic particles based on the field/concentration comparison step selects one or more of the selected known biologic particles based on a determination as to the field/concentration data of selected known biologic particles that are closest to the correlated field/concentration data of each particle. The words "closest to" cover various ways that compared field/concentration data may be similar or the same or related in whole or in part without limitation. The method may also preferably include indicating based on the field/concentration comparison that the particle is not identified as any one of the selected known biologic particles.

The method preferably includes creating the field/concentration reference database of the selected known particles, preferably known biologic particles, by creating correlated field/concentration data of the selected known particles and recording correlated field/concentration data of the selected known particles in the field/concentration reference database as the correlated filed/concentration data of the selected known biologic particles.

The method preferably includes the step of creating the field/concentration database of selected known particles, preferably known biologic particles as, for example, in one embodiment by passing selected known particles through an apparatus designed to carry out the method in accordance with the present invention. The apparatus may include a microfluidic cartridge with microfluidic particle sorting channels and an electrical field measurement apparatus creating correlated field/concentration data of the selected known particles and recording the correlated field/concentration data in the field/concentration reference database.

Final Probability Profile

The method of the invention involves using the primary estimated identity from the image an identification method and the second estimated identity from the electrical field identification method to estimate a final estimated identity of the particles in the fluid preferably as a final probability profile of one or more known particles, preferably known biologic particles. In the step of estimating the final estimated identity, preferably, the primary probability profile of one or more known particles and the secondary probability profile of one or more known particles are combined so as to provide as a final probability profile, the probability that the particles in the focused fluid stream comprise one or more of the known particles, preferably known biologic particles.

The manner that the primary probability profile and the secondary probability profile are combined is not limited and various functions which may or may not have variable weighting of each of the primary probability profile and the secondary probability profile can be developed and used. As a simple function, each of the primary probability profile and the secondary probability profile may be given equal weight and the final probability profile may be the sum of the primary probability profile and the secondary probability profile.

Sequence of Analysis

When the method of the invention is carried out using the focusing step in which the input fluid is sorted into a focused fluid stream, this focused fluid stream can comprise but a single stream of particles. The focusing step may provide the focused fluid streams as comprising one or more fluid streams of particles, with each stream that is desired to be analyzed, preferably in an analysis channel. In a preferred simple embodiment, the focused fluid stream is focused into a single stream of particles to be analyzed, passes through a single analysis channel and, within that analysis channel, both the imaging analysis step and the electrical field analysis step are carried out, that is, in series with each other. In one preferred embodiment, the imaging analysis step is carried out in the one analysis channel prior to the electrical imaging analysis step. However, the reverse could be true or they could be carried out at substantially the same time.

In the case that the microfluidic sorting channel provides two streams of particles, for example, one in a first analysis channel and the second in a second analysis channel, the imaging analysis step may be carried out in the first analysis channel and the electrical field analysis step may be carried out in the second analysis channel and, in that case, in parallel with each other.

Insofar as the focusing step provides first and second portions of the focused fluid stream which may have substantially the same composition by splitting to flow through a first divider channel and a second divider channel, the image analysis step may be carried on the first portion and the electrical imaging step may be carried on the second portion, in parallel.

In accordance with the present invention, it may be considered advantageous to provide one or both of the imaging analysis step and the electrical field analysis step on an individual particle in the focused fluid stream with the focused fluid stream having a comparatively low velocity while the analysis step is being performed.

The focusing step in which the input fluid is sorted into a focused fluid stream may advantageously be carried out with a desired sorting velocity through a microfluidic sorting channel. It can be advantageous to provide the focused fluid stream to flow through an analysis channel in which the analysis step or steps are carried out with the flow through the analysis channel to be at an analysis velocity which is less than the sorting velocity. In this case, the method of this invention may preferably reduce the velocity of the focused fluid stream over a reduced velocity section of the analysis channel to permit carrying out the image analysis step and/or the electrical field analysis step on particles in the focused fluid stream while the fluid of the focused fluid stream is at the reduced analysis velocity in the reduced velocity section. In other arrangements, the focused fluid stream may in an analysis channel be temporarily stopped from moving and the analysis steps may be carried on a particle in the focused fluid stream while the fluid of the focused fluid stream is not moving.

Flow Generation

In carrying out the method in accordance with the present invention, when the method includes a focusing step including passing the input fluid through a microfluidic sorting channel, the manner by which fluid flow is generated through the microfluidic sorting channel is not limited. Preferred arrangements for flow generation include the use of one or more fluid pumps. Suitable pumps include pumps such as used in high-performance liquid chromatography and preferably maintain a constant flow of fluid through regardless of the pressure caused by resistance to flow. Suitable pumps also include microfluidic cartridge pumps and microfluidic electric fluid pumps. The use of a fluid pump is an example of an active flow generation system. In one arrangement, a microfluidic electric fluid pump may be provided on a microfluidic cartridge, however, this is not necessary and, if a high pressure fluid flow is required, it may be advantageous to have the pump separate from any microfluidic cartridge. Passive systems for flow generation may also be used such as gravity feed systems and passive systems comprising a surface tension directed flow system. An example of a passive flow system is the system taught in European Patent 2880314 to Commanes, granted 28 Sep. 2016, the disclosure of which is incorporated herein by reference. Commanes teaches a method of directional passive liquid transport utilizing specialized microfluidic channels having microstructures which provide for a passive transport mechanism in a predetermined flow direction as, for example, with a repeated narrowing and widening capillary structure relative to a longitudinal axis. In accordance with the present invention, the method preferably provides a system to pass the input fluid through the microfluidic sensor unit selected from the group consisting of (a) an active system incorporating a fluid pump, (b) a passive system, and (c) a combination of a passive system and an active system incorporating a fluid pump.

Cleaning

In accordance with the present invention, insofar as the method may include a microfluidic sorting channel, a cleaning step may be provided for cleaning the microfluidic sorting channel as by passing a cleaning fluid through the microfluidic cartridge and any microfluidic channels. Various other cleaning steps may be carried out. Preferably, the cleaning fluid may comprise a fluid similar to the input fluid without the biologic particles. One preferred configuration of the cleaning fluid would comprise a solution of water and alcohol, preferably the same as dispensed by a hand cleaning dispenser for cleaning of a person's hands but without the cleaning fluid engaging a person's hands. In another configuration the cleaning fluid might comprise a solution of water and alcohol different in concentration than a solution of water and alcohol delivered onto a person's hands, for example with a hand cleaning dispenser capable of dispensing different cleaning liquids and in different amounts depending on whether the cleaning liquid is for cleaning a person's hands and to provide overspray or is merely for cleaning for example microfluidic cartridge and not to engage a person's hands.

Discrete Particles

While not necessary, when the method of the present invention involves microfluidic sorting, an additional analysis step may be included comprising a discrete particle analysis step of determining if each particle is an individual separate particle sequentially separated from other particles in the focused fluid stream. The discrete particle analysis step could be carried out and provide assistance in determining whether or not the imaging analysis step or the electrical field analysis step should be carried out in a microfluidic analysis channel. For example, insofar as the discrete particle analysis step determines that a particle is an individual separate particle, then the method could be controlled to carry out the imaging analysis step and/or the image identification steps and/or the electrical field analysis step and/or the field/concentration identification steps. In contrast, in the event the discrete particle analysis step determines that the particles are not individual separate particles, then the method could be controlled as by a controller to not carry out the imaging analysis step or the electrical field analysis step. The discrete particle analysis step could be carried out utilizing, for example, a third electromagnetic imaging apparatus or could be carried out using a second electromagnetic imaging apparatus or the first electromagnetic imaging apparatus. Preferably, the discrete particle analysis step could utilize one or more of the image characteristics of particles in the focused fluid stream or at least some of them.

Definitions

As used in this application, the term "microfluidic channel" refers to a fluid passage or passageway which has an internal cross-sectional dimension that is small, preferably less than about 500 um and, in a preferred range, between about 0.05 um and about 500 um and, more preferably, about 0.1 um and about 500 um. The inside space of the passage may be referred to as a lumen. The microfluidic channels are channels which provide for passage of fluid and have an upstream and/or downstream end and with the upstream end corresponding to an inlet end and an outlet end corresponding to a downstream end. The inside space of the passage, that is, the lumen of a microfluidic channel, is bounded by walls of the microfluidic channel.

As used in this application, the term "a microfluidic cartridge" refers to a device, card or chip having a body or substrate within which microfluidic channels and other microfluidic structures may be provided having microfluidic dimensions, for example, having at least one internal cross-sectional dimension that is less than about 500 um and typically between about 0.05 um and about 500 um, for example. The microfluidic structures can include, for example, microfluidic channels, chambers, lumens, walls, branches, junctions, vents, pumps, inlets, optical windows, layers, electrodes, mixers, electrical connectors and various detection and analysis devices or parts thereof. Microfluidic cartridges are known to be manufactured in many ways such as, for example, by 3D laser printing. A microfluidic channel may be provided in a cartridge formed of optically clear material, for example, so as to provide optical windows through the cartridge into the microfluidic channel.

A microfluidic particle sorting channel is a microfluidic channel provided with geometry for particle separations, for example, based on factors such as preferably size and shape as well as other factors such as, for example, deformability and density. The geometries of the microfluidic particle sorting channels can be selected to perform sorting by various known techniques so as to provide a plurality of microfluidic output channels, each with particles in a different range of such factors, most preferably sizes.

In accordance with the present invention, when the method includes microfluidic sorting, then biologic particles in an input fluid are sorted into at least one focused fluid stream and preferably a number of focused fluid streams, each of which includes particles from the input stream in a desired range of particle sizes and/or a desired range of particle shapes or a desired range of another other factor. The focusing step is preferably carried out by passing the input fluid through a microfluidic sorting channel of a microfluidic cartridge to provide each of the focused fluid streams in a downstream analysis channel, preferably forming one microfluidic channel of the microfluidic cartridge. Preferably while the focused fluid stream is within the analysis channel of the microfluidic cartridge, analysis steps are performed to analyse the particles within the focused fluid stream. A first electromagnetic imaging apparatus may perform an imaging analysis step on the fluid particles within the analysis channel and an electrical field measurement apparatus may perform an electrical field analysis step on the particles within the analysis channel. Similarly, other analysis steps may preferably be carried out while the particles are within the analysis channel.

Known techniques for microfluidic sorting and separation include, for example, without limitation: (a) hydrodynamic microfluidic separation and sorting techniques, (b) deterministic lateral displacement separation and sorting techniques, (c) microfluidic flow-field fractionation separating and sorting techniques, (d) microfluidic micro-structures including grooves, chevrons, herringbones and hydrophorasis, (e) microfluidic inertial separation and sorting techniques, (f) gravity and sedimentation microfluidic separation and sorting techniques, (g) microfluidic magnetophoresis separation and sorting techniques, (h) aqueous 2-phase systems for separation and sorting, (i) acoustophoresis cell separation and sorting techniques, and (j) dielectrophoresis cell separation and sorting techniques.

Preferred of the various sorting and separation techniques are those which are hydrodynamic and principally arise due to the selection of the microfluidic channels to which flow is directed to separate particles into different portions of the flow using channel geometry and configuration of outlets, for example.

Various bacteria are referred to in this application and its drawings by various abbreviations as below:

*Staphylococcus aureus* (SA or Staph)
*Corynebacterium jelkeium* (CJ)
*Escherichia coli* (*E. coli* or EC)
*Pseudomonas aeruginosa* (PA or Pseudos)
*Staphylococcus epidermis* (SE)
*Streptococcus pyogenes* (SP)

The invention has many aspects, including features and combinations of aspects and features. The following numerous aspects particularize various of the different aspects of the invention.

In a $1^{st}$ aspect, the present invention provides a method of identifying biologic particles in an input fluid comprising:
- a focusing step in which the input fluid is sorted into a focused fluid stream including particles from the input fluid in a desired range of particle sizes and/or a desired range of particle shapes,
- an imaging analysis step of determining with a first electromagnetic imaging apparatus image characteristics of the particles in the focused fluid stream,
- an electrical field analysis step of determining with an electrical field measurement apparatus electrical field characteristics of the particles in the focused fluid stream,
- using an image identification method comprising a review of the image characteristics to determine a primary estimated identity of the particles in the focused fluid stream as a primary probability profile of one or more known biologic particles,
- estimating an estimated concentration of the particles in the focused fluid stream when the electrical field characteristics is determined,
- using an electrical field identification method to estimate a secondary estimated identity of the particles in the focused fluid stream as a secondary probability profile of one or more known biologic particles based on the determined electrical field characteristics and the estimated concentration, and
- using the primary estimated identity and the secondary estimated identity to estimate a final estimated identity of the particles in the focused fluid stream as a final probability profile of one or more known biologic particles.

In a $2^{nd}$ aspect, the present invention provides, as in the $1^{st}$ aspect, a method wherein the known biologic particles are biological pathogens or particles derived from biological particles.

In a $3^{rd}$ aspect, the present invention provides, as in the $1^{st}$ or $2^{nd}$ aspect, a method wherein the known biologic particles are selected from the group comprising bacteria and viruses.

In a $4^{th}$ aspect, the present invention provides, as in the $1^{st}$ or $2^{nd}$ aspect, a method wherein the known biologic particles are bacteria.

In a $5^{th}$ aspect, the present invention provides, as in any one of the $1^{st}$ to $4^{th}$ aspects, a method wherein the imaging analysis step includes flowing the focused fluid stream through the first electromagnetic imaging apparatus, and the electrical field analysis step includes flowing the focused fluid stream through the electrical field measurement apparatus.

In a $6^{th}$ aspect, the present invention provides, as in any one of the $1^{st}$ to $5^{th}$ aspects, a method wherein the image characteristics comprising or derived from one or more characterizations of electromagnetic imaging images of each separate particle of the particles, providing each separate particle with a unique image identification name and correlating the image characteristics with each separate particle by the image identification name.

In a $7^{th}$ aspect, the present invention provides, as in any one of the $1^{st}$ to $6^{th}$ aspects, a method wherein the first electromagnetic imaging apparatus comprising an emitter of emitted electromagnetic radiation and a sensor of electromagnetic radiation, the method including directing the emitted electromagnetic radiation on to the particles and sensing with the sensor electromagnetic radiation, preferably sensing emitted electromagnetic radiation that is scattered, reflected, emitted and/or transmitted from, through or about the particle.

In an $8^{th}$ aspect, the present invention provides, as in any one of the $1^{st}$ to $7^{th}$ aspects, a method wherein the estimating of the estimated concentration of the particles includes estimating the flow rate of the focused fluid stream through the electrical field measurement apparatus and estimating the numbers of the particles passing through the electrical field measurement apparatus with time.

In a $9^{th}$ aspect, the present invention provides, as in the $8^{th}$ aspect, a method including estimating the number of the particles passing through the electrical field measurement apparatus with time using an electromagnetic imaging apparatus selected from the first electromagnetic imaging apparatus and a second electromagnetic imaging apparatus.

In a $10^{th}$ aspect, the present invention provides, as in any one of the $1^{st}$ to $9^{th}$ aspects, a method wherein the electrical field characteristics comprising one or more electrical field measurements for each separate particle, the electrical field analysis including providing each separate particle with a unique field identification name and correlating the electrical field characteristics for each separate particle with each separate particle by the field identification name.

In an $11^{th}$ aspect, the present invention provides, as in any one of the $1^{st}$ to $10^{th}$ aspects, a method wherein the electrical field measurement apparatus comprising an apparatus for generating one or more electrical fields and measuring the one or more electrical fields while each separate particle of the particles is in the one or more electrical fields.

In a $12^{th}$ aspect, the present invention provides, as in any one of the $1^{st}$ to $11^{st}$ aspects, a method wherein the electrical field measurement apparatus comprises a plurality of spaced electrodes.

In a $13^{th}$ aspect, the present invention provides, as in any one of the $1^{st}$ to $12^{th}$ aspects, a method wherein the electrical field analysis step measures one or more of electrical impedance, electrical resistance and electrical capacity.

In a $14^{th}$ aspect, the present invention provides, as in any one of the $1^{st}$ to $13^{th}$ aspects, a method wherein the review comprising an image characteristics comparison step of comparing the one or more image characteristics of each separate particle of the particles with image characteristics of selected known biologic particles in an image characteristics reference database, and an image characteristics identification step of identifying each separate particle as being one or more of the selected known biologic particles based on the results of the image characteristics comparison step.

In a 15th aspect, the present invention provides, as in the 14th aspect, a method identifying each separate particle as being the one or more of the selected known biologic particles based on the results of the image characteristics comparison step selecting one or more of the selected known biologic particles based on a determination as to the image characteristics of selected known biologic particles that are closest to the image characteristics of each separate particle.

In a 16th aspect, the present invention provides, as in the 14th or 15th aspect a method including creating image characteristics of the selected known biologic particles from images of the known biologic particles and recording the image characteristics of the known biologic particles in the image characteristics reference database.

In a 17th aspect, the present invention provides, as in any one of the 1st to 16th aspects, a method wherein the electrical field identification method comprising an electrical field measurement analysis comprising determining the electrical field measurements for each separate particle of the particles.

In an 18th aspect, the present invention provides, as in any one of the 1st to 17th aspects, a method wherein the electrical field identification method comprising:
i. creating correlated field/concentration data for each separate particle of the particles of:
(a) one or more electrical field measurements of each separate particle, and
(b) the estimated concentration of the particles in the focused fluid stream when the one or more electrical field measurements for that each separate particle is measured, and
ii, a field/concentration comparison step of comparing for each particle the correlated field/concentration data of the electrical field measurements and the estimated concentration for each separate particle with correlated field/concentration data of electrical field measurements and concentration of bacteria of selected known biologic particles bacteria in a field/concentration reference database, and
iii, a field/concentration identification step of identifying each separate particle as being one or more of the selected known biologic particles based on the results of the field/concentration comparison step.

In a 19th aspect, the present invention provides, as in the 18th aspect, a method wherein identifying each separate particle as being the one or more of the selected known biologic particles based on the field/concentration comparison step by selecting one or more of the selected known biologic particles based on a determination as to the field/concentration data of selected known biologic particles that is closest the field/concentration data of each separate particle.

In a 20th aspect, the present invention provides, as in any one of the 18th or 19th aspects, a method including creating the field/concentration reference database of the selected known biologic particles by creating correlated filed/concentration data of the selected known biologic particles and recording correlated filed/concentration data of the selected known biologic particles in the field/concentration reference database as the correlated filed/concentration data of the selected known biologic particles.

In a 21st aspect, the present invention provides, as in any one of the 1st to 20th aspects, a method including a discrete particle analysis step of determining if each particle is an individual separate particle sequentially separated from other particles in the focused fluid stream.

In a 22nd aspect, the present invention provides, as in any one of the 1st to 21st aspects, a method including a counting analysis step of flowing the focused fluid stream through a second electromagnetic imaging apparatus and determining with the second electromagnetic imaging apparatus count characteristics of the particles in the focused fluid stream, and estimating numbers of the particles passing through the first electrical field measurement apparatus based on the count characteristics.

In a 23rd aspect, the present invention provides, as in any one of the 1st to 22nd aspects, a method wherein the first electromagnetic imaging apparatus comprises an optical microscope, the method including providing for electromagnetic detection based on optical or phase contrast microscopy.

In a 24th aspect, the present invention provides, as in any one of the 1st to 23rd aspects, a method wherein the estimating of the estimated concentration includes one or more of: controlling the flow rate of the focused fluid stream, and measuring the times that the images characteristics are determined to estimate the estimated concentration of the particles in the focused fluid stream.

In a 25th aspect, the present invention provides, as in any one of the 1st to 24th aspects, a method wherein the electrical field identification method is impedance spectroscopy.

In a 26th aspect, the present invention provides, as in the 25th aspect, a method wherein at least one of phase and amplitude of an electrical field characteristic of an electrical field are measured.

In a 27th aspect, the present invention provides, as in any one of the 1st to 26th aspects, a method wherein the input fluid comprises an alcohol water solution.

In a 28th aspect, the present invention provides, as in the 27th aspect, a method wherein the alcohol water solution includes an alcohol selected from isopropanol, ethanol and mixtures of isopropanol and ethanol.

In a 29th aspect, the present invention provides, as in the 27th or 28th aspect, a method wherein the alcohol water solution comprises in the range of 25% to 80% alcohol by volume.

In a 30th aspect, the present invention provides, as in the 27th or 28th aspect, a method wherein the alcohol water solution comprises at least 40% alcohol.

In a 31st aspect, the present invention provides, as in the 27th or 28th aspect, a method wherein the alcohol water solution comprises at least 60% alcohol.

In a 32nd aspect, the present invention provides, as in the 24th or 28th aspect, a method wherein the alcohol water solution comprises at least 40% by volume isopropanol.

In a 33rd aspect, the present invention provides, as in the 27th, 28th and 30th to 32nd aspects, a method wherein the alcohol water solution comprises at least 40% by volume water.

In a 34th aspect, the present invention provides, as in any one of the 27th to 29th and 32nd aspects, a method wherein the alcohol consists of isopropanol.

In a 35th aspect, the present invention provides, as in any one of the 1st to 34th aspects, a method including dispensing a precursor fluid onto a person's hands to engage the person's hands with the precursor fluid, and gathering as the input fluid the precursor fluid that has been engaged with the person's hand.

In a 36th aspect, the present invention provides, as in the 35th aspect, a method wherein the precursor fluid is a hand cleaning or disinfecting fluid, the method including dispensing the precursor fluid from a hand cleaning fluid dispenser.

In a 37th aspect, the present invention provides, as in any one of the 1st to 36th aspects, a method wherein the focusing step limits the focused fluid stream by sorting the particles from the input stream such that the desired range of particle sizes in the range of 0.1 um to 10 um.

In a 38th aspect, the present invention provides, as in any one of the 1st to 36th aspects, a method wherein the desired range of particle sizes is selected from the group consisting of:
- greater than 0.1 um;
- greater than 0.5 um;
- less than 10 um;
- less than 5 um;
- less than 3 um;
- in the range of 0.1 um to 10 um;
- in the range of 0.5 um to 10 um;
- in the range of 0.1 um to 0.5 um;
- in the range of 0.1 um to 0.7 um;
- in the range of 0.5 um to 0.7 um;
- in the range of 0.7 um to 0.1 um;
- in the range of 0.7 um to 1 um;
- in the range of 1 um to 2 um;
- in the range of 1 um to 3 um;
- in the range of 1 um to 5 um;
- in the range of 2 um to 3 um;
- in the range of 2 um to 5 um;
- in the range of 3 um to 5 um;
- in the range of 3 um to 10 um; and
- in the range of 5 um to 10 um.

In a 39th aspect, the present invention provides, as in any one of the 1st to 36th aspects, a method wherein the desired range of particle sizes for each selected stream is greater than 0.5 um and less than 10 um.

In a 40th aspect, the present invention provides, as in any one of the 1st to 39th aspects, a method wherein the imaging analysis step is carried out on the input fluid in series with the electrical imaging analysis step.

In a 41st aspect, the present invention provides, as in the 40th aspect, a method wherein the imaging analysis step is carried out on the input fluid prior to the electrical imaging analysis step.

In a 42nd aspect, the present invention provides, as in any one of the 1st to 41st aspects, a method wherein the imaging analysis step is carried out on the input fluid in parallel with the electrical field analysis step.

In a 43rd aspect, the present invention provides, as in any one of the 1st to 42nd aspects, a method wherein the focusing step is carried out using a Dean-Flow Vortexsorter.

In a 44th aspect, the present invention provides, as in any one of the 1st to 43rd aspects, a method wherein the imaging analysis step is carried out on a particle of the particles in the focused fluid stream while the fluid of the focused fluid stream is not moving.

In a 45th aspect, the present invention provides, as in any one of the 1st to 44th aspects, a method including carrying out the imaging analysis step on a particle of the particles following which carrying out the electrical imaging analysis step on the same particle.

In a 46th aspect, the present invention provides, as in any one of the 1st to 45th aspects, a method wherein the image characteristics comprise data representing one or more of area, perimeter, circularity, aspect ratio, roundness, maximum diameter, solidity and integrated density of the particles.

In a 47th aspect, the present invention provides, as in any one of the 1st to 46th aspects, a method wherein the image characteristics comprise images of the particles.

In a 48th aspect, the present invention provides, as in any one of the 1st to 47th aspects, a method wherein the selected known biologic particles are bacteria selected from the group consisting of *Pseudomonas aeruginosa, Streptococcus pneumoniae, Staphylococcus aureus, Escherichia coli*, and *Staphylococcus epidermidis*.

In a 49th aspect, the present invention provides, as in any one of the 1st to 48th aspects, a method wherein the desired range of particle sizes and/or the desired range of particle shapes is selected having regard to the selected known biologic particles,
wherein, when the biologic particles are bacteria the range of particle sizes in the range of 0.5 um to 10 um or preferably 0.5 um to 5 um, and when the biologic particles are virus the range of particle sizes is in the range of 0.1 um to 1 um, or 0.1 um to 0.5 um.

In a 50th aspect, the present invention provides, as in any one of the 1st to 49th aspects, a method wherein the focusing step includes passing the input fluid through a microfluidic particle sorting cartridge to provide in a microfluidic analysis channel of the microfluidic particle sorting cartridge the focused fluid stream.

In a 51st aspect, the present invention provides, as in 50th aspect, a method wherein the microfluidic particle sorting cartridge includes a microfluidic sorting channel portion that is a curve or a spiral.

In a 52nd aspect, the present invention provides, as in 51st aspect, a method wherein the focusing step includes manipulating the focused fluid stream to provide individual of the particles in the input fluid to flow through the analysis channel sequentially as individual particles sequentially separated from other particles in the focused fluid stream.

In a 53rd aspect, the present invention provides, as in any one of the 50th to 52nd aspects, a method wherein each of the microfluidic particle sorting cartridge, the first electromagnetic imaging apparatus and the electrical field measurement apparatus is carried on and part of a microfluidic sensor unit, and the method including determining with the first electromagnetic imaging apparatus the image characteristics of the particles in the focused fluid stream in the analysis channel, and determining with the electrical field measurement apparatus the electrical field characteristics of the particles in the focused fluid stream.

In a 54th aspect, the present invention provides, as in any one of the 50th to 53rd aspects, a method including the step of creating the field/concentration database of the selected known biologic particles by passing selected known biologic particles through the microfluidic particle sorting cartridge carrying out the electrical field analysis step and the estimating of concentration to create correlated field/concentration data of the selected known biologic particles in the analysis channel and recording correlated field/concentration data of the selected known biologic particles in a field/concentration reference database as the correlated field/concentration data of the selected known biologic particles.

In a 55th aspect, the present invention provides, as in the 51st aspect, a method including a counting analysis step of flowing the focused fluid stream through a second electromagnetic imaging apparatus and determining with the second electromagnetic imaging apparatus count characteristics of the particles in the focused fluid stream, and estimating numbers of the particles passing through the first electrical field measurement apparatus based on the count characteristics, wherein the second electromagnetic imaging apparatus is carried on and part of the microfluidic particle sorting cartridge.

In a 56th aspect, the present invention provides, as in the 51st aspect, a method wherein the numbers of the particles passing through the electrical field measurement apparatus is determined from the image characteristics by counting images of the particles passing with time through the analysis channel.

In a 57th aspect, the present invention provides, as in the 51st aspect, a method wherein the microfluidic sorting channel portion of the microfluidic particle sorting cartridge comprises one or a plurality of microfluidic sorting channels and, in the focusing step, the input fluid is passed through the one or more of the microfluidic sorting channels in the microfluidic particle sorting cartridge to provide a plurality of streams, each stream having in a different desired range of sizes of the particles.

In a 58th aspect, the present invention provides, as in the 51st aspect, a method wherein the microfluidic sorting channel of the microfluidic particle sorting cartridge comprises one or a plurality of microfluidic sorting channels; and the focusing step comprising: focusing sub-step (a) of passing the input fluid through an upstream one of the microfluidic sorting channels to provide fluid flow through the upstream microfluidic sorting channel that produces at different locations in the upstream microfluidic sorting channel relative a cross-sectional normal the upstream microfluidic sorting channel, a plurality of streams of the input fluid containing the particles with each stream having at least one of a different concentration of the particles, a different range of sizes of the particles and a different shape of the particles than that of other of the streams, and directing each stream into a corresponding one of a plurality of downstream of the microfluidic sorting channels to separate the streams from each other, selecting at least one of the streams to be the focused fluid stream.

In a 59th aspect, the present invention provides, as in the 58th aspect, a method wherein the focusing step further comprising focusing sub-step (b) of repeating focusing sub-step (a) with any downstream of the microfluidic sorting channels considered an upstream of the microfluidic sorting channels producing additional separated streams in successive downstream of the microfluidic sorting channels.

In a 60th aspect, the present invention provides, as in the 57th to 59th aspects, a method wherein only selected of the streams of the particles are subjected to the imaging analysis step and/or the electrical field analysis step.

In a 61st aspect, the present invention provides, as in the 57th to 60th aspects, a method wherein at least one of the streams of particles that are not selected streams are discarded.

In a 62nd aspect, the present invention provides, as in the 58th to 61st aspects, a method wherein the desired range of particle sizes for a first of the selected streams is greater than 0.1 um and less than a value between 1 and 10 um and the desired range of particle sizes for a second of the selected streams is greater than the value and less than 10 um.

In a 63rd aspect, the present invention provides, as in any one of the 50th to 62nd aspects, a method wherein the microfluidic sorting channel of the microfluidic particle sorting cartridge comprises one or a plurality of microfluidic sorting channels, the imaging analysis step is carried out on the input fluid in parallel with the electrical imaging analysis step, the method including a splitting step of dividing the focused fluid stream to flow as a first portion through a first divider channel of the microfluidic sorting channels and as a second portion through a second divider channel of the microfluidic sorting channels, the first portion and the second portion having substantially the same composition.

In a 64th aspect, the present invention provides, as in the 63rd aspect, a method wherein the imaging analysis step is carried out on the first portion of the focused fluid stream and the electrical imaging analysis step is carried out on the second portion of the focused fluid stream.

In a 65th aspect, the present invention provides, as in any one of the 50th to 64th aspects, a method including providing a flow generation system to pass the input fluid through the microfluidic particle sorting cartridge selected from the group consisting of (i) a passive flow generation system. (ii) an active flow generation system incorporating a fluid pump, and (iii) both a passive flow generation system and an active flow generation system incorporating a fluid pump.

In a 66th aspect, the present invention provides, as in the 65th aspect, a method wherein the passive flow generation system comprises a surface tension directed flow generation system.

In a 67th aspect, the present invention provides, as in the 65th or 66th aspect, a method wherein the passive flow generation system is provided on the microfluidic particle sorting cartridge upstream from where the imaging analysis step and the electrical field analysis step are carried out.

In a 68th aspect, the present invention provides, as in the 65th to 67th aspects, a method wherein the passive flow generation system is provided on the microfluidic particle sorting cartridge downstream from where the imaging analysis step and the electrical field analysis step are carried out.

In a 69th aspect, the present invention provides, as in any one of the 50th to 62nd aspects, a method including a cleaning step of cleaning the microfluidic particle sorting cartridge by passing a cleaning fluid through the microfluidic particle sorting cartridge.

In a 70th aspect, the present invention provides, as in any one of the 60th to 69th aspects, a method including reducing the velocity of the focused fluid stream over a reduced velocity section of the analysis channel and carrying out the imaging analysis step on the particles in the focused fluid stream while the fluid of the focused fluid stream is in the reduced velocity section.

In a 71st aspect, the present invention provides, as in any one of the 60th to 69th aspects, a method wherein the electrical field analysis step is carried out on a particle in the focused fluid stream while the fluid of the focused fluid stream is not moving.

In a 72nd aspect, the present invention provides, as in any one of the 60th to 71st aspects, a method including reducing the velocity of the focused fluid stream over a reduced velocity section of the analysis channel and carrying out the electrical field analysis step on the particles in the focused fluid stream when the focused fluid stream is in the reduced velocity section.

In a 73rd aspect, the present invention provides, as in any one of the 50th to 72nd aspects, a method including the step of creating image characteristics of the selected known biologic particles by passing known biologic particles through the microfluidic particle sorting cartridge and carrying out the image analysis step in the microfluidic particle sorting cartridge to create image characteristics of the known biologic particles in the analysis channel and recording the image characteristics of the known biologic particles in an image characteristics reference database as the image characteristics of the known biologic particles.

In a 74th aspect, the present invention provides a method of identifying bacteria in an input fluid comprising:
   A. passing the input fluid through a microfluidic particle sorting cartridge including the steps of:

i. a focusing step in which the input fluid is passed through a microfluidic sorting channel carried on the microfluidic particle sorting cartridge to provide in an analysis channel carried on the microfluidic sensor unit a focused fluid stream including particles from the input stream in a desired range of particle sizes and/or a desired range of particle shapes, ii. an imaging analysis step of flowing the focused fluid stream in the analysis channel through a first electromagnetic imaging apparatus and determining with the first electromagnetic imaging apparatus image characteristics of the particles in the focused fluid stream, and iii. an electrical field analysis step of flowing the focused fluid stream in the analysis channel through an electrical field measurement apparatus and determining with the electrical field measurement apparatus electrical field characteristics of the particles in the focused fluid stream, B. preforming steps of:

i. using an image identification method comprising review of the image characteristics to determine a primary estimated identity of the particles in the focused fluid stream as a primary probability profile of one or more bacteria, ii. estimating an estimated concentration of the particles in the focused fluid stream when the electrical field characteristics is determined, iii. using an electrical field identification method to estimate a secondary estimated identity of the particles in the focused fluid stream as a secondary probability profile of one or more bacteria based on the determined electrical field characteristics and the estimated concentration, and iv. using the primary estimated identity and the secondary estimated identity to estimate a final estimated identity of the particles as a final probability profile of one or more bacteria.

In a $75^{th}$ aspect, the present invention provides a method of analysis of a particle in a fluid comprising:

a. an electrical field analysis step of determining with an electrical field measurement apparatus electrical field characteristics of the particle in the fluid, including subjecting the fluid to impedance spectroscopy to determine for the particle in the fluid Base Impedance/Frequency Data regarding the relationship of impedance vs frequency of the fluid containing the particle, b. estimating an estimated concentration of the particle in the fluid when the electrical field characteristics are determined, c. performing a first mathematical analysis step to the Base Impedance/Frequency Data including a first derivation analysis to provide First Derivate Impedance/Frequency Data, d. subjecting the First Derivate Impedance/Frequency Data to a second mathematical analysis step including a second derivation analysis to provide Curvature Data, and e. correlating the estimated concentration and the Data to provide Curvature/Concentration Data for the particle.

In a $76^{th}$ aspect, the present invention provides, as in the $75^{th}$ aspect, a method including a field/concentration comparison step of comparing the Curvature/Concentration Data for the particle with Curvature/Concentration Data for selected known particles created by performing each of steps "a" to "e" of claim 1 on selected known particles in the fluid.

In a $77^{th}$ aspect, the present invention provides, as in the $76^{th}$ aspect, a method including an imaging analysis step of determining with a first electromagnetic imaging apparatus image characteristics of the particle in the fluid, using an image identification method comprising a review of the image characteristics to determine a primary estimated identity of the particle in the fluid as a primary probability profile of one or more known particles, using the results of the field/concentration comparison step field in conjunction with the primary probability profile of the known particles to estimate with a final estimated identity of the particles in the focused fluid stream as a final probability profile of one or more known particles.

In a $78^{th}$ aspect, the present invention provides, as in the $75^{th}$ or $76^{th}$ aspect, a method wherein the particle has a size within a desired range of particle sizes and/or a shape within a desired range of particle shapes, including providing an input fluid stream containing the particle as one of a plurality of particles in the fluid, carrying out a focusing step in which the input fluid stream fluid is sorted into a focused fluid stream including the desired range of particle sizes and/or the desired range of particle shapes, determining with the electrical field measurement apparatus the Base Impedance/Frequency Data of the particle in the focused fluid.

In a $79^{th}$ aspect, the present invention provides, as in the $78^{th}$ aspect, a method including an imaging analysis step of determining with a first electromagnetic imaging apparatus image characteristics of the particle in the fluid, using an image identification method comprising a review of the image characteristics to determine a primary estimated identity of the particle in the fluid as a primary probability profile of one or more known particles, using the results of the field/concentration comparison step field in conjunction with the primary probability profile of the known particles to estimate with a final estimated identity of the particles in the focused fluid stream as a final probability profile of one or more known particles, determining with the first electromagnetic imaging apparatus, the image characteristics of the particle in the focused fluid stream.

In an $80^{th}$ aspect, the present invention provides, as in any one of the $75^{th}$ to $79^{th}$ aspects, a method wherein the particle and the known particles is each a biologic particle.

In an $81^{st}$ aspect, the present invention provides, as in the $80^{th}$ aspect, a method wherein the biological particle is a biologic pathogen or a particle derived from biological particles.

In an $82^{nd}$ aspect, the present invention provides, as in the $81^{st}$ aspect, a method wherein the biologic particle is selected from the group comprising bacteria and viruses.

In an $83^{rd}$ aspect, the present invention provides, as in the $82^{rd}$ aspect, a method wherein the known biologic particle is a bacteria, preferably selected from known bacteria *Pseudomonas aeruginosa, Streptococcus pneumoniae, Staphylococcus aureus, Escherichia coli*, and *Staphylococcus epidermidis*.

In an $84^{th}$ aspect, the present invention provides, as in any one of the $75^{th}$ to $83^{rd}$ aspects, a method wherein the fluid comprises an alcohol water solution.

In an $85^{th}$ aspect, the present invention provides, as in the $84^{th}$ aspect a method wherein the alcohol water solution includes an alcohol selected from isopropanol, ethanol and mixtures of isopropanol and ethanol.

In an $86^{th}$ aspect, the present invention provides, as in the $85^{th}$ aspect, a method wherein the alcohol consists of isopropanol.

In an $87^{th}$ aspect, the present invention provides, as in any one of the $75^{th}$ to $86^{th}$ aspects, a method wherein the Base Impedance/Frequency Data is based on one or more of the magnitude of impedance and the phase of impedance.

In an 88th aspect, the present invention provides a method of analysis of a particle in a fluid comprising:
  a. an electrical field analysis step of determining with an electrical field measurement apparatus electrical field characteristics of the particle in the fluid, including subjecting the fluid to impedance spectroscopy to determine for the particle in the fluid Base Impedance/Frequency Data regarding the relationship of impedance vs frequency of the fluid containing the particle,
  b. estimating an estimated concentration of the particle in the fluid when the electrical field characteristics are determined,
  c. performing a first mathematical analysis step to the Base Impedance/Frequency Data including a first derivation analysis to provide a First Derivate Impedance/Frequency Data,
  d. correlating the estimated concentration with one or more of the First Derivate Impedance/Frequency Data or data derived from the First Derivate Impedance/Frequency Data.

In an 89st aspect, the present invention provides, as in the 88st aspect, a method including:
  e. subjecting the First Derivate Impedance/Frequency Data to a second mathematical analysis step including a second derivation analysis to provide Curvature Data, and wherein the step d comprises correlating the estimated concentration and the Curvature Data to provide Curvature/Concentration Data for the particle.

In a 90th aspect, the present invention provides a method of identifying biologic particles in an input fluid comprising:
  a focusing step in which the input fluid is sorted into a focused fluid stream including particles from the input stream in a desired range of particle sizes and/or a desired range of particle shapes,
  an imaging analysis step of determining with a first electromagnetic imaging apparatus image characteristics of the particles in the focused fluid stream,
  an electrical field analysis step of determining with an electrical field measurement apparatus electrical field characteristics of the particles in the focused fluid stream,
  using an image identification method comprising a review of the image characteristics to determine a primary estimated identity of the particles in the focused fluid stream as a primary probability profile of one or more known biologic particles,
  estimating an estimated concentration of the particles in the focused fluid stream when the electrical field characteristics is determined,
  using an electrical field identification method to estimate a secondary estimated identity of the particles in the focused fluid stream as a secondary probability profile of one or more known biologic particles based on the determined electrical field characteristics and the estimated concentration, and
  using the primary estimated identity and the secondary estimated identity to estimate a final estimated identity of the particles in the focused fluid stream as a final probability profile of one or more known biologic particles.

In a 91st aspect, the present invention provides, as in the 90th aspect, a method including creating image characteristics of the known biologic particles from images of the known biologic particles and recording the image characteristics of the known biologic particles in an image characteristics reference database, and wherein the review comprising an image characteristics comparison step of comparing the one or more image characteristics of each separate particle of the particles with image characteristics of the known biologic particles in the image characteristics reference database, and an image characteristics identification step of identifying each separate particle as being one or more of the known biologic particles based on the results of the image characteristics comparison step.

In a 92nd aspect, the present invention provides, as in the 91st aspect, a method wherein identifying each separate particle as being the one or more of the known biologic particles based on the results of the image characteristics comparison step comprises selecting one or more of the known biologic particles based on a determination as to the image characteristics of the known biologic particles that are closest to the image characteristics of each separate particle.

In a 93rd aspect, the present invention provides, as in any one of the 90th to 92nd aspects, a method wherein the electrical field identification method comprising:
  i. creating correlated field/concentration data for a particle comprising:
    (a) one or more of the electrical field characteristics of the particle, and
    (b) the estimated concentration of particles in the focused fluid stream when the one or more of the electrical field characteristics for that particle is measured.

In a 94th aspect, the present invention provides, as in the 93th aspect, a method creating a field/concentration reference database of the known biologic particles by creating correlated filed/concentration data of the known biologic particles by use of the electrical field identification method for particles of the known biologic particles comprising:
  i. creating correlated field/concentration data for particles of the known biologic particles comprising:
    (a) one or more of the electrical field characteristics of the particles of the known biologic particles, and
    (b) the estimated concentration of particles of the known biologic particles in the focused fluid stream when the one or more electrical field characteristics for each particle of the known biologic particles is measured;
  recording correlated filed/concentration data of the known biologic particles in the field/concentration reference database as the correlated filed/concentration data of the known biologic particles,
  creating correlated field/concentration data for each separate particle of the particles of:
    (a) one or more of the electrical field characteristics of each separate particle, and
    (b) the estimated concentration of the particles in the focused fluid stream when the one or more electrical field characteristics for that each separate particle is measured,
  a field/concentration comparison step of comparing for each particle the correlated field/concentration data of the electrical field measurements and the estimated concentration for each separate particle with correlated field/concentration data of electrical field measurements and concentration of the known biologic particles in the field/concentration reference database,
  a field/concentration identification step of identifying each separate particle as being one or more of the known biologic particles based on the results of the field/concentration comparison step.

In a 95th aspect, the present invention provides, as in the 94th aspect, a method wherein identifying each separate particle as being one or more of the known biologic particles based on the field/concentration comparison step comprises selecting one or more of the known biologic particles based on a determination as to the field/concentration data of the known biologic particles that is closest the field/concentration data of each separate particle.

In a 96th aspect, the present invention provides, as in the 95th aspect, a method wherein the electrical field analysis step includes subjecting the fluid to impedance spectroscopy to determine for a particle of the particles in the fluid Base Impedance/Frequency Data regarding the relationship of impedance vs frequency of the fluid containing the particle,
the estimating of the estimated concentration of the particles in the focused fluid stream on which the Base Impedance/Frequency Data are determined,
the electrical field identification method includes:
(i) performing a first mathematical analysis step to the Base Impedance/Frequency Data including a first derivation analysis to provide First Derivate Impedance/Frequency Data,
(ii) subjecting the First Derivate Impedance/Frequency Data to a second mathematical analysis step including a second derivation analysis to provide Curvature Data, and
(iii) correlating the estimated concentration and the Curvature Data to provide Curvature/Concentration Data for the particle as the correlated field/concentration data.

In a 97th aspect, the present invention provides, as in the 96th aspect, a method wherein the field/concentration comparison step including comparing the Curvature/Concentration Data for the particle in the input fluid with Curvature/Concentration Data created for the known particles.

In a 98th aspect, the present invention provides, as in the 95th aspect, a method wherein the field/concentration reference database of the known particles includes Curvature/Concentration Data created for the known particles,
creating the Curvature/Concentration Data created for the known particles by subjecting the known particles to impedance spectroscopy to determine for a particle of the known particles in a focused fluid stream of the known particles Base Impedance/Frequency Data regarding the relationship of impedance vs frequency of the known particles,
the estimating of the estimated concentration of the known particles in the fluid stream on which the Base Impedance/Frequency Data are determined,
performing the electrical field identification method including:
(i) performing a first mathematical analysis step to the Base Impedance/Frequency Data of the known particles including a first derivation analysis to provide First Derivate Impedance/Frequency of the known particles Data,
(ii) subjecting the First Derivate Impedance/Frequency Data of the known particles to a second mathematical analysis step including a second derivation analysis to provide Curvature Data the known particles, and
(iii) correlating the estimated concentration of the known particles and the Curvature Data of the known particles to provide Curvature/Concentration Data for the known particles as the correlated field/concentration data of fluid containing the known particles,
recording the Curvature/Concentration Data for the known particles in the field/concentration reference database as the correlated filed/concentration data of the known biologic particles,
the field/concentration comparison step including comparing the Curvature/Concentration Data for the particle in the input fluid with Curvature/Concentration Data for the known particles,
the field/concentration identification step of identifying each separate particle as being one or more of the known biologic particles based on the results of comparing the Curvature/Concentration Data for the particle in the input fluid with the Curvature/Concentration Data for the known particles.

In a 99th aspect, the present invention provides, as in the 98th aspect, a method wherein identifying each separate particle as being one or more of the known biologic particles based on the results of comparing the Curvature/Concentration Data for the particle in the input fluid with the Curvature/Concentration Data for the known particles comprises selecting one or more of the known particles based on a determination as to the Curvature/Concentration Data for the particle in the input fluid that is closest the Curvature/Concentration Data for one or more of the known particles.

In a 100th aspect, the present invention provides, as in any one of the 90th to 99th aspects, a method wherein the known biologic particles are selected from the group comprising bacteria and viruses, and the desired range of particle sizes and/or the desired range of particle shapes is selected having regard to the selected known biologic particles, wherein, when the particles are bacteria the range of particle sizes in the range of 0.5 um to 10 um, or 0.5 um to 5 um, and when the particles are virus the range of particle sizes is in the range of 0.1 um to 1 um, or 0.5 um to 1.05 um.

In a 101st aspect, the present invention provides, as in the 100th aspect, a method wherein the electrical field identification method is impedance spectroscopy.

In a 102nd aspect, the present invention provides, as in any one of the 90th to 101st aspects, a method wherein the first electromagnetic imaging apparatus comprises an optical microscope, the method including providing for electromagnetic detection based on optical or phase contrast microscopy.

In a 103rd aspect, the present invention provides, as in any one of the 100th to 102nd aspects, a method wherein the input fluid comprises an alcohol water solution.

In a 104th aspect, the present invention provides, as in any one of the 100th to 103rd aspects, a method wherein the focusing step includes passing the input fluid through a microfluidic particle sorting cartridge to provide in a microfluidic analysis channel of the microfluidic particle sorting cartridge the focused fluid stream.

In a 105th aspect, the present invention provides a method of identifying biologic particles in an input fluid comprising:
an electrical field analysis step of determining with an electrical field measurement apparatus electrical field characteristics of the particles in the focused fluid stream,
estimating an estimated concentration of the particles in the focused fluid stream when the electrical field characteristics is determined,
using an electrical field identification method to estimate an estimated identity of the particles in the focused fluid stream as a probability profile of one or more known biologic particles based on the determined electrical field characteristics and the estimated concentration.
wherein the electrical field identification method comprising:
i. creating correlated field/concentration data for a particle comprising:
(a) one or more of the electrical field characteristics of the particle, and (b) the estimated concentration of particles in the focused fluid stream when the one or more of the electrical field characteristics for that particle is measured creating a field/concentration reference database of the known biologic particles by creating correlated filed/concentration data of the known biologic particles by use of the electrical field identification method for particles of the known biologic particles comprising:
i. creating correlated field/concentration data for particles of the known biologic particles comprising:
(a) one or more of the electrical field characteristics of the particles of the known biologic particles, and
(b) the estimated concentration of particles of the known biologic particles in the focused fluid stream when the one or more electrical field characteristics for each particle of the known biologic particles is measured;
recording correlated filed/concentration data of the known biologic particles in the field/concentration reference database as the correlated filed/concentration data of the known biologic particles,
creating correlated field/concentration data for each separate particle of the particles of:
(a) one or more of the electrical field characteristics of each separate particle, and
(b) the estimated concentration of the particles in the focused fluid stream when the one or more electrical field characteristics for that each separate particle is measured,
a field/concentration comparison step of comparing for each particle the correlated field/concentration data of the electrical field measurements and the estimated concentration for each separate particle with correlated field/concentration data of electrical field measurements and concentration of the known biologic particles in the field/concentration reference database.
a field/concentration identification step of identifying each separate particle as being one or more of the known biologic particles based on the results of the field/concentration comparison step.

In a 106$^{th}$ aspect, the present invention provides, as in the 105$^{th}$ aspect, a method wherein identifying each separate particle as being one or more of the known biologic particles based on the field/concentration comparison step comprises selecting one or more of the known biologic particles based on a determination as to the field/concentration data of the known biologic particles that is closest the field/concentration data of each separate particle.

In a 107$^{th}$ aspect, the present invention provides, as in the 105$^{th}$ or 106$^{th}$ aspect, a method wherein the electrical field analysis step includes subjecting the fluid to impedance spectroscopy to determine for a particle of the particles in the fluid Base Impedance/Frequency Data regarding the relationship of impedance vs frequency of the fluid containing the particle,
the estimating of the estimated concentration of the particles in the focused fluid stream on which the Base Impedance/Frequency Data are determined,
the electrical field identification method includes:
(i) performing a first mathematical analysis step to the Base Impedance/Frequency Data including a first derivation analysis to provide First Derivate Impedance/Frequency Data,
(ii) subjecting the First Derivate Impedance/Frequency Data to a second mathematical analysis step including a second derivation analysis to provide Curvature Data, and
(iii) correlating the estimated concentration and the Curvature Data to provide Curvature/Concentration Data for the particle as the correlated field/concentration data.

In a 108$^{th}$ aspect, the present invention provides, as in the 107$^{th}$ aspect, a method wherein the field/concentration comparison step including comparing the Curvature/Concentration Data for the particle in the input fluid with Curvature/Concentration Data created for the known particles.

In a 109$^{th}$ aspect, the present invention provides, as in the 108$^{th}$ aspect, a method wherein the field/concentration reference database of the known particles includes Curvature/Concentration Data created for the known particles,
creating the Curvature/Concentration Data created for the known particles by subjecting the known particles to impedance spectroscopy to determine for a particle of the known particles in a focused fluid stream of the known particles Base Impedance/Frequency Data regarding the relationship of impedance vs frequency of the known particles,
the estimating of the estimated concentration of the known particles in the fluid stream on which the Base Impedance/Frequency Data are determined,
performing the electrical field identification method including:
(i) performing a first mathematical analysis step to the Base Impedance/Frequency Data of the known particles including a first derivation analysis to provide First Derivate Impedance/Frequency of the known particles Data,
(ii) subjecting the First Derivate Impedance/Frequency Data of the known particles to a second mathematical analysis step including a second derivation analysis to provide Curvature Data the known particles, and
(iii) correlating the estimated concentration of the known particles and the Curvature Data of the known particles to provide Curvature/Concentration Data for the known particles as the correlated field/concentration data of fluid containing the known particles,
recording the Curvature/Concentration Data for the known particles in the field/concentration reference database as the correlated filed/concentration data of the known biologic particles,
the field/concentration comparison step including comparing the Curvature/Concentration Data for the particle in the input fluid with Curvature/Concentration Data for the known particles,
the field/concentration identification step of identifying each separate particle as being one or more of the known biologic particles based on the results of comparing the Curvature/Concentration Data for the particle in the input fluid with the Curvature/Concentration Data for the known particles.

In a 110$^{th}$ aspect, the present invention provides, as in the 109$^{th}$ aspect, a method wherein identifying each separate particle as being one or more of the known biologic particles based on the results of comparing the Curvature/Concentration Data for the particle in the input fluid with the Curvature/Concentration Data for the known particles comprises selecting one or more of the known c particles based on a determination as to the Curvature/Concentration Data for the particle in the input fluid that is closest the Curvature/Concentration Data for one or more of the known particles.

In a 111$^{st}$ aspect, the present invention provides, as in any one of the 105$^{th}$ to 110$^{th}$ aspects, a method wherein the known biologic particles are selected from the group comprising bacteria and viruses.

In a 112$^{nd}$ aspect, the present invention provides, as in any one of the 105$^{th}$ to 111$^{th}$ aspects, a method wherein the electrical field analysis step measures one or more of electrical impedance, electrical resistance and electrical capacity.

In a 113$^{th}$ aspect, the present invention provides, as in the 105$^{th}$ to 112$^{nd}$ aspects, a method wherein the electrical field identification method is impedance spectroscopy.

In a 114$^{th}$ aspect, the present invention provides, as in any one of the 105$^{th}$ to 113$^{th}$ aspects, a method wherein the input fluid comprises an alcohol water solution.

In a 115$^{th}$ aspect, the present invention provides, as in any one of the 105$^{th}$ to 114$^{th}$ aspects, a method wherein the input fluid comprises an alcohol water solution comprising at least 40% alcohol.

In a 116$^{th}$ aspect, the present invention provides, as in any one of the 105$^{th}$ to 115$^{th}$ aspects, a method wherein the input fluid comprises an alcohol water solution comprising at least 40% alcohol isopropanol.

In a 117$^{th}$ aspect, the present invention provides, as in the 116$^{th}$ aspect, a method wherein the alcohol water solution consists of water and isopropanol.

In a 118$^{th}$ aspect, the present invention provides, as in any one of the 105$^{th}$ to 107$^{th}$ aspects, a method wherein the known biologic particles are selected from bacteria.

In a 119$^{th}$ aspect, the present invention provides a method of electrical field analysis of particles in an input fluid comprising:

determining with an electrical field measurement apparatus electrical field characteristics of the particles in the input fluid, and wherein the input fluid comprises an alcohol water solution.

In a 120$^{th}$ aspect, the present invention provides, as in the 119$^{th}$ aspect, a method wherein the alcohol water solution includes an alcohol selected from isopropanol, ethanol and mixtures of isopropanol and ethanol.

In a 121$^{st}$ aspect, the present invention provides, as in the 119$^{th}$ or 120$^{th}$ aspect, a method wherein the alcohol water solution comprises in the range of 25% to 80% alcohol by volume.

In a 122$^{nd}$ aspect, the present invention provides, as in the 119$^{th}$ or 120$^{th}$ aspect, a method wherein the alcohol water solution comprises at least 40% alcohol.

In a 123$^{th}$ aspect, the present invention provides, as in the 119$^{th}$ or 120$^{th}$ aspect, a method wherein the alcohol water solution comprises at least 60% alcohol.

In a 124$^{th}$ aspect, the present invention provides, as in any one of the 119$^{th}$ to 123$^{rd}$ aspects, a method wherein the alcohol water solution comprises at least 40% by volume isopropanol.

In a 125$^{th}$ aspect, the present invention provides, as in any one of the 119$^{th}$ to 124$^{th}$ aspects, a method wherein the alcohol consists of isopropanol.

In a 126$^{th}$ aspect, the present invention provides, as in any one of the 119$^{th}$ to 125$^{th}$ aspects, a method wherein the alcohol water solution consists of water and isopropanol.

In a 127$^{th}$ aspect, the present invention provides, as in any one of the 119$^{th}$ to 125$^{th}$ aspects, a method wherein the known biologic particles are selected from the group comprising bacteria and viruses.

In a 128$^{th}$ aspect, the present invention provides, as in any one of the 1$_{19}$$^{th}$ to 127$^{th}$ aspects, a method wherein the electrical field analysis step measures one or more of electrical impedance, electrical resistance and electrical capacity.

In a 129$^{th}$ aspect, the present invention provides, as in any one of the 119$^{th}$ to 128$^{th}$ aspects, a method wherein the electrical field identification method is impedance spectroscopy.

In a 130$^{th}$ aspect, the present invention provides, as in any one of the 19 to 129$^{th}$ aspects, a method including a focusing step in which the input fluid is sorted into a focused fluid stream including particles from the input stream in a desired range of particle sizes, and the determining with the electrical field measurement apparatus of the electrical field characteristics of the particles in the input fluid is carried out on the particles in the focused fluid stream.

In a 131$^{st}$ aspect, the present invention provides, as in any one of the 119$^{th}$ to 130$^{th}$ aspects, a method wherein the known biologic particles are selected from bacteria.

BRIEF DESCRIPTION OF THE DRAWINGS

Further aspects and advantages of the present invention will occur from the following description taken together with the accompanying drawings in which:

FIG. 9 is a table illustrating the imaging characterises of; area, circularity, aspect ratio, solidity, integrated density, perimeter and Faret showing for four different bacteria typical characteristics for that bacteria illustrated as a horizontal line representative of the range of measured values over which the bacteria may be expected to be found;

FIG. 10A is graph showing the four types of bacteria indicated on the graph namely, *Staphylococcus aureus* (SA), *Corynebacterium jelkeium* (CJ), *Escherichia coli* (*E. coli*), and *Pseudomonas aeruginosa* (PA), the characteristic Area on the horizontal scale of units of square millimeters;

FIGS. 10B to 10G are graphs similar to FIG. 10A but showing for the same four types of bacteria the characteristics of, respectively, Circularity, Aspect Ratio (AR), Solidity, Integrated Density. Perimeter and Faret's Diameter (Faret) in suitable relative units for each characteristic:

FIG. 12 is a matrix table which shows the results of tests conducted towards determining whether the use of an optical identification method in accordance with the present invention correctly identifies known bacteria and, on FIG. 12, the horizontal row represents the True Class being the identity of the known bacteria being subjected to an electromagnetic imaging identification method in accordance with the present invention and the vertical columns represent the Predicted Class being the probability that the electromagnetic imaging identification method in accordance with the present invention identified what bacteria as being identified by percent probability:

DETAILED DESCRIPTION OF THE DRAWINGS

Imaging Characteristics Reference Database

Reference is made to FIGS. 9 to 12 illustrating an example of the creation of an imaging characteristics reference database and its use in identifying particles in accordance with the present invention.

In accordance with the present invention, multiple sample fluids were created, each in solution of 70% by volume isopropanol and 30% water and each sample having one only of each known bacteria SA, CJ, EC and PA. As a first electromagnetic imaging apparatus, an optical microscope was used to determine for individual particles of the bacteria of the seven optical characteristics set out in Table ion FIG. 9. The results of the optical analysis developed data is represented in the graphs shown on FIGS. 10A to 10F, respectively, for each of the seven optical characteristics of Circularity. Aspect Ratio (AR), Solidity, Integrated Density, Perimeter and Faret's Diameter (Faret).

Figure 11:
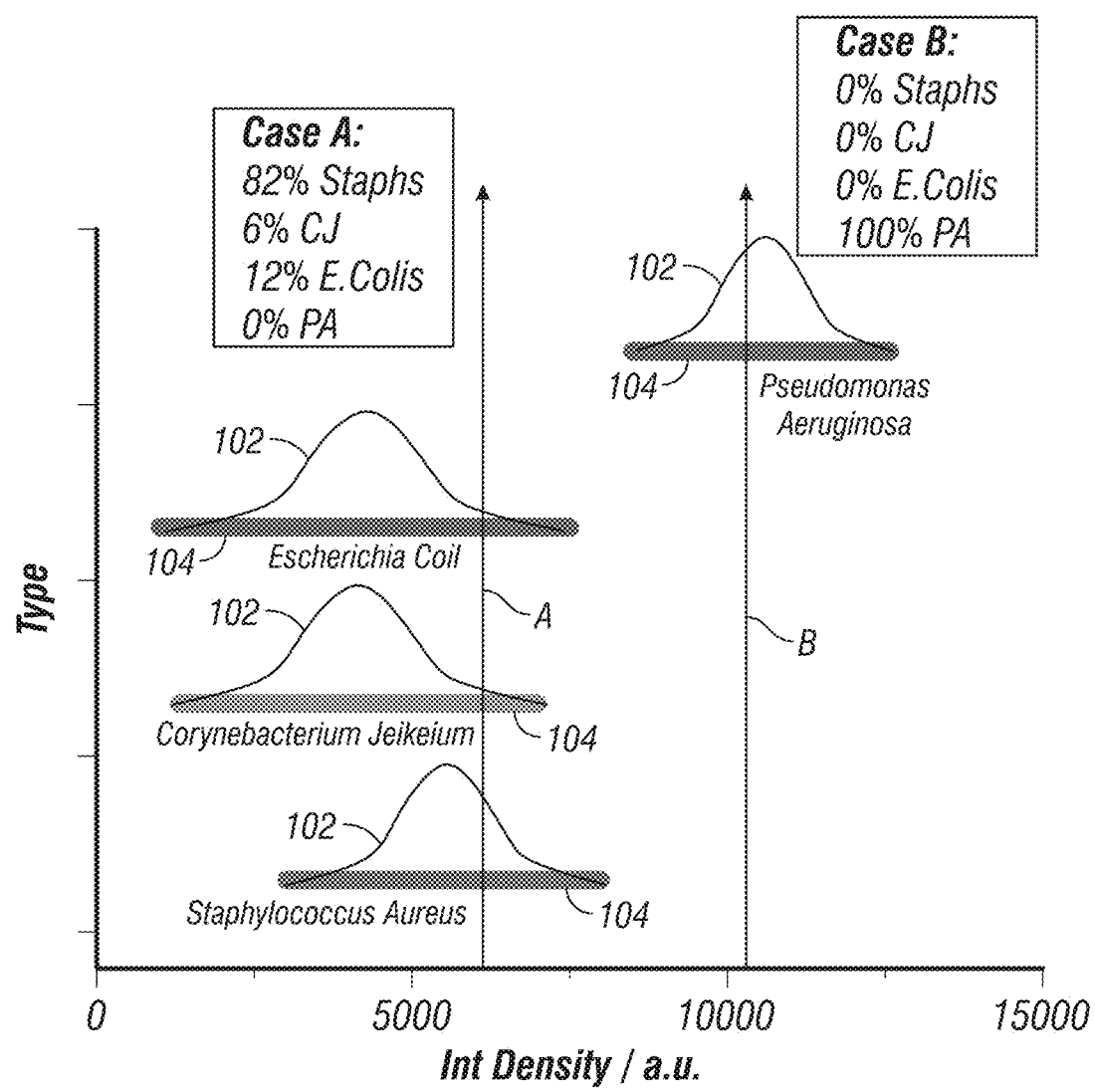
FIG. 11 is an enlarged view of the graph of FIG. 10D, however, showing additional information.

For example, the optical characteristic of Integrated Density was determined from a large number of samples and multiple determinations for each of SA, CJ, EC and PA which, for each, the data was analysed to develop, based on a probability and statistics analysis, a probability curve shown as a normal distribution or bell curve for each of the four bacteria illustrated as a respective bell curve 102 as shown on FIG. 11 relative to the horizontal axis of Integrated Density values. FIG. 11 shows below each bell curve 102 a range marked as a range line 104 representing the range of Integrated Density values of the respective bell curve 102 for each respective bacteria.

The graph in FIG. 11 is reproduced as the graph in FIG. 10E with the bell curves 102 deleted.

In the same manner that the bell curve 102 and the range line 104 were developed for Integrated Density for each of SA, CJ, EC and PA, the optical characteristic of the other six optical characteristics in Table 1 on FIG. 9 were obtained on the same multiple samples and for each other of the six optical characteristic, with the data similarly analysed to develop a bell curve for each of the other six optical characteristics for each of the four bacteria, and from these bell curves a range line was developed representing the range of values for the respective optical characteristics for each of the four bacteria. Such range lines are represented for Area, Circularity, Aspect Ratio (AR), Solidity, Perimeter and Faret on FIGS. 10A to 10D, 10F and 10G, respectively.

The data from this assessment of all of the seven optical characteristics and data derived therefrom including the bell curves and range lines was recorded and formed into an image reference database.

As an example referred to as Case A, the same microscope was operated to assess the optical characteristics a particle A of a bacteria selected from one of SA, CJ. EC and PA, by placing the bacteria particle A in a solution of 70% by volume isopropanol and 30% water by volume in a concentration of about $1.1 \times 10^5$ per ml to create for the particle A data representative of each of the seven optical characteristics in Table 1 an estimated value for the bacteria for each of the seven optical characteristics.

Referring to FIG. 11, for Case A the estimated value of the characteristic of Integrated Density for particle A is a value on the horizontal axis that is represented by and from which the vertical line A extends vertically upward. Insofar as the vertical line A intersects with a bell curve 102 and range line 104 for any one of the four bacteria the points of intersection on the bell curve 102 and the range line 104 represents a relative probability that in Case A the unknown bacteria is predicted to represent such respective known bacteria is selected as being equal to the probability represented by the bell curve 102 at the points of intersection. As seen for Case A on FIG. 11 the points of intersection represents: for SA 49.2%, for CJ 3.6%, for EC 7.2% and for PA 0%. Adding the probabilities at the points of intersection namely (4.9+3.6+7.2+0) for a total of 60 the normalized probability based on a total of the 60 representing 100% is (49.2/60) being 82% for SA, (3.6/60) being 6% for CJ, (7.2/60) being 12% for EC and (0/60) being 0% for PA. This data is recorded in a matrix form such as in Table 2 below.

TABLE 2

Case A

| Parameter | Known Selected Bacteria | | | |
|---|---|---|---|---|
| | SA | CJ | EC | PA |
| Integrated Density | 82% | 6% | 12% | 0% |
| Area | | | | |
| Perimeter | | | | |
| Circularity | | | | |
| Aspect Ratio (AR) | | | | |
| Solidity | | | | |
| (Maximum) Feret's Diameter | | | | |
| Linear Weighted Estimate (Total/7) | | | | |

For each of the other seven characteristics for Case A similarly using the same microscope, an estimated value of each of the other seven characterises are determined, from which estimated value a vertical line is determined to intersect with a location point on the range line for each of the four bacteria on the appropriate of FIGS. 10A to 10G for a respective characteristic, and from which a normalized probability can be determined in the same manner as described above with the Integrated Density for particle A, the unknown bacteria A represents each one of the respective bacteria SA, CJ, EC and PA for each respective characteristic. Such normalized probability that the unknown bacteria A represents each one of the respective bacteria SA, CJ, EC and PA for each respective characteristic is entered into Table 2 and from the normalized probabilities in Table 2 a calculation is made as to a primary estimated identity of the unknown bacteria A as a primary probability profile that the bacteria A of Case A is one or more or each of the bacteria of the selected known bacteria SA, CJ, EC and PA. The calculation of the primary estimated identity may be made by use of one or algorithms.

These one or more algorithms can be created, selected and used to estimate the primary estimated identity of the bacteria A of Case A as being one or more or each of the bacteria of the selected known bacteria SA, CJ, EC and PA. One simple method is to use as an algorithm, a linear weighted average, for example, of the sum of each column in Table 2 divided by 7 which is shown on Table 2 as the last row labelled Linear Weighted Estimate. Other functions and algorithms may be used to estimate the primary estimated identity and experience from analysing known samples can be factored into any algorithms as, for example, to weigh certain characteristics more highly than others depending on various and selected of the data.

As another example referred to Case B, the same microscope was operated to assess the optical characteristics a particle of a bacteria B selected from one of SA, CJ, EC and PA, by placing the bacteria particle B in a solution of 70% by volume isopropanol and 30% water by volume in a concentration of about $1.4 \times 10^7$ per ml to create for the particle B data representative of each of the seven optical characteristics in Table 1, an estimated value for the bacteria for each of the seven optical characteristics.

Referring to FIG. 11, for Case B, the estimated value of the characteristic of Integrated Density for particle B is represented by the vertical line B using the same method as discussed with Case A, a determination is made as to where the vertical line B intersects with the bell curve 102 and range line 104 for each of the four bacteria and from which intersections the probability that in Case B the unknown bacteria B is predicted to represent each respective bacteria is selected as being equal to the probability determined by the bell curve 102. As seen for Case B on FIG. 11, the vertical line B intersects merely with the bell curve 102 and range line 104 for PA at 81% and for the other three of SA, CJ and EC at 0%. A calculation of (0+0+0+81) gives for PA a normalized probability of (81/81) being PA 100% and a 0% for each of SA, CJ and EC. This data is recorded in a matrix form such as in Table 3 below.

TABLE 3

Case B

| Parameter | Known Selected Bacteria | | | |
|---|---|---|---|---|
| | SA | CJ | EC | PA |
| Integrated Density | 0% | 0 | 0% | 100% |
| Area | | | | |
| Perimeter | | | | |
| Circularity | | | | |
| Aspect Ratio (AR) | | | | |
| Solidity | | | | |
| (Maximum) Feret's Diameter | | | | |
| Linear Weighted Estimate (Total/7) | | | | |

As was done for Case A, for Case B using the same methods as in Case A, for each of the other seven characteristics for Case B a determination is made as to the normalized probability that the unknown bacteria B represents each one of the respective bacteria SA, CJ, EC and PA for each respective characteristic and entered into Table 3. Subsequently the primary estimated identity of the bacteria B of Case B as a primary probability profile of one or more or each of the known bacteria SA, CJ, EC and PA is calculated in the same manner as in Case A, using one or more algorithms based on the normalized probability for each of the characteristics in Table 3.

In the examples of Case A and Case B, seven optical characteristics are measured and used in calculating the primary estimated identity. This is not necessary. One or more than one of these seven optical characteristics may be measured and used in calculating the primary estimated identity, and as well other optical characteristics may be measured and used towards calculating the primary estimated identity.

Reference is made to the table of FIG. 12 which shows the results of cross-tests conducted towards determining whether the use of an optical identification method in accordance with the present invention correctly identifies a particle of a known bacteria when the known bacteria particle is analysed using the optical camera to determine imaging characteristics which are then compared with data in the Optical Characteristics Imaging Reference Database.

To develop the data for FIG. 12, the optical camera was operated to assess the optical characteristics of a large number of samples, each sample being limited to containing one of six known bacteria SA, CJ, EC, PA, SE and SP, by placing the known bacteria in a solution of 70% by volume isopropanol and 30% water by volume to create for these known bacteria data representative of each of the 7 optical characteristics in Table 1. For each optical characteristic, the data was similarly analysed to develop a bell curve for each of the seven optical characteristics for each of the six bacteria representing the values for the respective optical characteristics for each of the eight bacteria. As an algorithms a linear weighted average was used to estimate the primary estimate of probability that any bacteria tested would be one or more of each of the six selected known bacteria SA, CJ, EC, PA, SE and SP.

Individual test samples of each of the six selected known bacteria were created by placing the one bacteria in a solution of 70% by volume isopropanol and 30% water by volume. The optical camera was operated to assess the optical characteristics of a number of such cross test samples to create cross-test data representative of each of the seven optical characteristics. The selected algorithm was utilized so as, based on the cross-test data, to estimate the primary estimated identity as a primary probability profile that the tested bacteria is one or more of the six selected known bacteria. The results of the testing and analysis of the cross-test samples are shown on FIG. 12 on which the vertical axis is the True Class, representing in each separate horizontal row the known bacteria of the cross-test samples, and the horizontal axis is the Predicted Class representing in each separate vertical column the bacteria that is the bacteria estimated to be in cross-test samples. FIG. 12 shows a matrix of the primary estimated identity being a primary probability profile representing the probability that the tested bacteria is one or more of the six selected known bacteria. If the method of identification were perfect then the table would have a diagonal line of values of 100% and all the other values would be 0%. The matrix of FIG. 12 is useful to show as seen in the diagonal boxes, the primary probability profile or probability that the method correctly identifies the bacteria, is for example, 90% for PA but only 45% for SP.

The continued testing of groups of known bacteria using varying sorting apparatus, electromagnetic imaging apparatus, fluids, characteristics and algorithms to develop extensive Optical Characteristics Imaging Reference Databases, and then cross-testing the accuracy of the apparatus and methods against known bacteria, is a vehicle to select and enhance the apparatus and methods of the present invention.

Field/Concentration Characteristics

In accordance with the present invention, in a preferred arrangement, a fluid containing a particle in a "Particle Concentration" is subjected to impedance spectroscopy to determine for each particle in the fluid containing the particle "Base Impedance/Frequency Data" regarding the relationship of impedance vs frequency of the fluid containing the particle, The Impedance/Frequency Data is subjected to a first mathematical analysis step including a first derivation analysis to provide "First Derivate Impedance/Frequency Data". The "First Derivate Impedance/Frequency Data" is subjected to a second mathematical analysis step including a second derivation analysis to provide "Second Derivate Impedance/Frequency Data", herein referred to as "Curvature Data". The "Curvature Data" is correlated to the "Particle Concentration" to provide "Curvature/Concentration Data". The present invention at least in part arises in appreciating that the "Curvature/Concentration Data" for a particle provides a basis for distinguishing the particle from other particles, and preferably for assisting in the identification of the particle to develop the secondary estimated identity of a particle as a secondary probability profile of one or more known particles, as by comparing the "Curvature/Concentration Data" for a particle with "Curvature/Concentration Data" of known particles.

The first mathematical analysis step preferably involves subjecting the Impedance/Frequency Data to a first derivation analysis to produce Raw first derivation data which is preferably subjected to a soothing analysis to produce Smoothed first derivation data Preferably, the Smoothed first derivation data is analysed to identify one or more selected criterion and as a function of the one or more criterion a portion of the smoothed first derivation data is selected and subjected to the second derivation analysis to produce the Curvature Data.

The method preferably includes creating a field/concentration reference database of selected known particles by creating the Curvature/Concentration Data of the selected known particles and recording the Curvature/Concentration Data of the selected known particles in a field/concentration reference database. Comparison of the Curvature/Concentration Data determined for an unknown particle in a comparison step is compared to the Curvature/Concentration Data of the selected known biologic particles in the field/concentration reference database towards assisting in determining if there is any relationship or similarity.

Reference is made to FIGS. 13 to 18 illustrating an example of the creation of a field/concentration reference database and its use in distinguishing particles.

Multiple sample fluids were created each in solution of 70% by volume isopropanol and 30% water and each sample having one only of the known bacteria *Escherichia coli* (*E. colis*), *Pseudomonas aeruginosa* (Pseudos), and *Staphylococcus aureus* (Staphs) in a different known concentration. As an electromagnetic imaging apparatus, an impedance spectrograph was used to determine for individual particles of the bacteria in each sample the magnitude of impedance at multiple different frequencies. The magnitude of impedance is in units of ohms. The frequency is in Hertz.

Figure 13A:
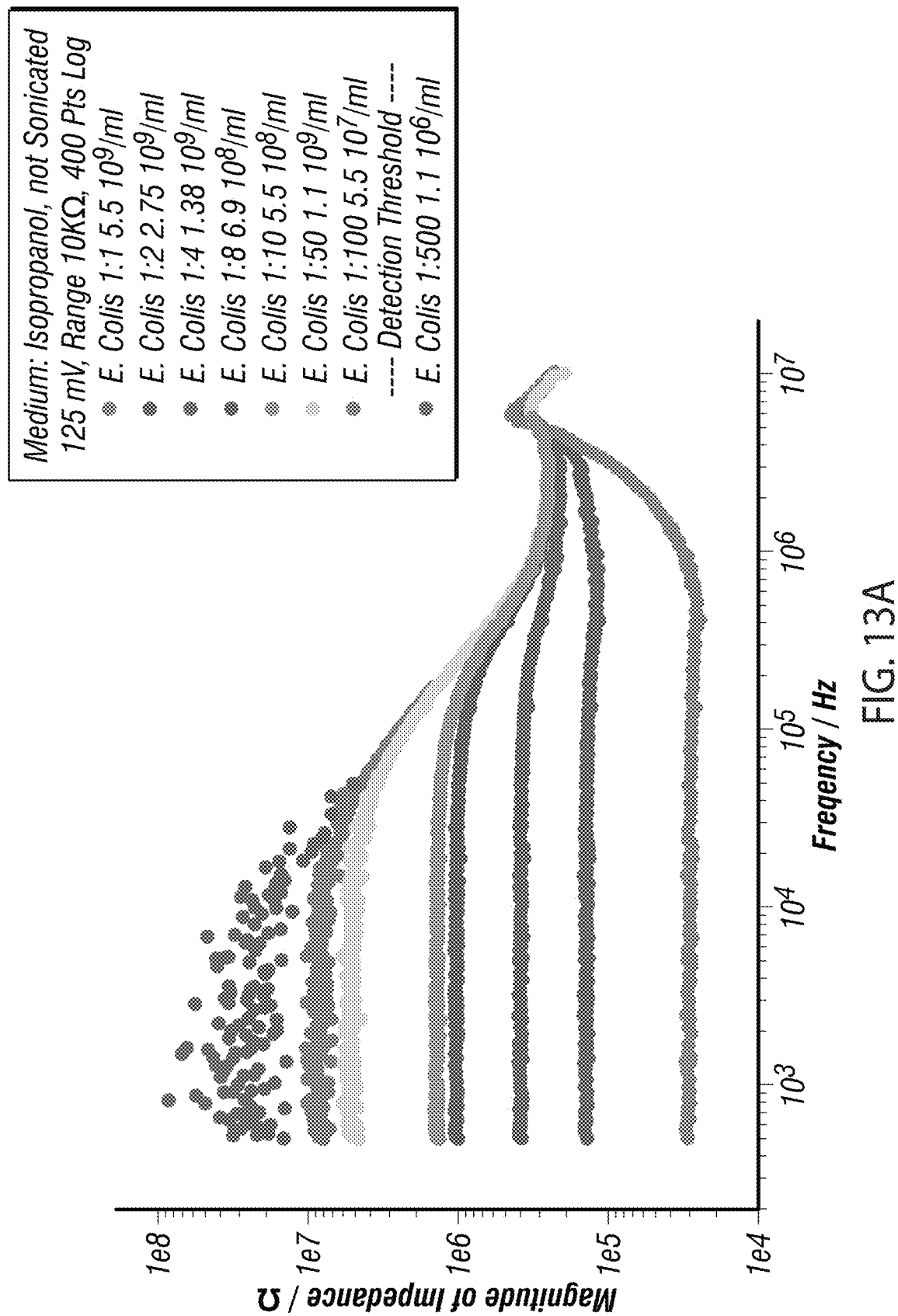
FIG. 13A is a graph of Base Impedance/Frequency Data showing of impedance magnitude in Ω ohms vs frequency in Hz Hertz for different fluids containing Escherichia coli (E. colis) particles in the different concentrations indicated in the box in a fluid of 70% isopropanol by volume and 30% water by volume.
Figure 13B:
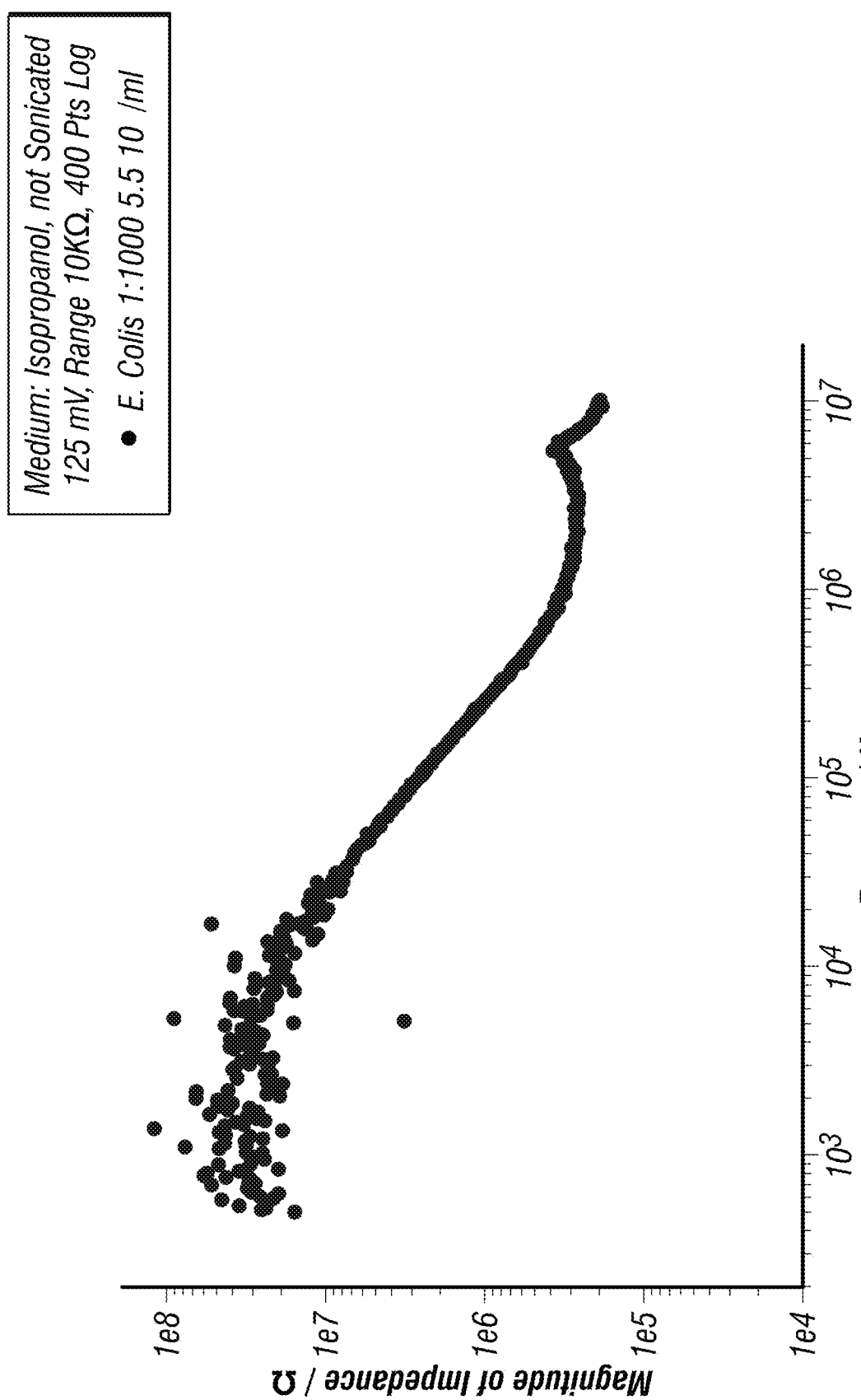
FIG. 13B is a graph the same as in FIG. 13A but of Base Impedance/Frequency Data showing of impedance magnitude in Ω ohms vs frequency in Hz Hertz for another fluid containing Escherichia coli (E. colis) particles in the concentration indicated in the box in a fluid of 70% isopropanol by volume and 30% water by volume. In this particular case, data regarding the magnitude of impedance are analysed and information regarding the phase of impedance are not analysed. The analysis and Figures, including FIGS. 13 to 19, contains only Impedance/Frequency Data based on the magnitude of the impedance.

The data representing the magnitude of impedance at multiple different frequencies for the samples with different concentrations of *E. colis* are shown in FIGS. 13A and 13B which show a separate line for the magnitude of impedance at each of the different frequencies.

Figure 14:
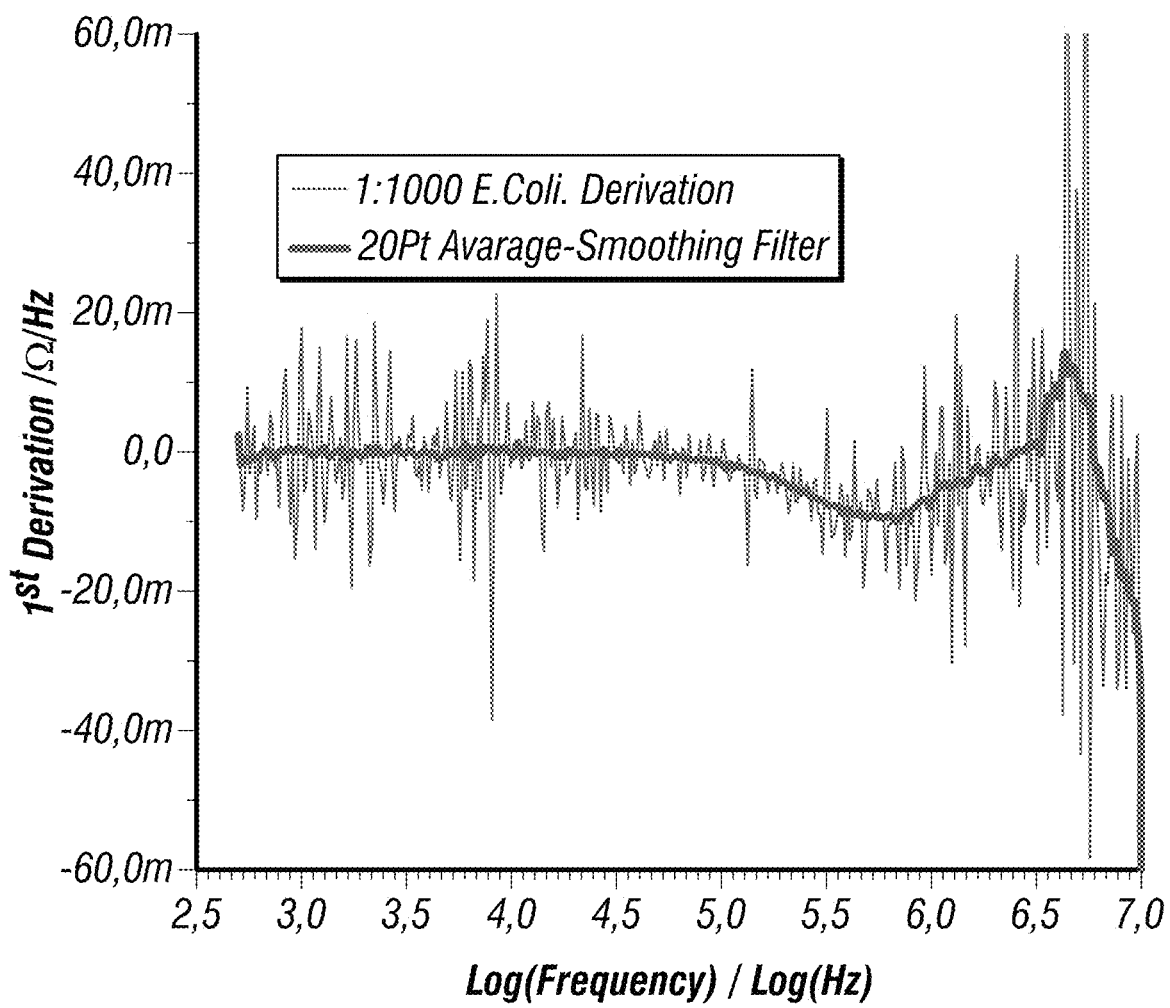
FIG. 14 is a graph showing a 1st Derivation of the Base Impedance/Frequency Data of FIG. 13b for the E. colis fluid identified on FIG. 13b as E. colis 1:1000 with the 1:1000 concentration, with FIG. 14 showing the First Derivate Impedance/Frequency Data as data calculated by a first derivation and showing the data after being smoothed by a smoothing step using a 20 point average smoothing filter.

The data of FIGS. 13A and 13B for each concentration of *E. colis* was subjected to analysis including mathematical derivation. For example, on FIG. 13B, the data representing the sample "*E. colis* 1:1000" has been subjected to a standard derivation to determine the rate at which the impedance changes with changes in frequency so as to become the data represented by FIG. 14 showing as the undulating line the First Derivative of the magnitude of impedance at multiple different frequencies, with the First Derivative indicated in units ohms/Hertz and the frequency in hertz. The data represented by the First Derivative in FIG. 14 is subjected to a mathematical smoothing operation using a 20 point averaging filter so as to smooth the data and to become the Smoothed First Derivative data represented by the on FIG. 14.

Figure 15:
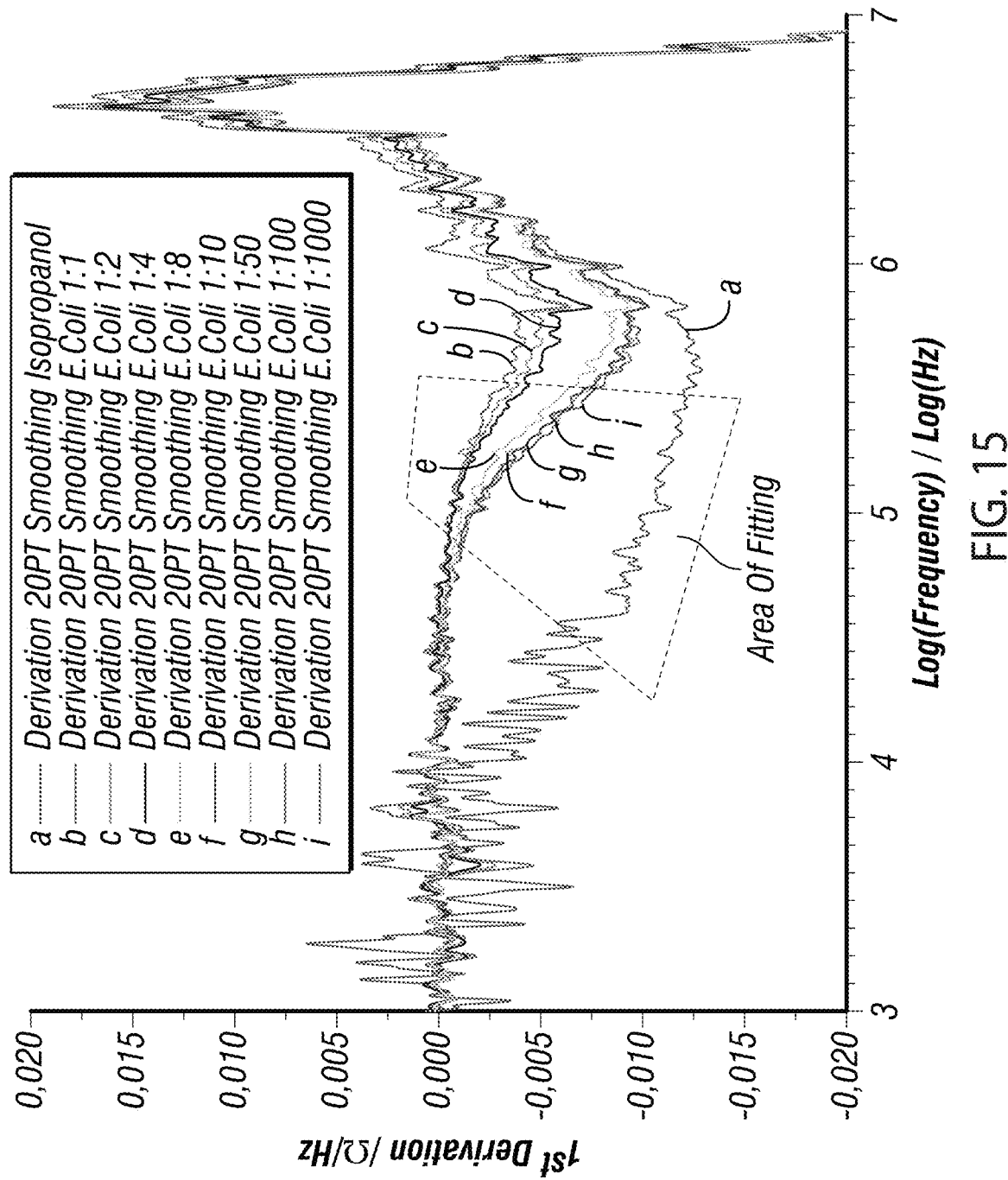
FIG. 15 a graph showing, for 8 of the different fluids containing E. colis particles identified in the box on FIG. 15 by names, corresponding to many of those fluids with the same name on FIGS. 13A and 13B, the 1st Derivation of the Base Impedance/Frequency Data after being smoothed by a smoothing step using the 20 point average smoothing filter, and each of FIGS. 15A to 15I is a graph the same as FIG. 15 but each showing merely for one of the fluids a to i on FIG. 15 respectively, the 1st Derivation of the Base Impedance/Frequency Data after being smoothed by a smoothing step using the 20 point average smoothing filter.
Figure 15A:
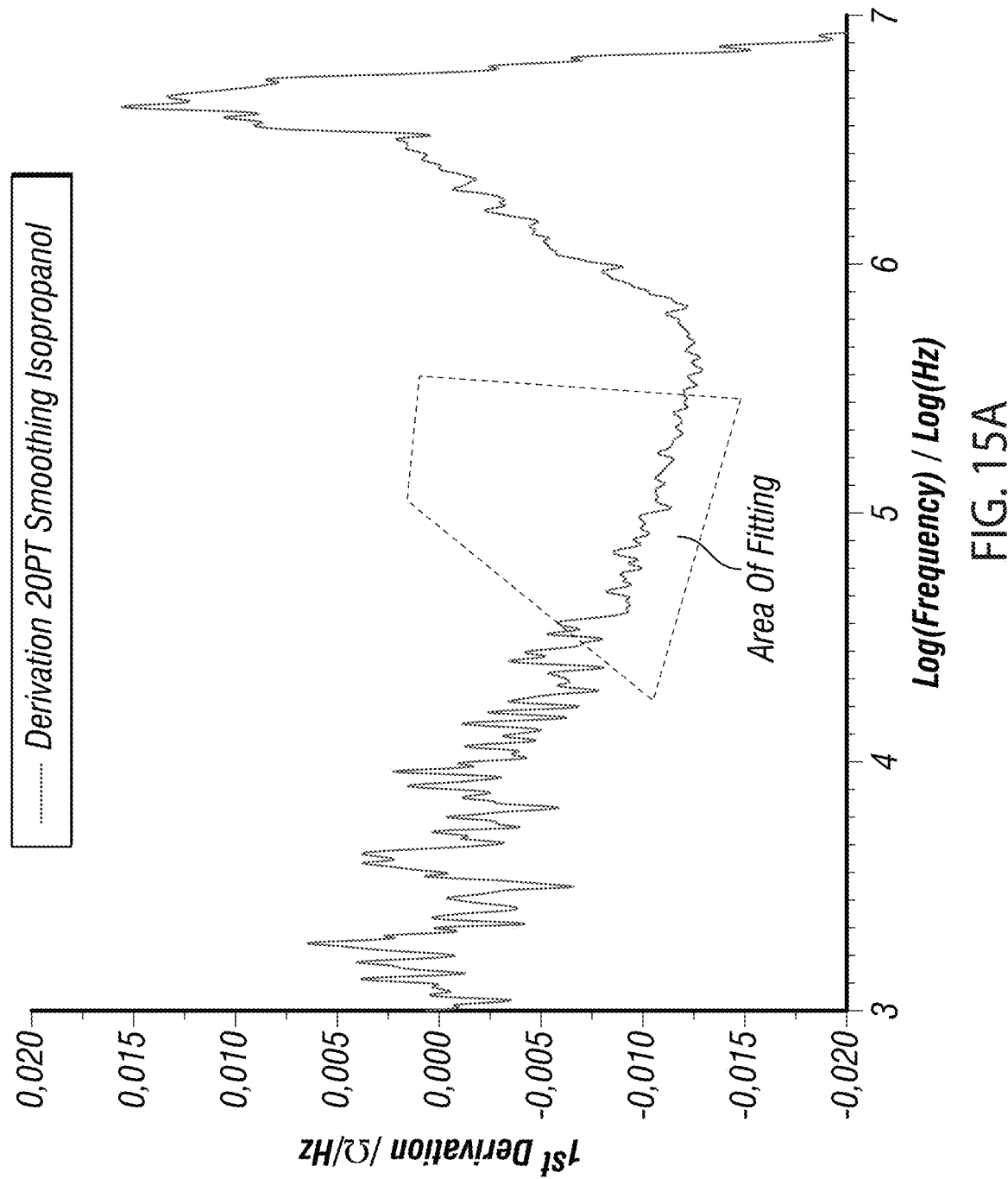
Figure 15B:
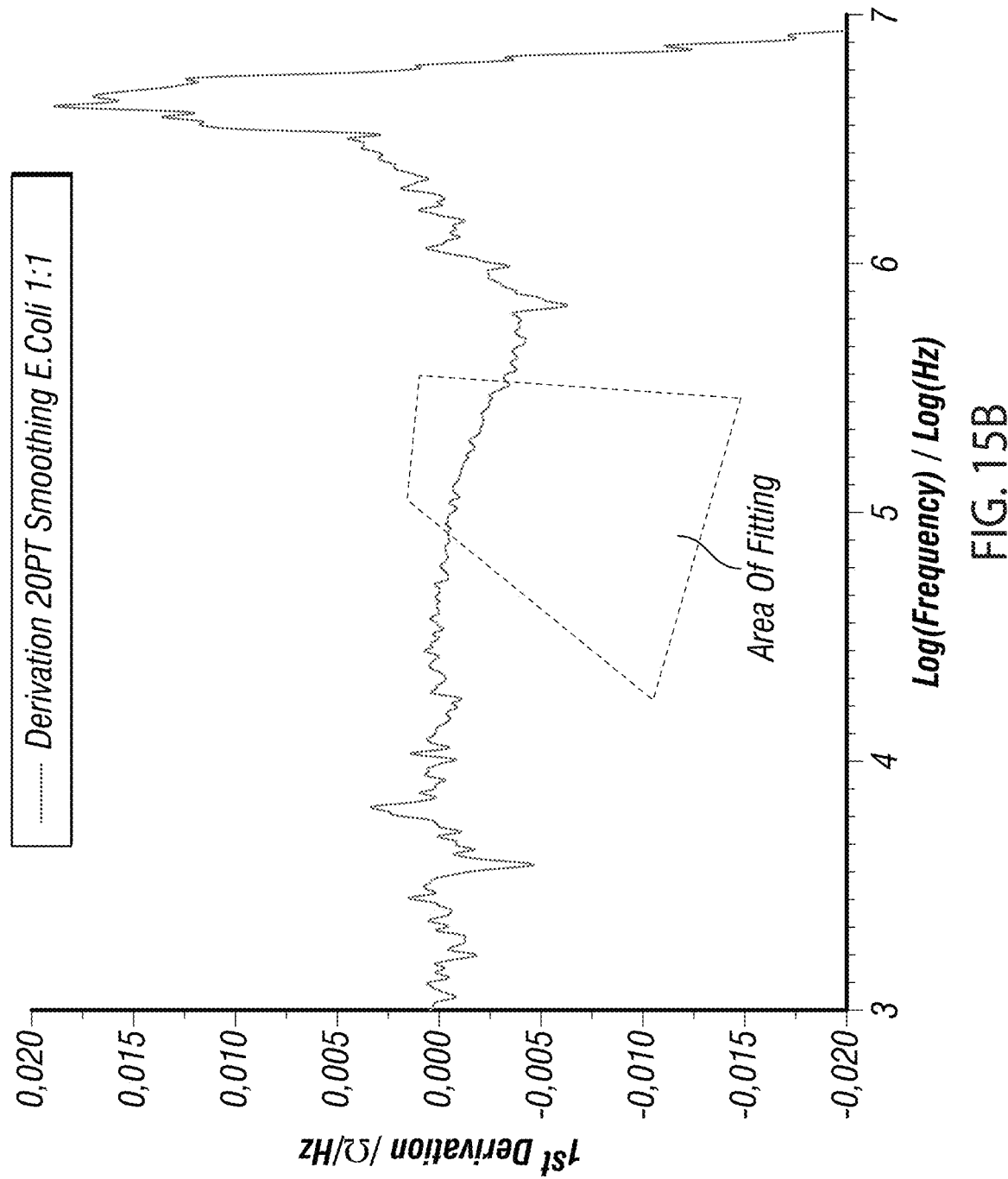
Figure 15C:
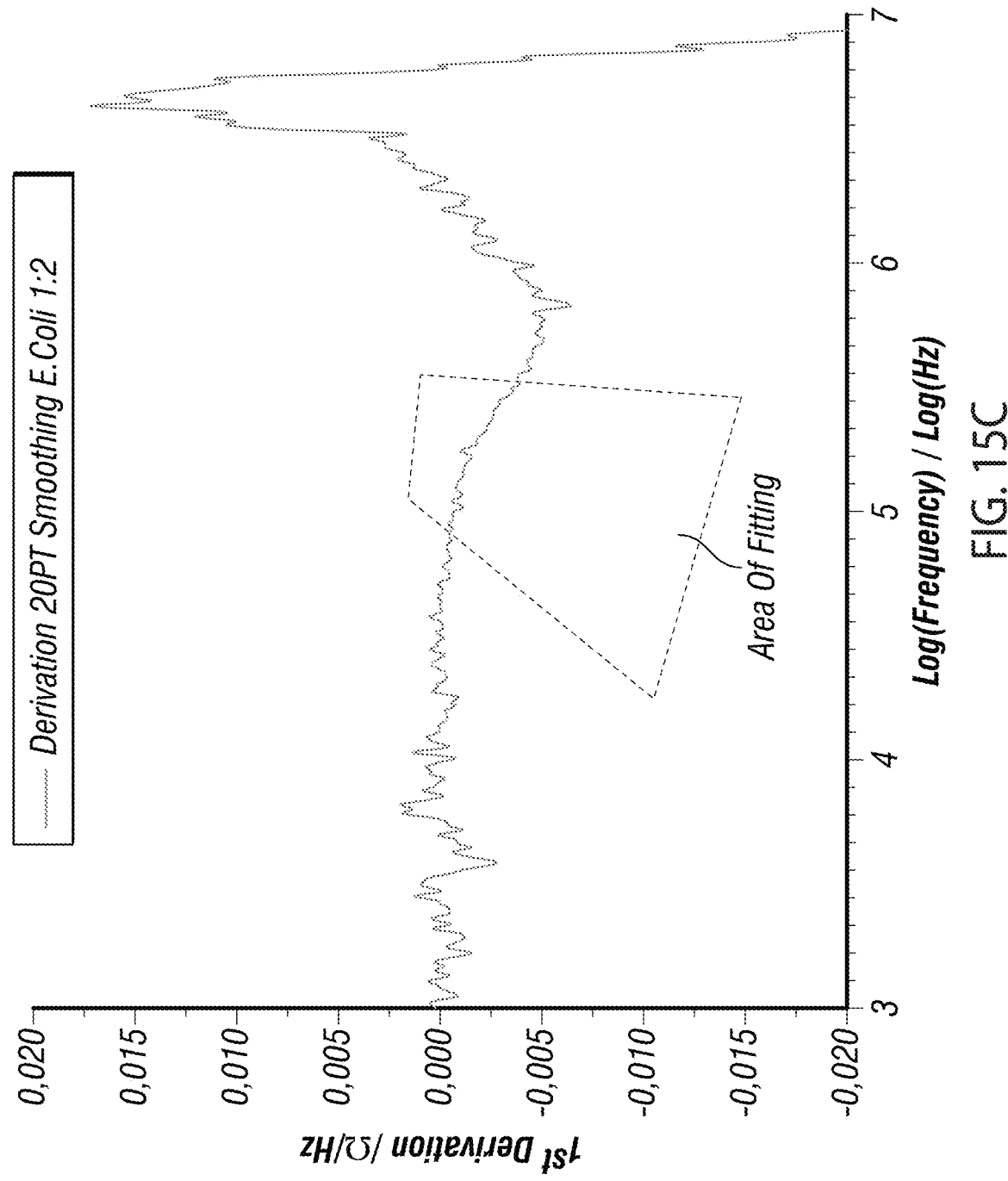
Figure 15D:
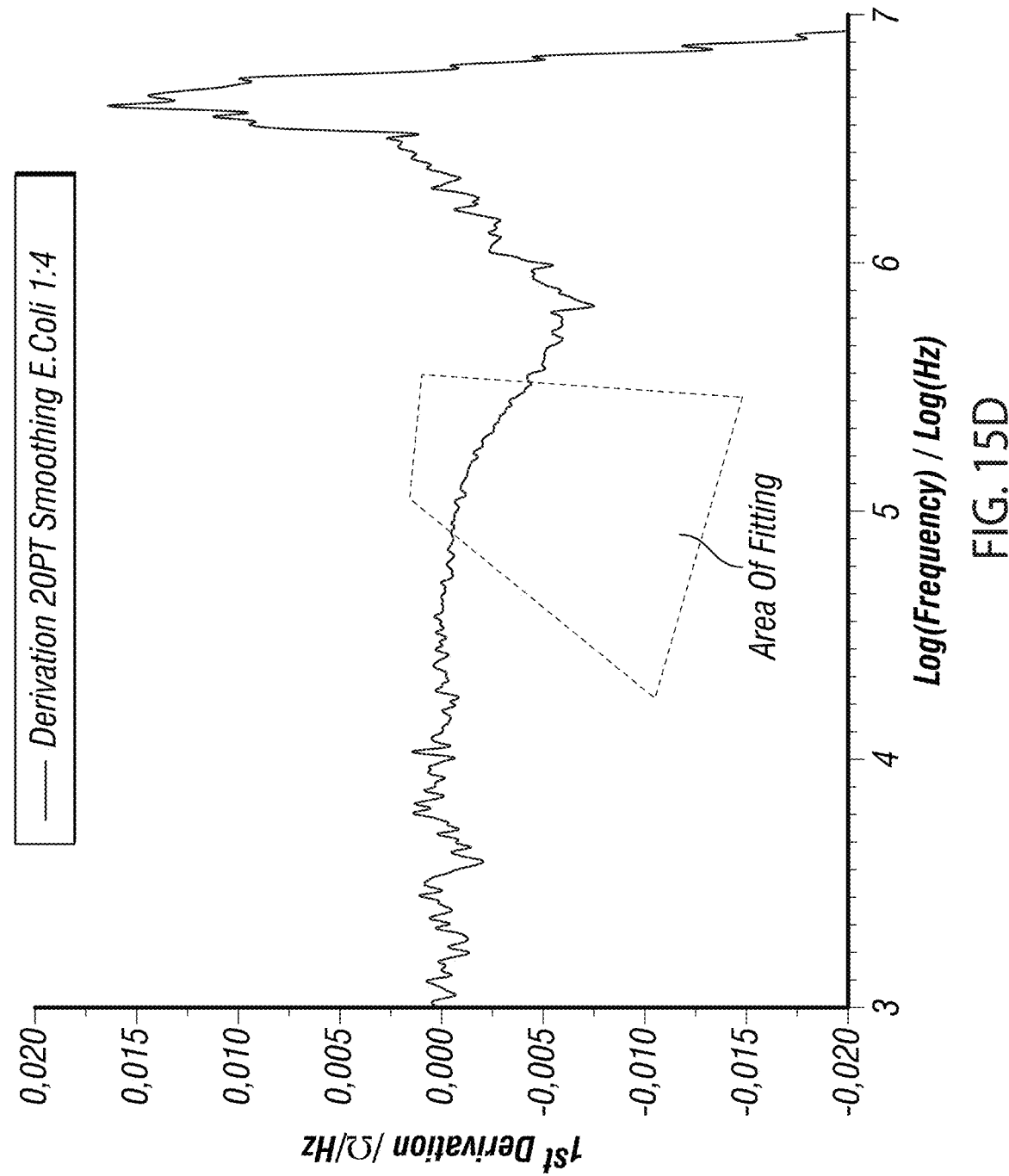
Figure 15E:
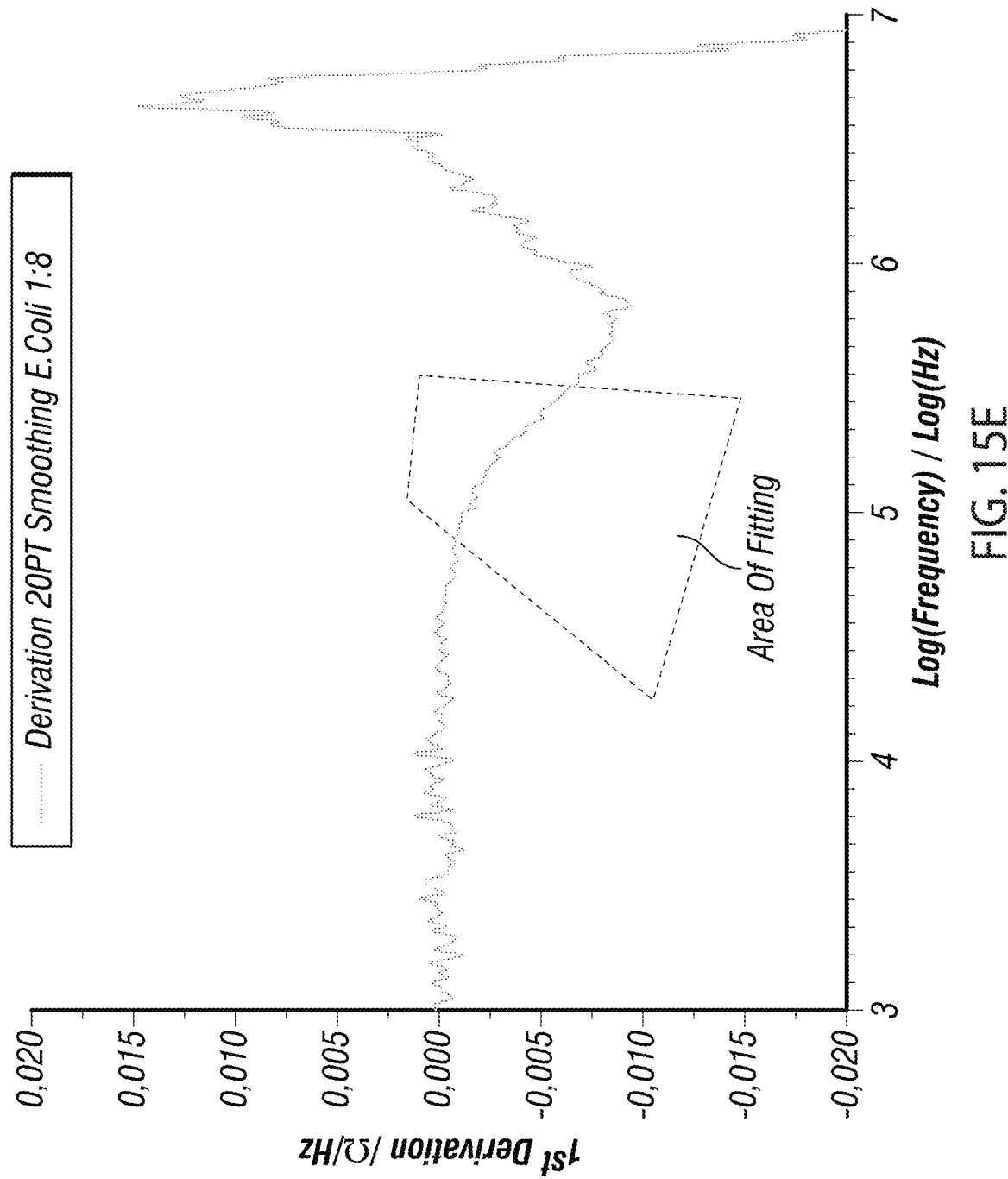
Figure 15F:
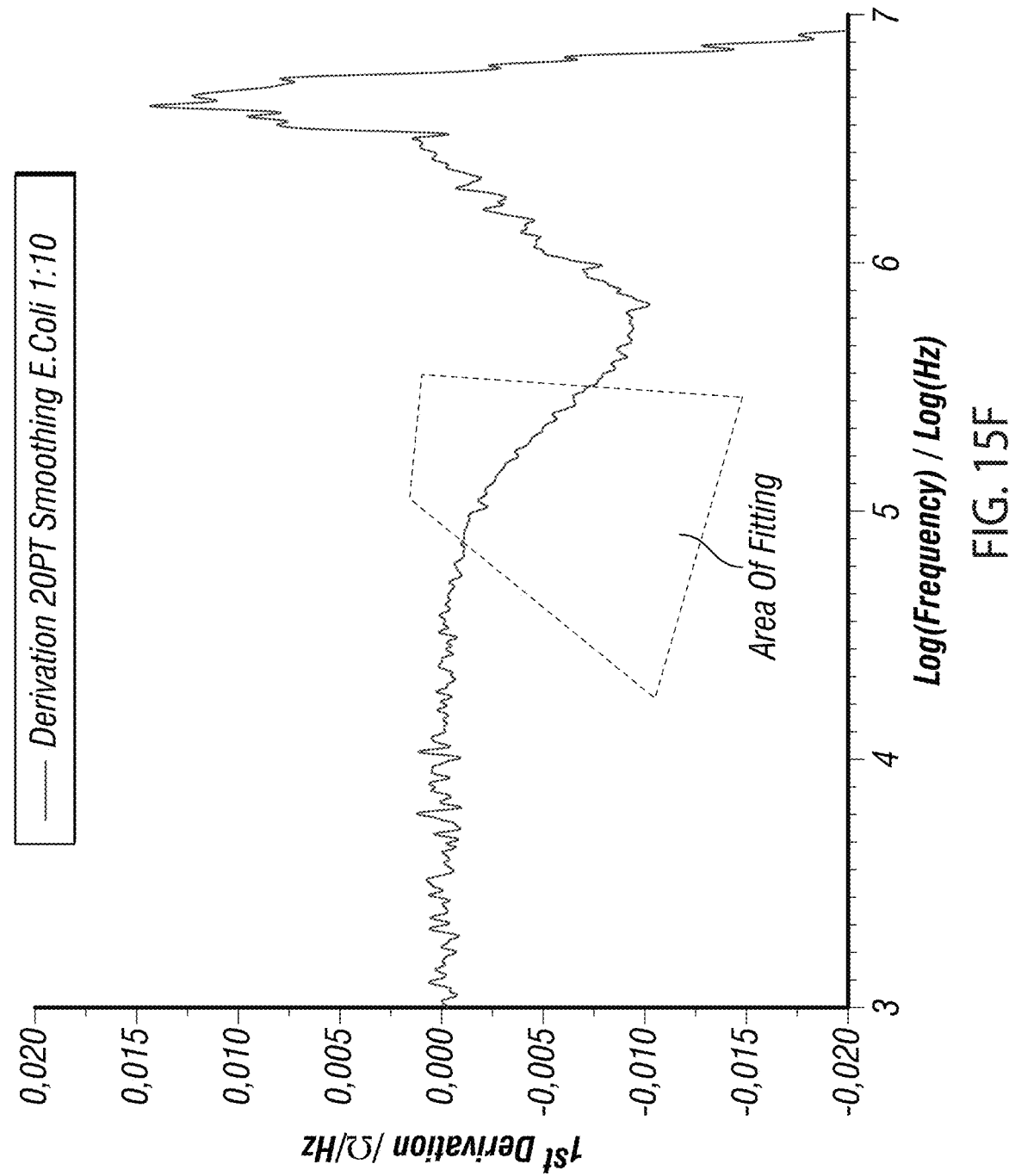
Figure 15G:
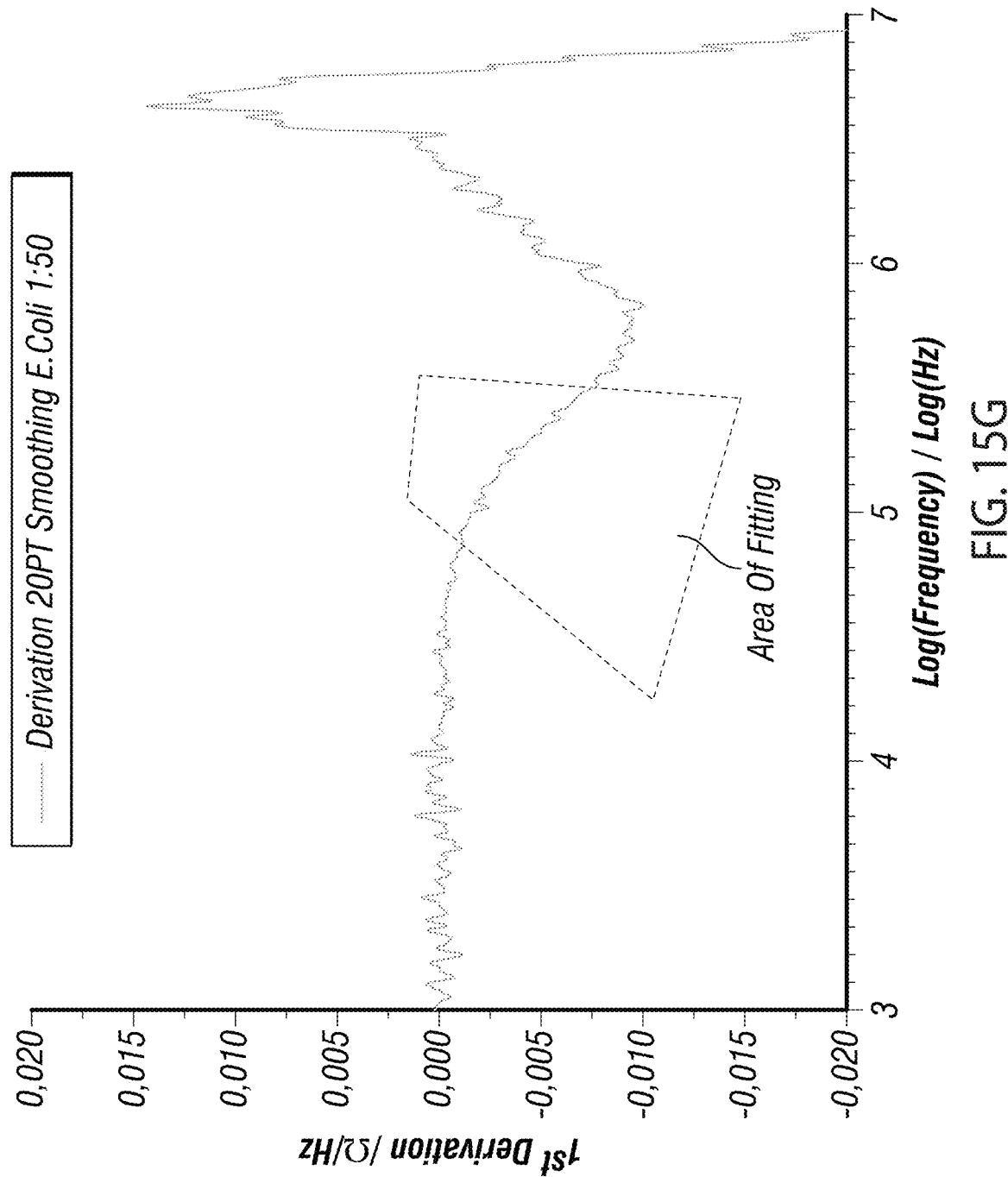
Figure 15H:
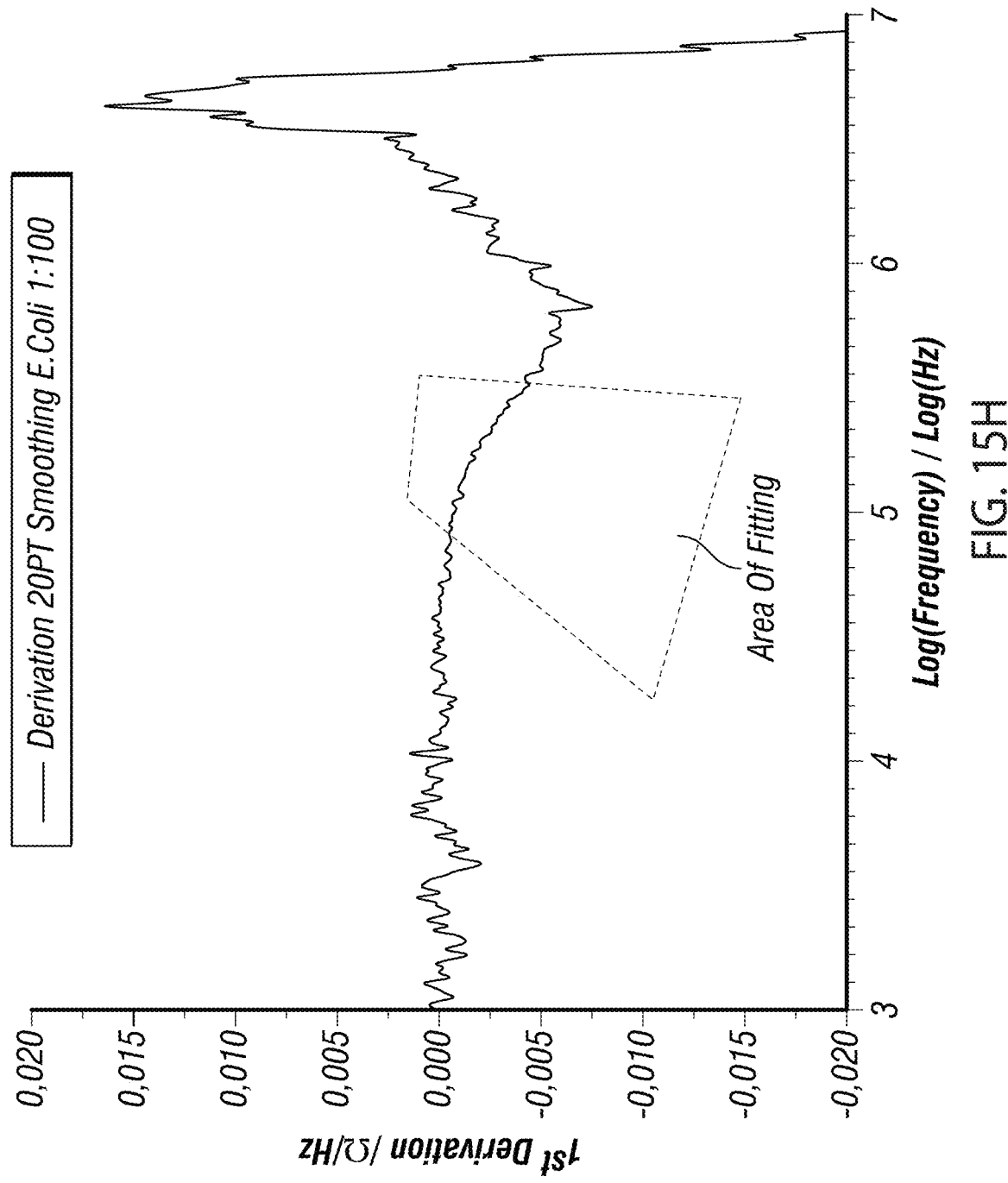
Figure 15I:
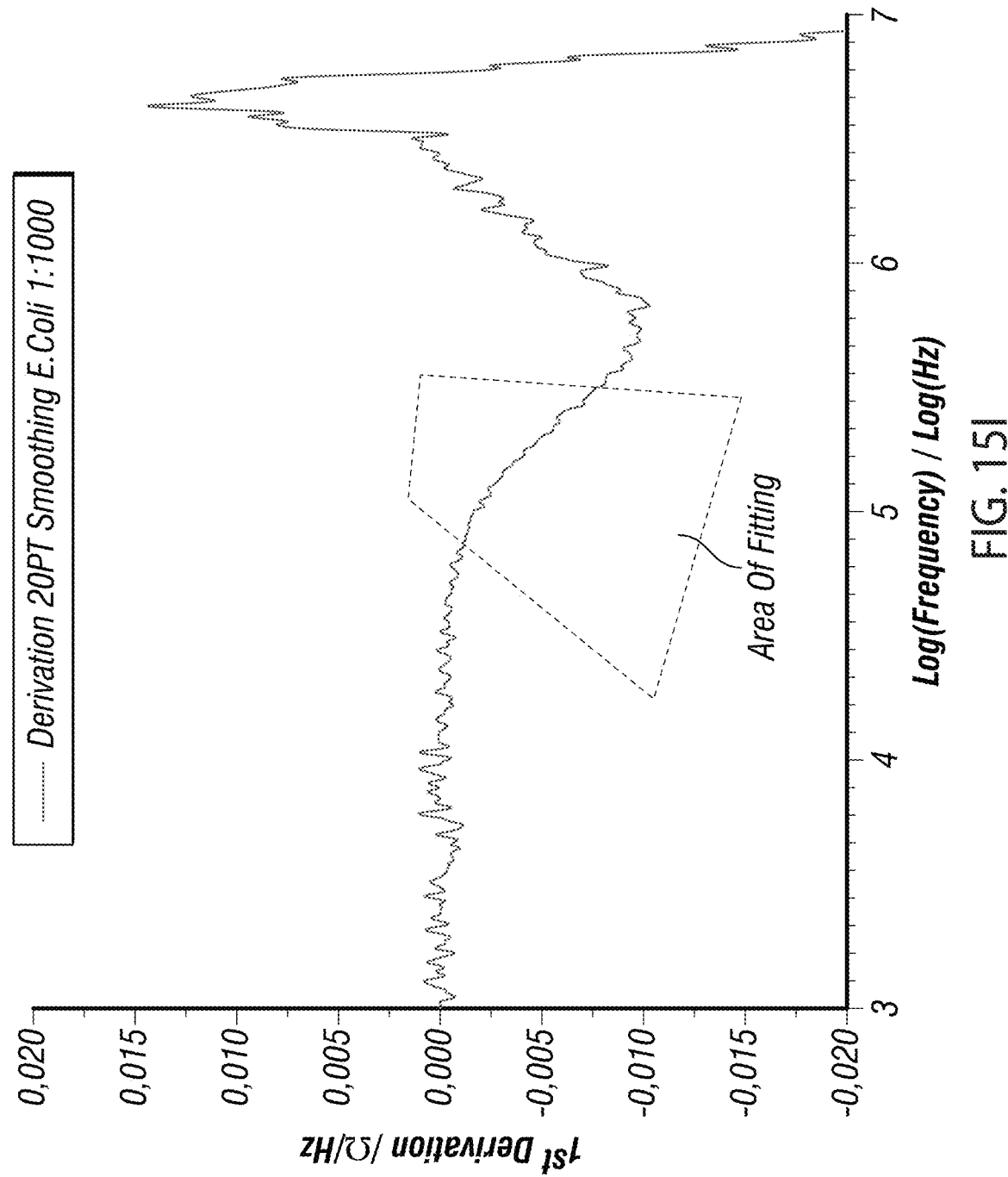

The data of FIGS. 13A and 13B for each concentration of E. colis was similarly subjected to derivation to obtain the First Derivative and the data of the First Derivative was smoothed to become Smoothed First Derivative data, and such Smoothed First Derivative data is shown on FIG. 15 as a plot line for eight of the E. colis samples.

On FIG. 15 the lowest line represents a sample with merely the fluid and with no E. colis bacteria. Ignoring this lowest line, the plot lines for samples including E. colis on FIG. 15, appear similar extending from the left towards the right initially relatively horizontally that is having a Smoothed First Derivation value of about zero until they curve downwardly and then after curving downwardly curve upwardly. The upward curving is believed to be a result of the test apparatus and to not reflect features of the samples. The plot lines for the samples are in accordance with the invention desired to be analysed toward showing changes between a start of the curve downwardly and a start of the curve upwardly. To do so, portions of the various plot lines are desired to be selected and the selected portions analysed.

On FIG. 15, an area within a dashed line is indicated as an Area of Fitting and it is in this area the plot lines are desired to be analysed. In a preferred method, a portion of each plot line to be selected is selected to start at a start point where the plot line as it extends toward the right stops being horizontal. i.e., where the plot line stops being approximately zero. The portion is selected to extend from the start point towards the right to a stop point preferably selected to be a point which is a fixed increase in the frequency from the frequency at the start point, preferably a fixed increase of value of 0.8 along the log (Frequency)/log(Hz) horizontal scale on FIG. 15.

Figure 16:
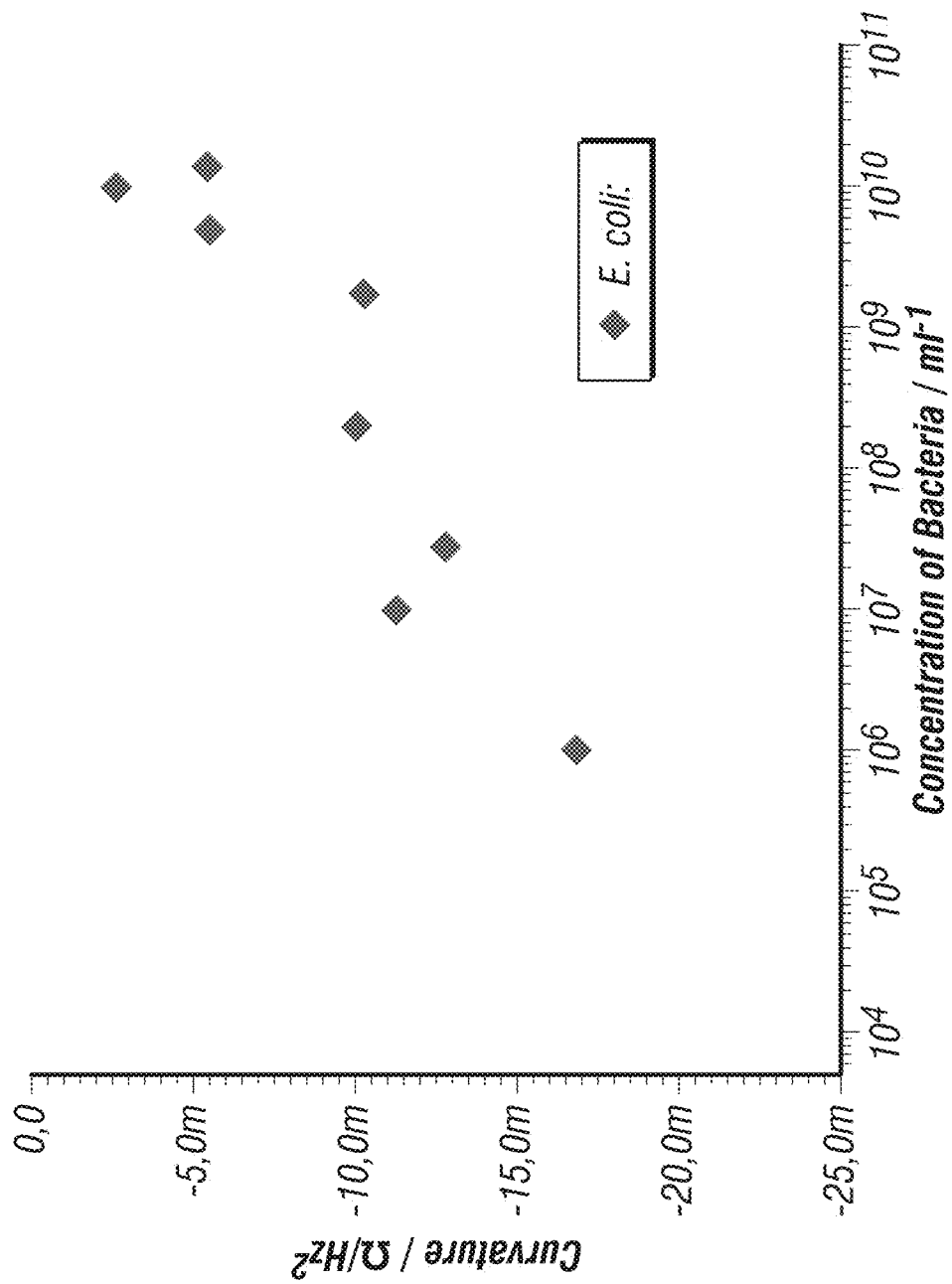
FIG. 16 is a graph showing eight diamond-shaped points, one for each of the 8 of the different fluids containing E. colis particles identified on FIG. 16, with each point being located at the Concentration for each respective fluid and at the Curvature for each respective fluid, with the Curvature derived by a further derivation of the smoothed Base Impedance/Frequency Data on FIG. 15 over a selected portion of the smoothed data for each fluid within the area within the broken lines on FIG. 15 indicated as the Area of Fitting.

The data for the selected portion of each plot line on FIG. 15 was subjected to an analysis including a selected derivation to obtain data shown as Curvature Data on FIG. 16. The derivation was selected to represent an averaged slope of the selected portion of the respective plot line on FIG. 15 and represented as related to the concentration of the E. colis in each sample by a single point on FIG. 16 plotting the Curvature in units of ohms/Hertz squared by Concentration of bacteria. The eight points on FIG. 16 each representing, in effect, a second derivative of the data for each of the eight samples of E. coli from FIG. 13.

Figure 17:
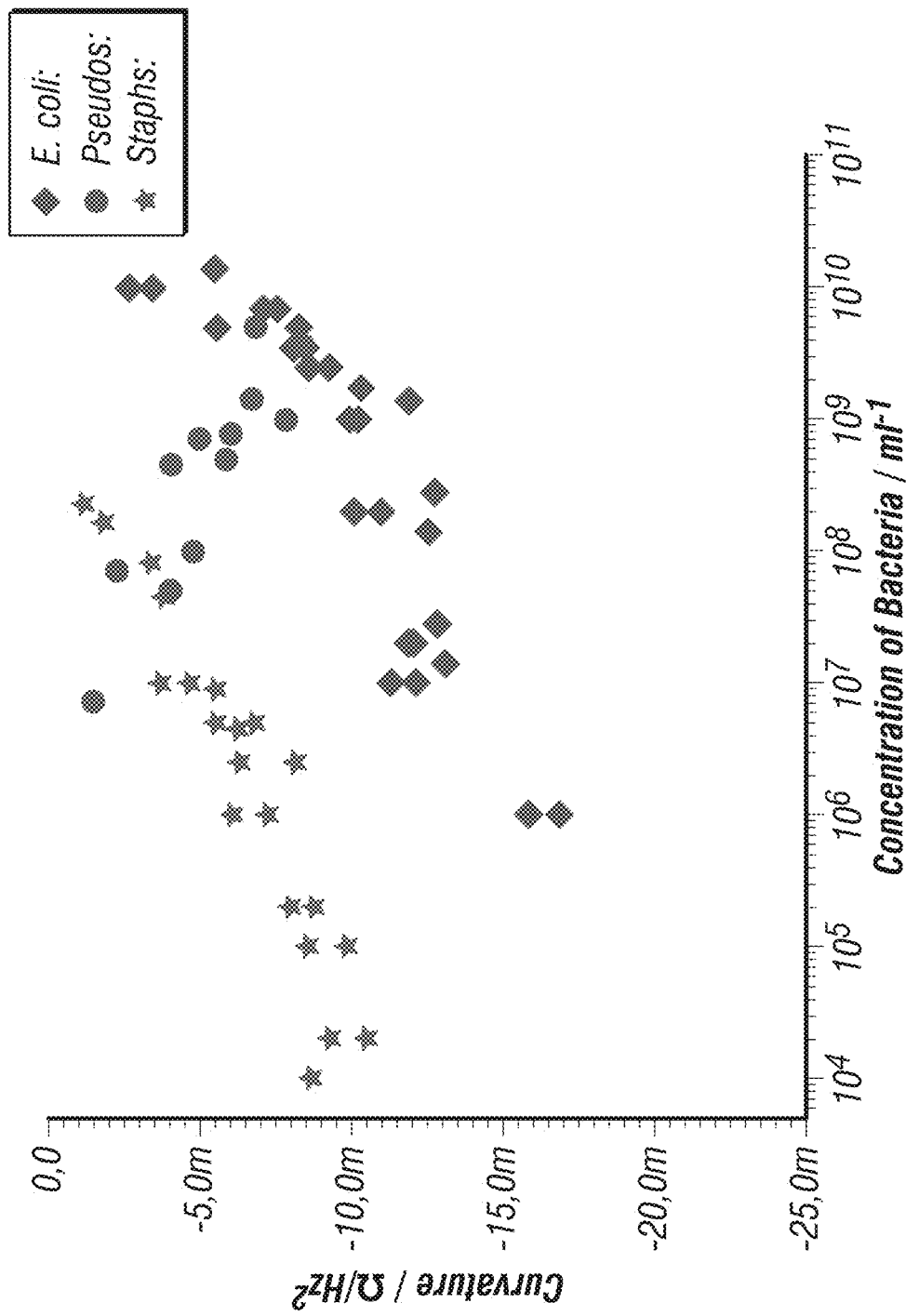
FIG. 17 is a graph similar to FIG. 16 but showing in addition to the eight diamond-shaped points for E. coli on FIG. 16, additional diamond-shaped points for E. coli and additional star-shaped points for the bacteria Pseudomonas aeruginosa (Pseudos) and additional circle-shaped points for Staphylococcus aureus (Staph) that have been determined in the same manner as in FIG. 16 as being Concentration and Curvature points for determined for a different fluids at each point, and with each fluid being the same, that is, 70% isopropanol by volume and 30% water by volume, and containing a respective one of the bacteria E. colis, Pseudos and Staph in a different concentration and which each point being indicated as representing a different bacteria by shape as indicated in the box on FIG. 17.

Reference is made to FIG. 17 which is a graph similar to FIG. 16 and showing in addition to the eight Curvature/Concentration points for E. coli on FIG. 16 additional Curvature/Concentration points for the bacteria Pseudomonas aeruginosa (Pseudos) and Staphylococcus aureus (Staph) that have been determined in the same manner as for E. colis shown on FIG. 16. Each separate Curvature/Concentration point has been determined for a different sample of fluids at each point, with each fluid being the same that is, 70% isopropanol by volume and 30% water by volume, and containing a respective one of the bacteria E. coli, Pseudos and Staph in a different concentration. On FIG. 17, each Curvature/Concentration diamond-shaped point is for E. coli, each Curvature/Concentration point is for Pseudos is shown as a circle-shaped point and each Curvature/Concentration star-shaped point is for Staph.

Figure 18:
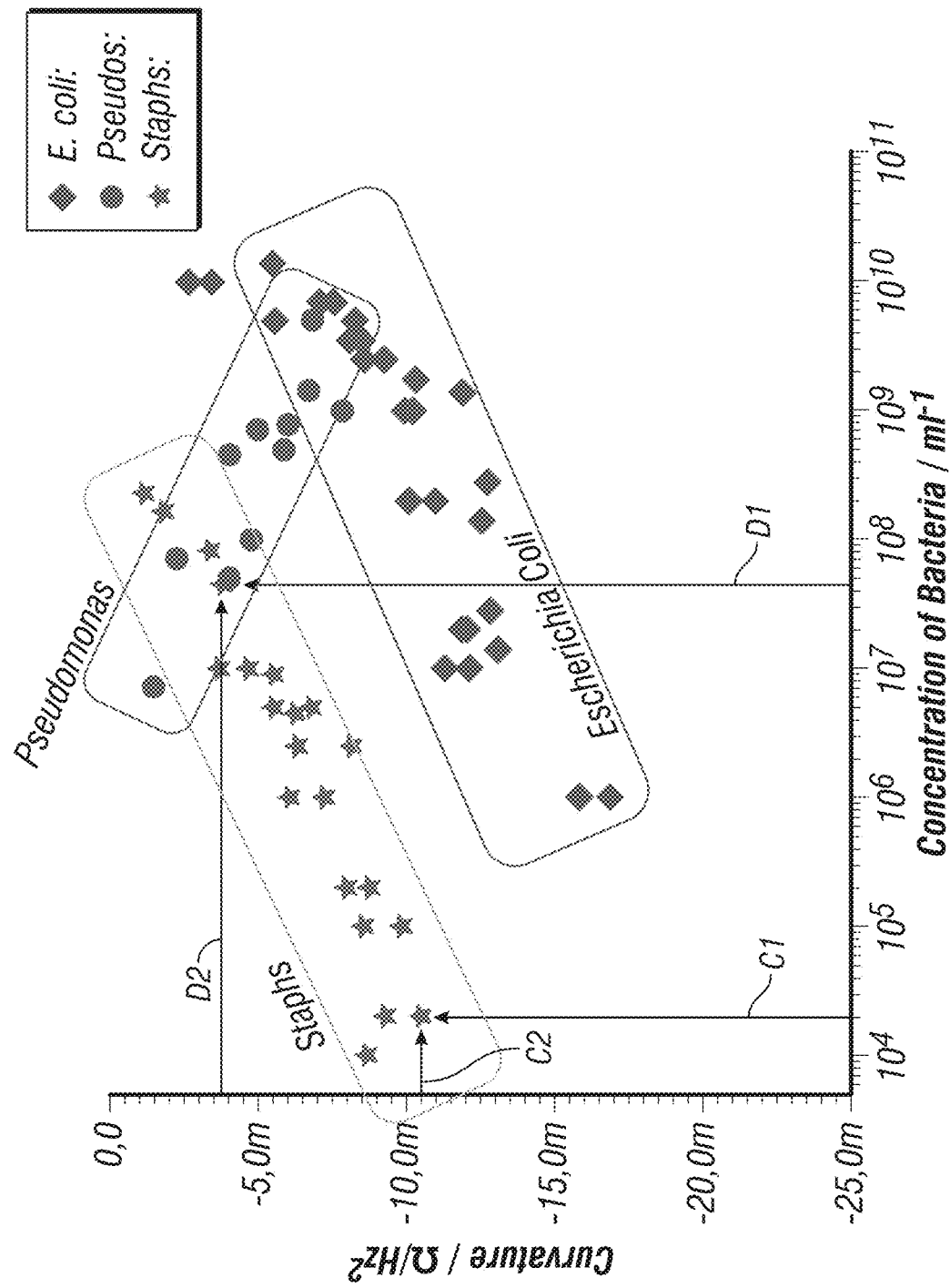
FIG. 18 is a graph the same as FIG. 17 but on which different rectangles have been drawn with each rectangle being an approximation of an extrapolated area representative of where the points of the same one of the three respective bacteria are expected to be located.

Reference is made to FIG. 18 which is a graph the same as FIG. 17 but on which three different rectangles have been drawn, encompassing within each rectangle, an approximation of an extrapolated area representative of where the Curvature/Concentration points of the same one of the three respective bacteria are expected to be located. As seen, the rectangle labelled Escherichia Coli is an area extrapolated using a selected function from the E. colis Curvature/Concentration points on FIG. 18 representative of where Curvature/Concentration points of the E. colis bacteria may be anticipated to be located. The rectangle labelled Pseudomonas aeruginosa is an area extrapolated from the Pseudos Curvature/Concentration points on FIG. 18 representative of where Curvature/Concentration points of the Pseudos bacteria may be anticipated to be located. The third rectangle is an area extrapolated from the Staphs Curvature/Concentration points on FIG. 18 representative of where Curvature/Concentration points of the Staphs bacteria may be anticipated to be located.

In accordance with the present invention, the data of FIG. 18 may be recorded and considered as Field Concentration Reference Data.

As one example referred to as Case C, a sample of an unknown bacteria is provided in a solution of 70% by volume isopropanol and 30% water by volume. For this sample of Case C, the Concentration of the Case C sample is determined by known methods. The Curvature for the sample of Case C is determined by the same methods used to determine the Curvatures for the samples in FIG. 18, that is: as an electromagnetic imaging apparatus, an impedance spectrograph is used to determine for individual particles of the bacteria in the sample the magnitude of impedance at multiple different frequencies; the first derivative of the magnitude of impedance is derived using the same first derivation; the Smoothed first derivative of the magnitude of impedance is determined using the same smoothing function; a portion of the Smoothed first derivative is selected using the same selection criterion, and the Curvature is determined using the same second derivation. Assume that the Case C sample is determined to have a Curvature of $-10$ m and a Concentration of $10^5$. Referring to FIG. 18, on FIG. 18, two arrowed lines C1 and C2 are shown for Case C which, for the determined Curvature of $-10$ m and the determined Concentration of $10^5$, indicate a probability that the bacteria is Staphs and not E. coli or Pseudos since on the graph of FIG. 18 the intersection of Curvature of $-10$ m and a Concentration of $10^5$ falls at a location within the rectangle where Curvature/Concentration points of the Staphs bacteria may be anticipated to be located, and not within the rectangles where E. coli or Pseudos may be anticipated to be located. For Case C, a secondary estimate of the probability that the particle C is one or more of Staphs, E. coli and Pseudos is secondary probability profile or estimate that the particle C is Staphs, representing a secondary estimated identity for particle C as being Staphs and not E. coli or Pseudos.

As another example referred to as Case D, a sample of an unknown bacteria provided in a solution of 70% by volume isopropanol and 30% water by volume. For this sample of Case D, the Concentration of the Case D sample is determined by known methods. The Curvature for the sample of Case D is determined by the same methods used to determine the Curvatures for the samples in FIG. 18 and Case C. Assume that the Case D sample is determined to have a Curvature of $-3$ m and a Concentration of $10^8$. Referring to FIG. 18, on FIG. 18, two arrowed lines D1 and D2 are shown for Case D which for the determined Curvature of −3 m and the determined Concentration of $10^8$ indicate a probability that the bacteria is either one of Staphs and Pseudos and not *E. colis* since on the graph of FIG. 18 the intersection of Curvature of −3 m and a Concentration of $10^8$ falls at a location: within the rectangle where Curvature/Concentration points of the Staphs bacteria may be anticipated to be located, within the rectangle where Curvature/Concentration points of the Pseudos Staphs bacteria may be anticipated to be located, and not within the rectangle where *E. coli* bacteria may be anticipated to be located. For Case D, a secondary estimated identity of the particle D as a secondary probability profile of one or more of Staphs, Pseudos and *E. colis* is that the particle D is either one of Staphs and Pseudos and not *E. colis*, representing a secondary estimated identity for particle C as being of either one of Staphs and Pseudos and not *E. colis*.

The probability assessment based on the impedance analysis data and the determination of concentration in accordance with the present invention can be used to make a determination as to the secondary estimated identity of a bacteria, represented by the secondary probability profile that the unknown bacteria may be selected from one or more of the selected known bacteria and/or not one or more of the selected known bacteria. The probabilities of each of Case C and Case D provide for their samples what may be considered and is referred to as the second estimated identity from the electrical field identification method of the invention.

The probabilities of each of Case A and Case B provide for their samples what may be considered as the primary estimated identity from the image identification method of the invention discussed earlier.

The method of the invention involves using the primary estimated identity from the image identification method in combination with the second estimated identity from the electrical field identification method for the same samples to estimate a final estimated identity of the bacteria in those same samples, preferably as a final probability profile of the one or more known bacteria. Assuming that, for example, Case A and Case D are, for the same sample, then primary estimated identity is that the unknown bacteria has a primary probability profile of 82% SA, 6% CJ, 12% EC and 0% PA, and the secondary estimated identity is that the unknown bacteria has a secondary probability profile of is either one of SA (Staphs) and PA (Pseudos) and not EC (*E. coli*). This leads to a final estimated identity of the bacteria as most likely being SA. Another function for using the primary estimated identity probability in conjunction with the second estimated identity probability is to add to the 82% SA probability the 12% EC probability since the second estimated identity probability indicates that the bacteria is not *E. coli*.

In accordance with the present invention, for the same samples, the primary estimated identity is to be determined from the image identification method and the secondary estimated identity is to be obtained from the electrical field identification method and, as a function of the primary estimated identity and the secondary estimated identity, a final estimated identity is to be estimated. The function to use or combine the primary estimated identity and the secondary estimated identity may be based, for example, in statistical and probability analysis.

As seen on FIG. 18, rectangles are used as an approximation of an extrapolated area representative of where the Curvature/Concentration points of the same one of the three respective bacteria are expected to be located. The use of a rectangular area to represent an extrapolated area representative of where the Curvature/Concentration points of the same one of the three respective bacteria are expected to be located is bit one example of a function applied to the Curvature/Concentration points to develop an area. Many other functions may be developed and used to assess as by comparison whether any point on the graph reasonably is considered to be close to any one of the Curvature/Concentration points of one of the known particles as to be considered to possibly be the particle in question and with what probability.

As another example of an electrical field identification method of the present invention to determine the secondary estimated identity of particles as a secondary probability profile of three known bacteria, three samples of bacteria were prepared, each in a fluid of 70% isopropanol by volume and 30% water by volume, as follows:

1. *E. colis* particles in a concentration of $1 \times 10^7$,
2. Staph particles in a concentration of $9 \times 10^6$; and
3. Pseudos particles in a concentration of $7.2 \times 10^6$.

An impedance spectrograph was used to determine for individual particles of the bacteria in each sample the magnitude of impedance at multiple different frequencies referred to as Base Impedance/Frequency Data. The Base Impedance/Frequency Data was subjected to a standard mathematical derivation from which a First Derivative of the magnitude of impedance at multiple different frequencies was developed and then subjected to a mathematical smoothing operation using a 20 point averaging filter so as to smooth the data and to become the Smoothed First Derivative data represented by the different plot lines on FIGS. 19 and 20 for each of the respective samples as identified on FIGS. 19 and 20.

Figure 19:
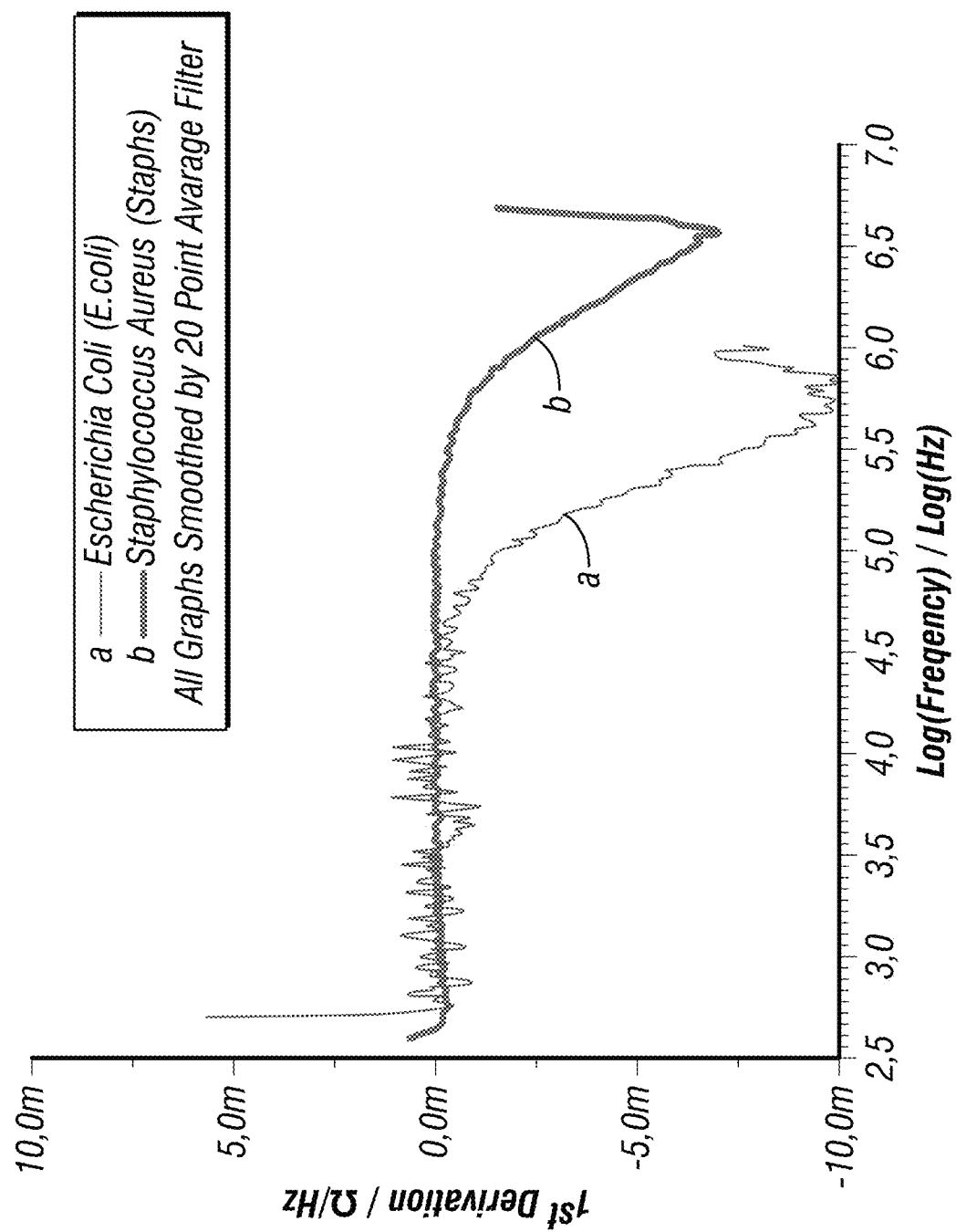
FIG. 19 is a graph showing the 1st Derivation of the Base Impedance/Frequency Data after being smoothed by a smoothing step using the 20 point average smoothing filter for two different samples each in a fluid of 70% isopropanol by volume and 30% water by volume, with a first containing E. colis particles in a concentration of $1\times10^7$, and a second containing Staph particles in a concentration of $9\times10^6$.
Figure 20:
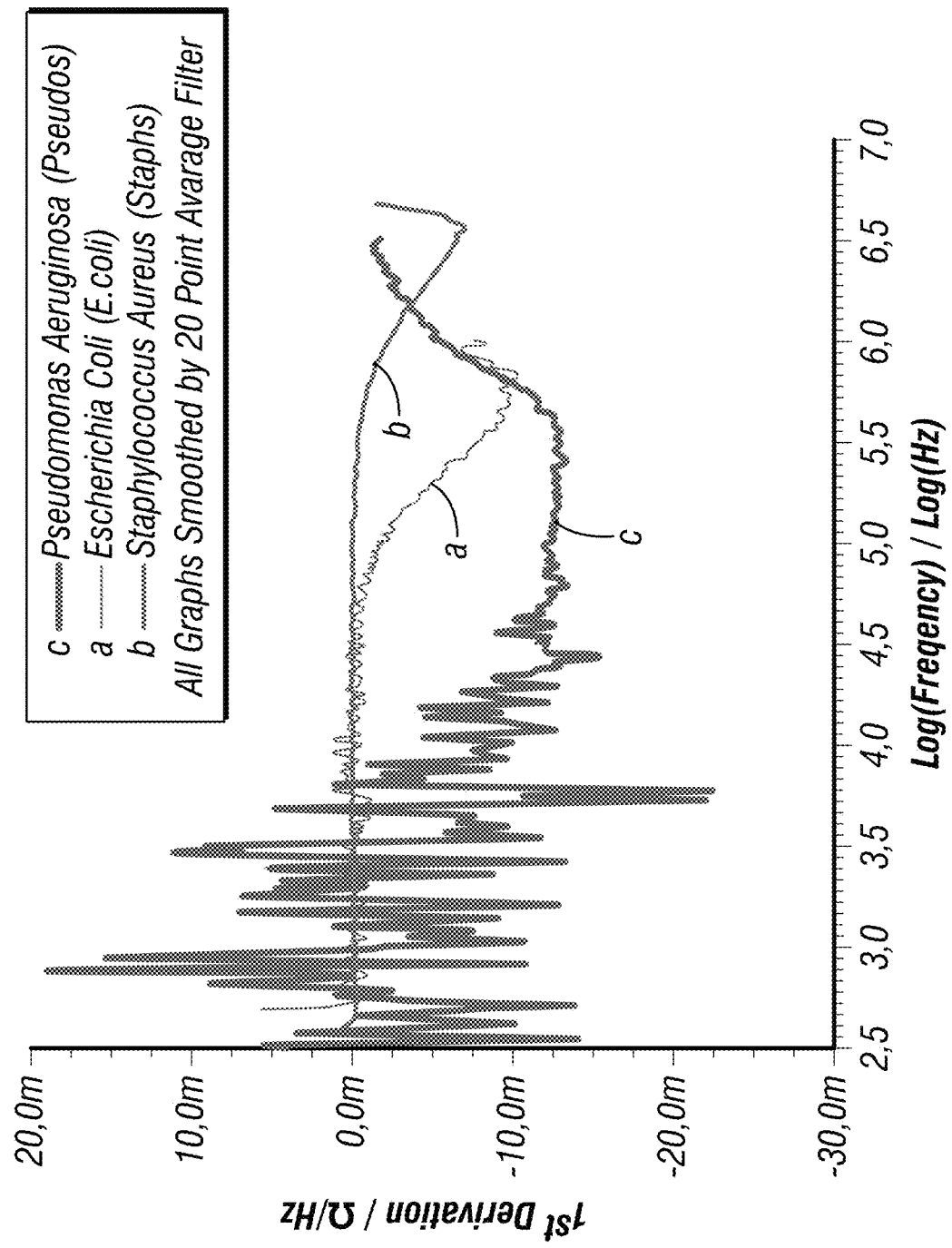
FIG. 20 is a graph showing the 1st Derivation of the Base Impedance/Frequency Data after being smoothed by a smoothing step using the 20 point average smoothing filter for the same two different samples in FIG. 20 and also for a third sample also in a fluid of 70% isopropanol by volume and 30% water by volume, containing Pseudos particles in a concentration of $7.2\times10$.

As can be seen on FIGS. 19 and 20, and as appreciated by the inventors of this application, the Smoothed First Derivative data for *E. colis*. Staphs and Pseudos are seen as plot lines representing curves with different features. The inventors have recognized that differences between the Base First Derivative data for the different bacteria represent differences that can be used to distinguish between different known bacteria. One preferred method of characterizing the differences is by using the Smoothed First Derivative and performing a second, further derivation to develop Second Derivative data in a manner similar to that described in respect of FIGS. 13 to 18. However, the invention is not limited merely to the analysis of Base First Derivative data by methods involving the derivation of the Second Derivative data as has been described regarding FIGS. 13 to 18. Other methods for assessing the differences in the Base Impedance/Frequency Data can be used towards identifying differences between different known bacteria and using these differences in determining the secondary estimated identity of unknown particles as a secondary probability profile of the one or more known bacteria in a similar manner to that described with reference to FIGS. 13 to 18. As well, insofar as a derivation of the Second Derivative data is desired to be used, then different manners can be used for creating and selecting, for example, data by a second derivation.

While the methods of the present invention for distinguishing between known bacteria from Base Impedance/Frequency Data may in some circumstances of use alone identify bacteria with high probability, when such methods are used in conjunction with other methods, such as optical imaging of identification, the combination of methods can assist in improving the probability of identifying bacteria.

Touchless Hand Cleaning Dispenser

Figure 1:
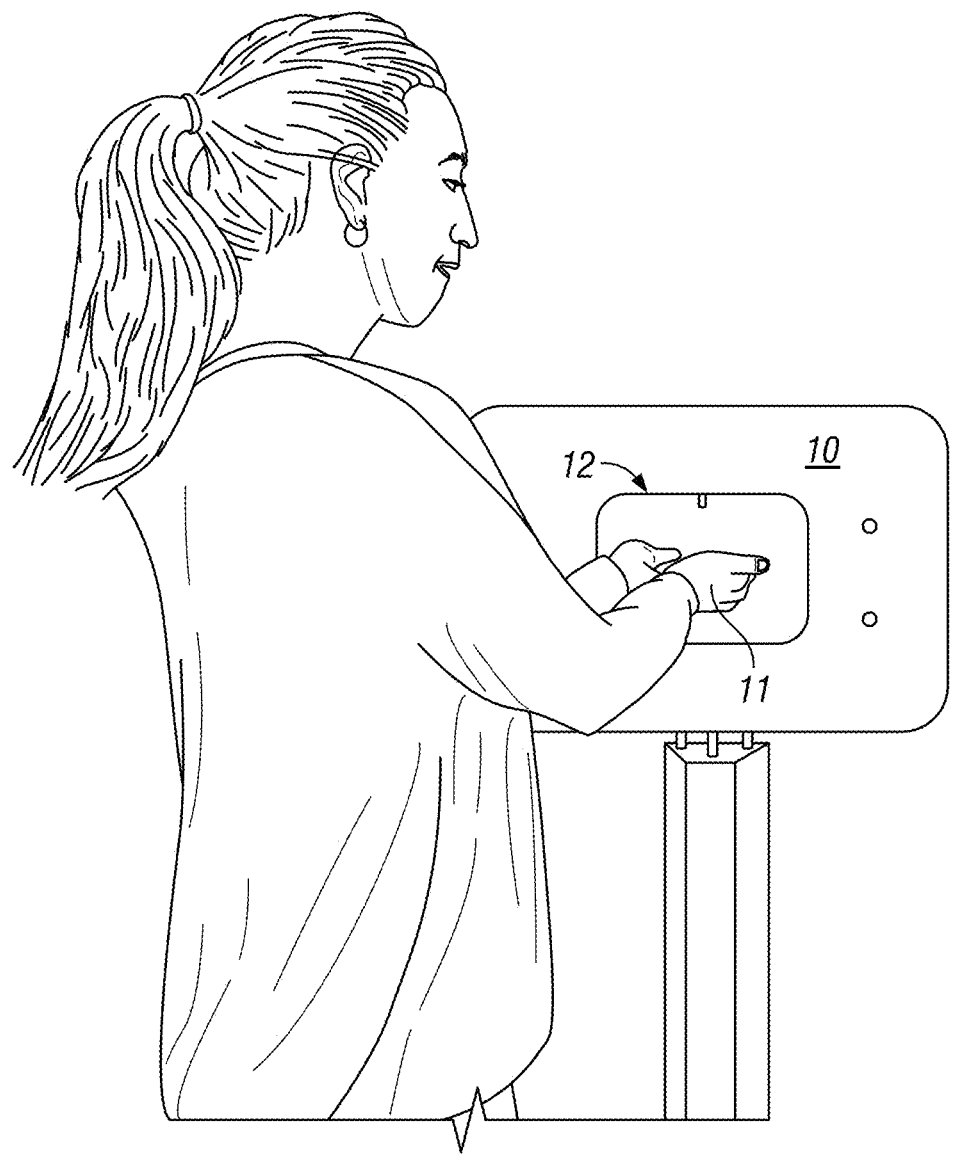
FIG. 1 is a schematic pictorial view showing a person's hands placed within a dispenser in accordance with the first embodiment of the present invention.

Reference is made to FIG. 1 which schematically illustrates a touchless hand cleaning dispenser 10 in accordance with a first embodiment of the invention with a person placing their hands 11 within a forwardly opening cavity 12 in the dispenser.

Figure 2:
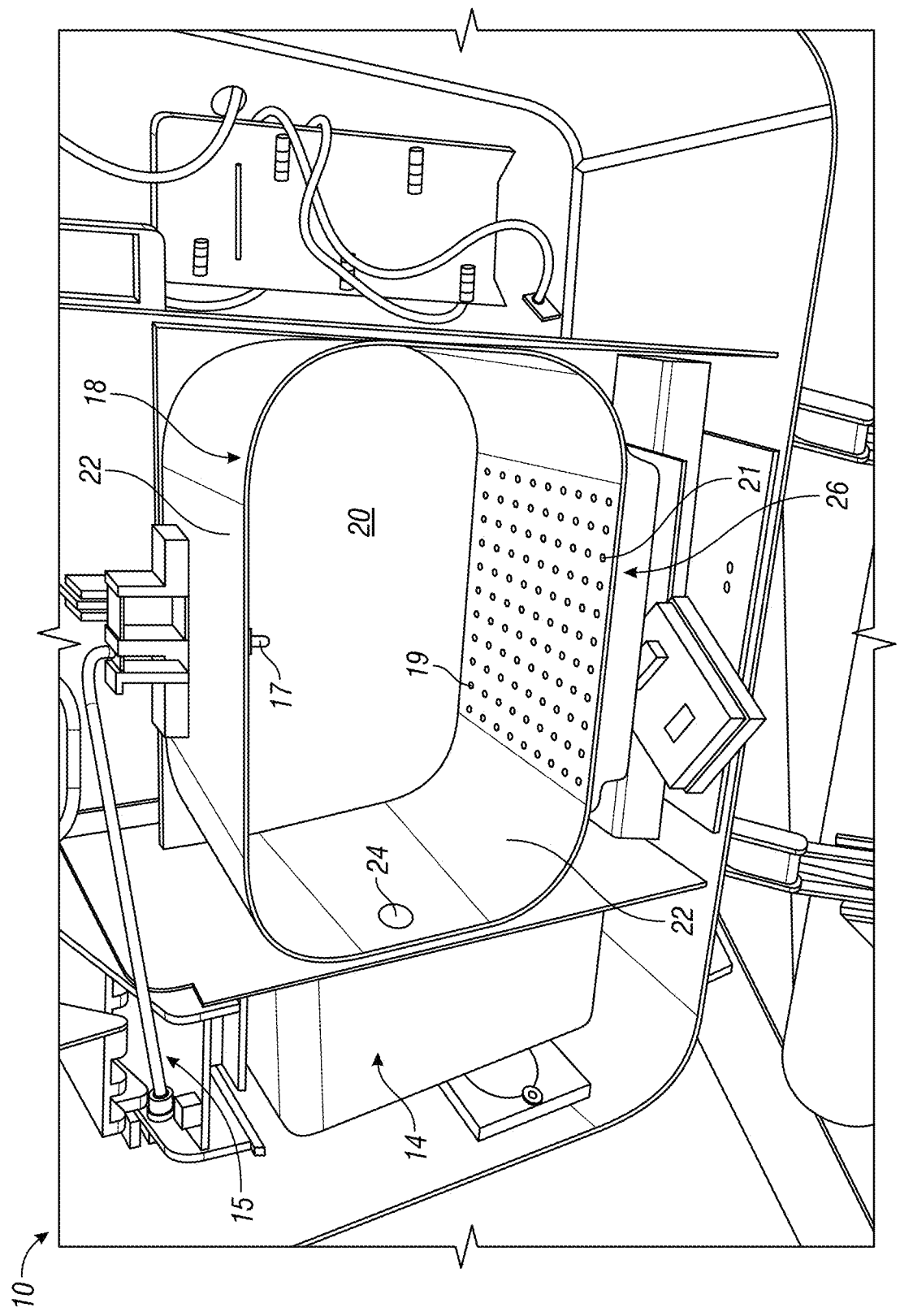
FIG. 2 is a schematic pictorial front view of the dispenser of FIG. 1 with its front cover removed.
Figure 3:
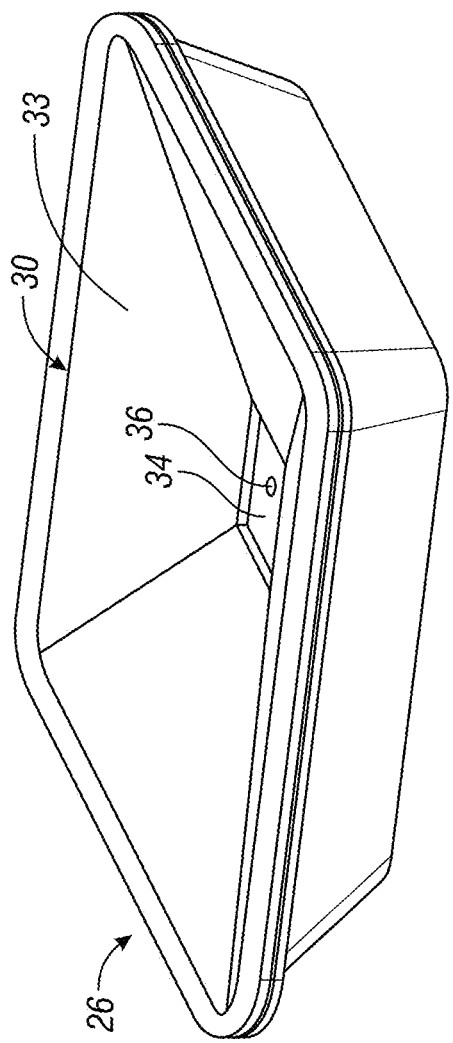
FIG. 3 is a pictorial view of a removable drip tray assembly shown on FIG. 2.

As seen in FIG. 2 showing the dispenser 10 with its front cover removed, the dispenser 10 includes a fluid reservoir 14 containing the fluid to be dispensed, an electric pump 15 that takes fluid from the fluid reservoir 14 and discharges it via an outlet tube to a discharge outlet 17. The dispenser 10 includes a horizontally extending tube-like member 18 closed at its rear by a rear wall 20 and open at its front as a front opening 22. The cavity 12 is defined inside the tube-like member 18. The tube-like member 18 has a plurality of openings 19 in its lower wall 21. The discharge outlet 17 discharges fluid from the pump 15 through a top wall 22 of the tube-like member 18 into the cavity 12 and onto a user's hands 11 when the hands are within the cavity 12. Preferably, the fluid discharged from the discharge outlet 17 is in the form of a spray of liquid however may be a stream of fluid or foamed liquid. The dispenser 10 preferably includes at least one sensor 24 within the cavity 12 to sense the presence of a user's hands 11 in the cavity 12 such that the pump 15 may be controlled by a controller (not shown) for the dispenser 10 to operate to dispense fluid as desired onto the user's hands 11. Below the cavity 12, a removable drip tray assembly 26 is removably secured to the dispenser 10 as by being supported by flanges 28 that extend downwardly from the lower wall 21 of the tube-like member 18 and permit the drip tray assembly 26 to be forwardly and rearwardly slidable for insertion, removal and/or replacement.

Figure 4:
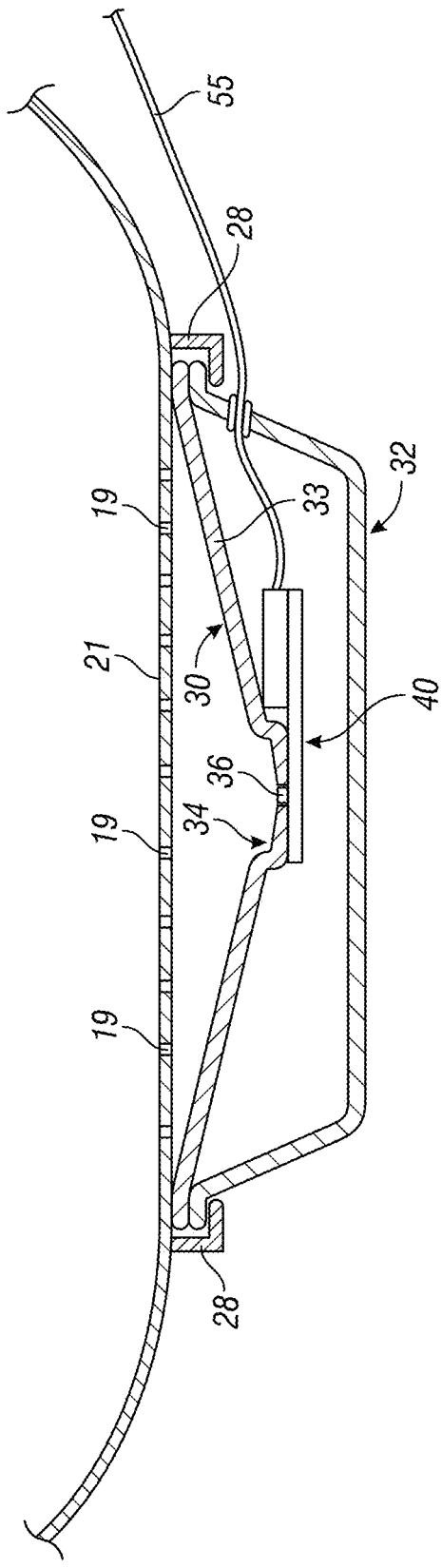
FIG. 4 is a cross-sectional front view of the drip tray of FIG. 2.

As best seen in FIG. 4 in front cross-section, the drip tray assembly 26 includes a catch tray 30 nestled over a drip tray 32. The catch tray 30 has a liquid sump 34 at a lowermost point and the sides 33 of the catch tray 30 angle inwardly and downwardly to the sump 34 to direct fluid landing on the catch tray 30 to flow under gravity into the sump 34. An outlet opening 36 is provided to extend downwardly from a lowermost point of the sump 34.

A microfluidic sorting and analysis unit 40 is schematically shown on FIG. 4 secured to the undersurface of the catch tray 30.

Figure 5:
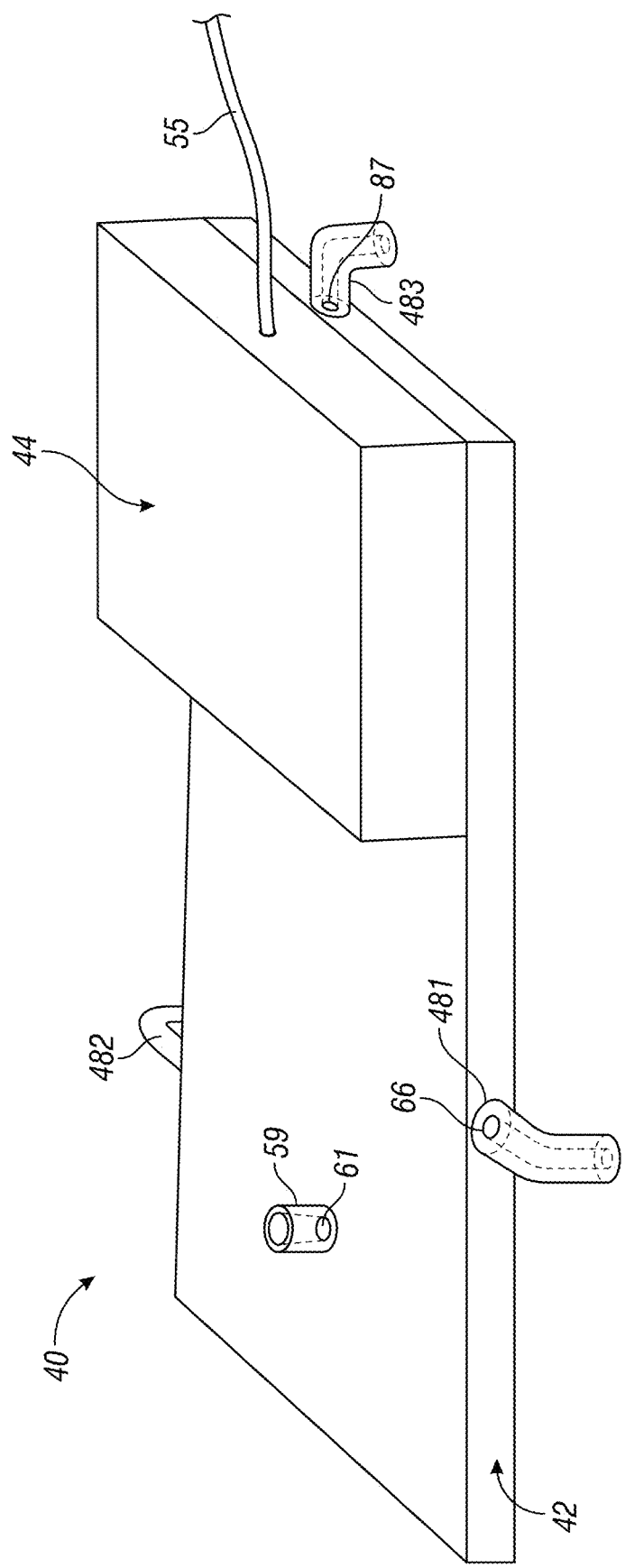
FIG. 5 is a schematic view of a microfluidic sorting and analysis unit in accordance with the present invention.

As seen on FIG. 5, the microfluidic unit 40 includes a microfluidic cartridge 42 and an electronic chip 44.

Figure 6:
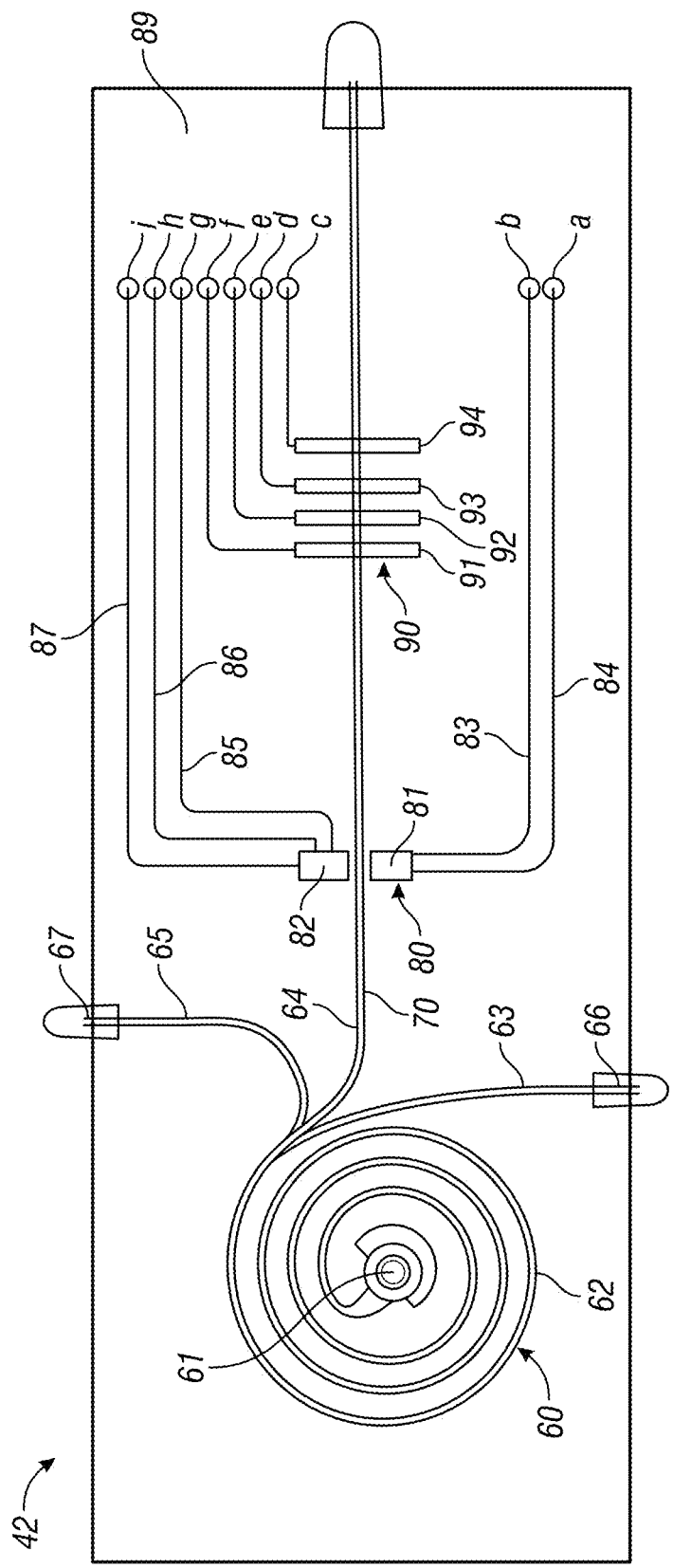
FIG. 6 is a schematic top view of the microfluidic cartridge shown on FIG. 5.

FIG. 6 shows a schematic top view of the microfluidic cartridge 42 seen as though the microfluidic cartridge 42 is made from transparent materials although this is not necessary. FIG. 6 shows schematically a configuration of the microfluidic cartridge 42 with a microfluidic particle sorting channel 60, an imaging apparatus 80 and an electrical field measurement apparatus 90. The microfluidic cartridge 42 provides the microfluidic particle sorting channel 60 with an inlet 61 sealably connected by an inlet tube 59 to the outlet 36 of the catch tray 30. The channel 60 is shown to proceed from the inlet 61 as a spiral microfluidic sorting channel 62 whose outflow is split into three branch channels 63, 64 and 65. The spiral microfluidic sorting channel 62 is configured as in a manner similar to that taught for example by Yeh et al, earlier referred to, to separate particles in the fluid by size with a first branch channel 63 receiving particles of a size less than 1 um, a second branch channel 64 receiving particles of a size greater than 1 um and less than 5 um and a third branch channel 65 receiving articles of a size greater than 5 um. The first branch channel 63 and the third branch channel 65 have fluid which is selected to be discharged and the outlets 66 and 67 of these first and third branch channels 63 and 65 are connected to short discharge tubes 481 and 482 to discharge into the drip tray 32. The second branch channel 64 that carries particles in the range of 1 to 5 um becomes a single analysis channel 70 such as that shown in FIG. 6 fluid passing through the analysis channel 70 passes through an imaging apparatus 80 as a first electromagnetic imaging apparatus and the electric field measurement apparatus 90 in series and then out an outlet 87 of the analysis channel 80 which is connected to a short discharge tube 483 to discharge into the drip tray 32.

The imaging apparatus 80 is operated to determine image characteristics of the particles in the focused fluid stream passing through the analysis channel 70. The electromagnetic field measurement apparatus 90 is operated to determine the electrical field characteristics of the particles in the focused fluid stream passing through the analysis channel 70, preferably impedance measurements of the particles in the focused fluid stream in the analysis channel 70. In this simple first embodiment, the first electromagnetic imaging apparatus 80 is also used to determine the velocity of flow in the analysis channel 70 from which with knowledge of the cross-sectional area of the analysis channel 70, the volume flow of the fluid in the analysis channel 70 can be calculated. The first electromagnetic imaging apparatus 80 is also preferably to be used to count, with time, the number of particles passing through the analysis channel 70 such that, with knowledge of the volume flow of fluid with time, and the number of particles passing through the analysis channel 70 with time, the concentration of particles in the focused fluid stream in the analysis channel 70 can be estimated.

As seen on FIG. 6, the first electromagnetic imaging apparatus 80 has an electromagnetic emitter 81 such as an LED (light emitting diode) on one side of the analysis channel 70 and an electromagnetic sensor 82 as, for example, a wavelength sensitive diode or CCD chip on the other side of the analysis channel 70. The light emitter 81 is carried on the cartridge 42 such that light emitted from the light emitter 81 passes through the analysis channel 70 and is received by the light sensor 82. Such arrangements are known and can in some configurations be accommodated by the cartridge 42 being formed of suitable optically transmitting materials or at least by providing optical passageways such as windows through the cartridge 42 to the analysis channel 70 which permits light from the light emitter 81 to pass through the analysis channel 70 to the light sensor 82 without leakage of fluid from the analysis channel 70. The emitter 81 and sensor 82 can preferably be controlled to provide suitable focusing, adjustment and the like of the electromagnetic radiation onto, through and about the particles.

FIG. 6 shows a plurality of electrodes 91, 92, 93 and 94 provided on the cartridge 42 to cross over the analysis channel 70 at spaced locations along the analysis channel 70. The electrodes 91, 92, 93 and 94 are provided as part of the electrical field measurement apparatus 80 for impedance measurements in a known manner of the focused fluid stream passing through the analysis channel 70.

As seen on FIG. 6, two electrical lead wires 83 and 84 are provided protected within the cartridge 42 to extend from the electromagnetic emitter 81 to respective contact pads a and b on the top surface 89 of the cartridge 42. Similarly, three electrical lead wires 85, 86 and 87 extend from the electromagnetic sensor 82 to respective contact pads g, h and i on the top surface of the cartridge and respective electrical lead wires extend from each of the electrodes 91, 92, 93 and 94 to respective contact pads c, d, e and f on the top surface of the cartridge.

Figure 7:
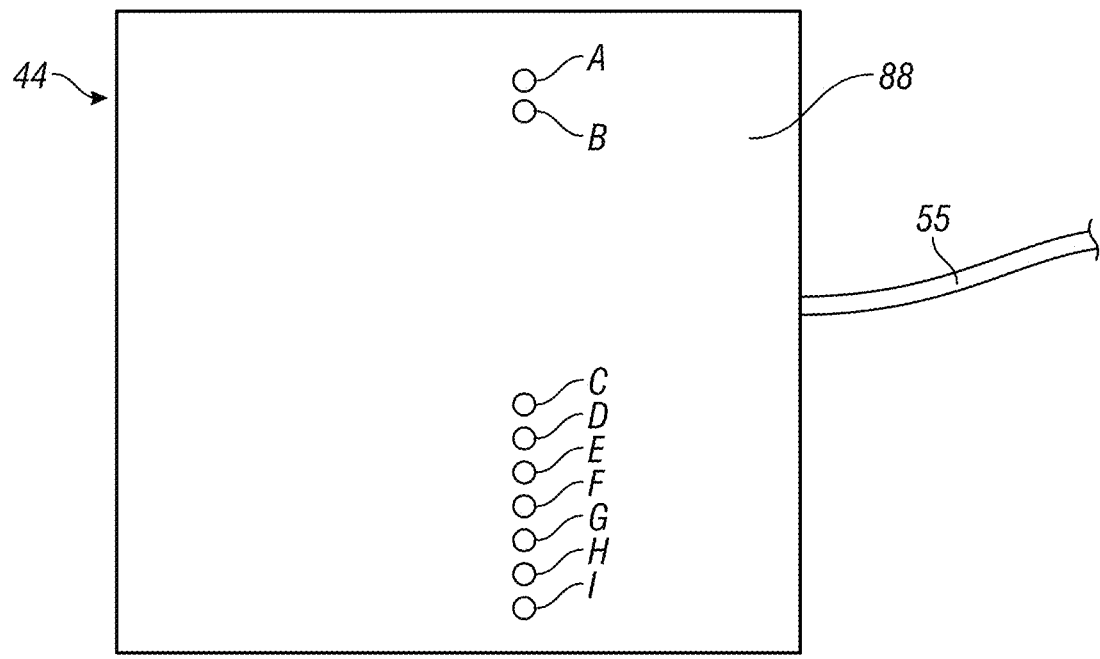
FIG. 7 is a schematic bottom view of the electronic chip shown on FIG. 5.

As seen in FIG. 7, the electronic chip 44 is provided on its bottom surface 88 with complementary contact pads or pins A to F to electrically connect with corresponding pads a to f on the cartridge 42 when the chip 44 and cartridge 42 are removably coupled together as in a snap-fit arrangement as by snap-fit connectors, not shown.

Figure 8:
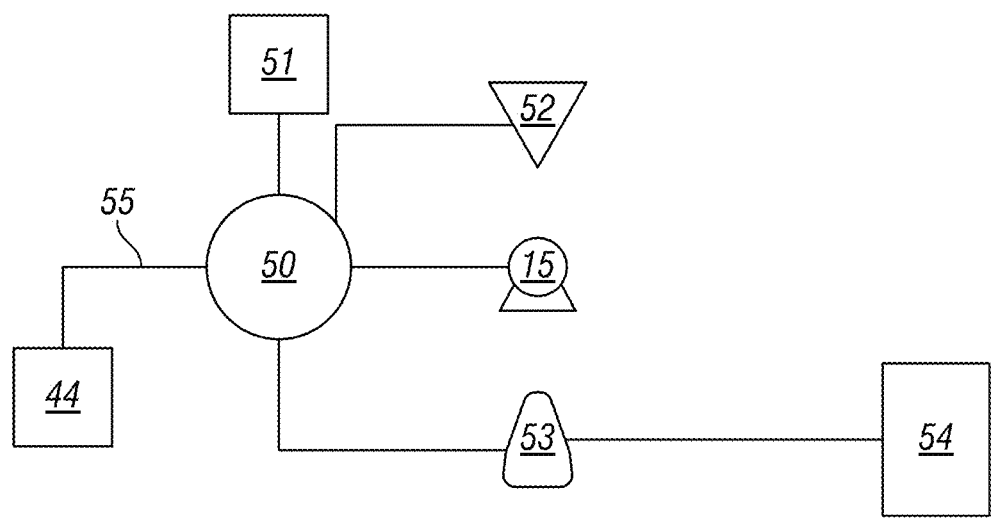
FIG. 8 is a schematic flow diagram showing electrically connected elements of the dispenser of FIG. 1.

Reference is made to FIG. 8 which a schematic flow diagram is showing electrically connected elements of the dispenser of FIG. 1. As shown, the dispenser 10 has a processor or a controller 50 connected to each of a power supply 51, sensors 52 including the hand sensor 24, the electric pump 15 and a communication unit 53. In a known manner as, for example, upon the sensor 24 sensing the presence of a user's hand 11, the controller 50 operates the pump 15 for a period of time to dispense an allotment of fluid from the reservoir 14 to the discharge outlet 17. The power supply 51 may be hardwired to an AC power source or may comprise batteries. The sensors 52 may sense various factors such as the level of fluid in the reservoir 14, the number of times the pump 15 is operated and the like. The communications unit 53 preferably provides two-way communication with a computer 54 which communication may be wired or wireless. The computer 54 is preferably a remote computer which is linked to or carries databases for data. In accordance with the first embodiment of the present invention, the electronic chip 44 is hardwired to the controller 50 of the dispenser 10 by wiring 55. While not necessary, preferably, a couplable and uncouplable connection is provided between the electronic chip 44 and the wiring 55 for easy electrical coupling and uncoupling of the chip 44 from the controller 50.

The microfluidic unit 40 comprising the microfluidic chip 42 and the electronic chip 44 provides the various analysis apparatus as desired towards analyzing the fluid and particles in the fluid as they pass through the microfluidic cartridge 42 and determining data about the particles and the focused fluid stream. Such data as obtained from the from the first electromagnetic imaging apparatus 80 and the electromagnetic field measurement apparatus 90 is via the electronic chip 44 provided to the controller 50 and, thus, to the computer 54 permitting image identification and electrical field identification methods to be carried out and the identity of the particles to be estimated in accordance with the method of the present invention.

With the electronic chip 44 electrically connected to the controller 50, the controller 50 can control the operation of the first electromagnetic imaging apparatus 80 and the electrical field measurement field apparatus 90, as well as the dispenser 10, as desired. Data from these apparatuses is provided to the controller 50 and the controller 50 can, as may be desired, at least partially process the data and, as may be desired based on pre-set protocols alone and/or on feedback based on the data, control the operation of the dispenser 10 and the microfluidic unit 40. The data provided to the controller 50 may, to some extent, be processed within the controller 50 and/or may be provided by the communication unit 53 to the computer 54 which may process the data and provide feedback to the controller 50 such as data regarding operation of the dispenser 10 and the microfluidic unit 40.

The preferred embodiment of the microfluidic cartridge 42, shown in FIGS. 5 to 7, is but a simplistic version and it is to be appreciated that a number of additional and different analysis apparatus may be provided on the microfluidic cartridge 42. As well, a microfluidic particle sorting channel may be provided that is more complex and, for example, provides one or more analysis channels with the analysis channels arranged, for example, for parallel and/or series analysis of the same or different focused fluid streams.

FIG. 6 illustrates but as a first electromagnetic imaging apparatus 80, an apparatus formed by a light emitter and a light sensor. However, additional electromagnetic imaging apparatus may be provided as, for example, by duplicating similar emitters and sensors at different locations along the analysis channel. Similarly, FIG. 6 shows but a single electrical field measurement apparatus whereas a number of different field electrical apparatuses could be provided along the one or more analysis channels.

The microfluidic channel may provide, if desired, a splitting step of splitting a single analysis channel into a pair of parallel analysis channels, each having a focused fluid stream as the same composition as the other.

In an alternate cartridge, the microfluidic particle sorting channels may provide a first sorting separation into different branches at an upstream portion to provide, for example, two or more downstream channels having particles in different ranges of size or shape and the sorting process may then be repeated with one or more of the initial downstream channels considered an upstream channel which is then sorted into a plurality of downstream channels containing particles further divided by range of size.

In the preferred embodiment illustrated, the microfluidic unit 40 has its electronic chip 44 hardwired to the controller 50 of the dispenser 10. This arrangement can advantageously provide for substantially all the processing to be provided in the controller 50 of the dispenser 10 and for power to be provided by the power source 51 of the dispenser 10. Such an arrangement is not necessary, for example, the electronics chip 44 may be provided to have one or more of its own: separate power source, processor or controller and/or communication units with, as one example, the electronic chip being independent and not hardwired to the dispenser 10 and, for example, communicating wirelessly either with a communication unit in the dispenser 10 or directly with the remote computer 54 or both.

Since data regarding the operation of the dispenser 10 is relevant data towards operation and control of the microfluidic unit 40, there preferably is provision for least some communication of data between the dispenser 10 and the microfluidic unit 40, albeit, this could be conducted through the remote computer 54. A communication unit on the chip 44 may preferably be provided merely to communicate with the dispenser 10 and this communication could be wirelessly.

Having at least some processing capability on the microfluidic unit 40 may well be preferred as contrasted with having all the processing capabilities in the dispenser 10 and/or the computer 54.

Each of the microfluidic unit 40, the dispenser 10 and/or the computer 54 may have a capability to store data.

The large databases and extensive processing expected to be required to carry out the identification methods preferably would have databases to store data on the computer 54 and the identification methods carried out on the computer 54, although this is not necessary.

In the first embodiment, the microfluidic cartridge 42 is provided as a separate unit incorporating the microfluidic particle sorting channel 60, the electrodes 91, 92, 93 and 94, the light emitter 81 and the light sensor 82 which is removably coupled, on one hand, to dispenser 10 via the outlet opening 36 of the catch tray 32 and, on the other hand, to the electronic chip 44. The electronic chip 44 is shown hardwired to the dispenser 10 and preferably forms a permanent part of the dispenser 10. The electronic chip 44 preferably contains front end electronics that are required for the analysis apparatus that is for the first electromagnetic imaging apparatus 80 and the electromagnetic field measurement apparatus 90.

Providing the microfluidic cartridge 42 to be a replaceable component is advantageous as this permits the microfluidic channels which may become contaminated with usage over time, to be easily replaced without a need to replace the electronic chip 44. As well, minimizing the extent to which any electronic components are permanently attached to the microfluidic cartridge 42 reduces the cost of the microfluidic cartridge 42 and replacement the microfluidic cartridges. Insofar as any electronic components as for the first electromagnetic imaging apparatus 80 and the electromagnetic field measurement apparatus 90 can be removably coupled to the microfluidic cartridge 42 for reuse is advantageous. In the first embodiment, the electronic components of the first electromagnetic imaging apparatus 80 and the electromagnetic field measurement apparatus 90 carried on the microfluidic cartridge 42 as contrasted with the electronic chip 44 have been minimized.

The microfluidic channels may preferably be subjected to cleaning so as to extend the time that the microfluidic cartridge 42 can be used without replacement. In the preferred embodiment, to clean the cartridge 42, the dispenser 10 may be operated without a person's hands being present in the dispenser 10 such that fluid will be dispensed into the catch tray 32 and, with time, will be passed through the microfluidic particle sorting channel 60. With the fluid being cleaning fluid such as an alcohol water solution, cleaning of the microfluidic channel can occur particularly during periods of time when the dispenser 10 is not expected to be used.

In accordance with the present invention, it is preferred that fluid flow through the microfluidic cartridge 42 be provided by passive flow generation systems. However, in the alternative or in combination with a passive flow generation systems, a pump not shown may be provided to generate flow, that is, to force fluid in the sump of the catch tray through the channels of the cartridge. Such pumps may be of any practical nature including electronically operated micro pumps as are known to persons skilled in the art, and may be provides as on the microfluidic cartridge 42 or as a separate element. Such a pump may be particularly useful to assist in increasing flow rates as during cleaning.

The invention has been described with reference to various descriptions and preferred embodiments, many modifications and variations will occur to persons skilled in the art. For a definition of the invention reference is made to the following claims.

We claim:

1. A method of identifying biologic particles in an input fluid comprising:
   a focusing step in which the input fluid is sorted into a focused fluid stream including to be analyzed particles from the input fluid in a desired range of particle sizes and/or a desired range of particle shapes,
   the focusing step including passing the input fluid through a microfluidic sorting channel configured to separate particles of the input fluid by size wherein a focused fluid stream with the to be analyzed particles is discharged into an analysis channel, and flowing through the analysis channel sequentially as individual separate particles separated from other particles in the focused fluid stream,
   an imaging analysis step of determining with a first electromagnetic imaging apparatus image characteristics of each separate particle of the particles in the focused fluid stream,
   an electrical field analysis step of determining with an electrical field measurement apparatus determined electrical field characteristics of each separate particle of the particles in the focused fluid stream,
   the first electromagnetic imaging apparatus comprising an emitter of emitted electromagnetic radiation and a sensor of electromagnetic radiation,
   an image analysis step of determining with the sensor the image characteristics of each separate particle of the particles in the focused fluid stream,
   using an image identification method comprising a review of the image characteristics to determine a primary estimated identity of each separate particle of the particles in the focused fluid stream as a primary probability profile of one or more known biologic particles,
   the method including directing the emitted electromagnetic radiation onto each separate particle of the particles and sensing with the sensor emitted electromagnetic radiation that is scattered, reflected, emitted and/or transmitted from, through or about each separate particle,
   the image characteristics are derived from one or more characterizations of electromagnetic imaging of each separate particle,
   estimating an estimated concentration of the particles in the focused fluid stream when the determined electrical field characteristics are determined,
   using an electrical field identification method to estimate a secondary estimated identity of each separate particle of the particles in the focused fluid stream as a secondary probability profile of one or more known biologic particles based on the determined electrical field characteristics and the estimated concentration, and
   using the primary estimated identity and the secondary estimated identity to estimate a final estimated identity of each separate particle of the particles in the focused fluid stream as a final probability profile of one or more known biologic particles.

2. The method as claimed in claim 1 wherein the electrical field identification method is impedance spectroscopy.

3. The method as claimed in claim 1 wherein the input fluid comprises an alcohol water solution selected to have a disinfecting effect and kill the biological particles on contact.

4. The method as claimed in claim 1 wherein the image characteristics represent data based on imaging of each separate particle with such data represented by various different measured characteristics selected from one or more of the characteristics of integrated density, area, perimeter, circularity, aspect ratio, solidity, and maximum diameter.

5. The method as claimed in claim 4 including creating image characteristics of the known biologic particles from images of the known biologic particles and recording the image characteristics of the known biologic particles in an image characteristics reference database and
   wherein the review comprising an image characteristics comparison step of comparing the one or more image characteristics of each separate particle of the particles with the image characteristics of the known biologic particles in the image characteristics reference database, and an image characteristics identification step of identifying each separate particle as being one or more of the known biologic particles based on the results of the image characteristics comparison step.

6. The method as claimed in claim 5 wherein identifying each separate particle as being the one or more of the known biologic particles based on the results of the image characteristics comparison step comprises selecting one or more of the known biologic particles based on a determination as to the image characteristics of the known biologic particles that are closest to the image characteristics of each separate particle.

7. The method as claimed in claim 6 wherein the electrical field identification method comprising:
   i. creating correlated field/concentration data for a particle comprising:
      (a) one or more of the determined electrical field characteristics of the particle, and
      (b) the estimated concentration of particles in the focused fluid stream when the one or more of the determined electrical field characteristics for that particle is determined.

8. The method as claimed in claim 7 creating a field/concentration reference database of the known biologic particles by creating correlated field/concentration data of the known biologic particles by use of the electrical field identification method for particles of the known biologic particles comprising:
   i. creating correlated field/concentration data for particles of the known biologic particles comprising:
      (a) one or more of the determined electrical field characteristics of the particles of the known biologic particles, and
      (b) the estimated concentration of particles of the known biologic particles in a focused fluid stream of the known particles when the one or more determined electrical field characteristics for each particle of the known biologic particles is determined;
   recording correlated field/concentration data of the known biologic particles in the field/concentration reference database as the correlated field/concentration data of the known biologic particles,
   creating correlated field/concentration data for each separate particle of the particles of:
      (a) one or more of the determined electrical field characteristics of each separate particle, and
      (b) the estimated concentration of the particles in the focused fluid stream when the one or more determined electrical field characteristics for that each separate particle is determined,
   a field/concentration comparison step of comparing for each particle the correlated field/concentration data of the electrical field measurements and the estimated concentration for each separate particle with correlated field/concentration data of electrical field measurements and concentration of the known biologic particles in the field/concentration reference database,
   a field/concentration identification step of identifying each separate particle as being one or more of the known biologic particles based on the results of the field/concentration comparison step.

9. The method as claimed in claim 8 wherein identifying each separate particle as being one or more of the known biologic particles based on the field/concentration comparison step comprises selecting one or more of the known biologic particles based on a determination as to the field/concentration data of the known biologic particles that is closest the field/concentration data of each separate particle.

10. The method as claimed in claim 9 wherein:
    the electrical field analysis step includes subjecting the focused fluid stream to impedance spectroscopy to determine for a particle of the particles in the focused fluid stream Base Impedance/Frequency Data regarding the relationship of impedance vs frequency of the focused fluid stream containing the particle,
    the estimating of the estimated concentration of the particles in the focused fluid stream on which the Base Impedance/Frequency Data are determined,
    the electrical field identification method includes:
        (i) performing a first mathematical analysis step to the Base Impedance/Frequency Data including a first derivation analysis to provide First Derivate Impedance/Frequency Data,
        (ii) subjecting the First Derivate Impedance/Frequency Data to a second mathematical analysis step including a second derivation analysis to provide Curvature Data, and
        (iii) correlating the estimated concentration and the Curvature Data to provide Curvature/Concentration Data for the particle as the correlated field/concentration data.

11. The method as claimed in claim 10 wherein the field/concentration comparison step including comparing the Curvature/Concentration Data for the particle in the focused fluid stream with Curvature/Concentration Data created for the known particles.

12. The method as claimed in claim 9 wherein the field/concentration reference database of the known particles includes the Curvature/Concentration Data created for the known particles,
    creating the Curvature/Concentration Data created for the known particles by subjecting the known particles to impedance spectroscopy to determine for a particle of the known particles in a focused fluid stream of the known particles Base Impedance/Frequency Data regarding the relationship of impedance vs frequency of the known particles,
    the estimating of the estimated concentration of the known particles in the focused fluid stream of the known particles on which the Base Impedance/Frequency Data are determined,
    performing the electrical field identification method including:
        (i) performing a first mathematical analysis step to the Base Impedance/Frequency Data of the known particles including a first derivation analysis to provide First Derivate Impedance/Frequency of the known particles Data,
        (ii) subjecting the First Derivate Impedance/Frequency Data of the known particles to a second mathematical analysis step including a second derivation analysis to provide Curvature Data the known particles, and
        (iii) correlating the estimated concentration of the known particles and the First Derivate Curvature of the known particles to provide Curvature/Concentration Data for the known particles as the correlated field/concentration data of fluid containing the known particles,
    recording the Curvature/Concentration Data for the known particles in the field/concentration reference database as the correlated field/concentration data of the known biologic particles,
    the field/concentration comparison step including comparing the Curvature/Concentration Data for the particle in the focused fluid stream with Curvature/Concentration Data for the known particles, the field/concentration identification step of identifying each separate particle as being one or more of the known biologic particles based on the results of comparing the Curvature/Concentration Data for the particle in the focused fluid streamwith the Curvature/Concentration Data for the known particles.

13. The method as claimed in claim 12 wherein identifying each separate particle as being one or more of the known biologic particles based on the results of comparing the Curvature/Concentration Data for the particle in the focused fluid stream with the Curvature/Concentration Data for the known particles comprises selecting one or more of the known particles based on a determination as to the Curvature/Concentration Data for the particle in the focused fluid stream that is closest the Curvature/Concentration Data for one or more of the known particles.

14. The method as claimed in claim 13 wherein the known biologic particles are selected from the group comprising bacteria and viruses, and the desired range of particle sizes and/or the desired range of particle shapes is selected having regard to the selected known biologic particles, wherein, when the particles are bacteria the range of particle sizes in the range of 0.5 um to 10 um, and when the particles are virus the range of particle sizes is in the range of 0.1 um to 1 um.

15. The method as claimed in claim 4 wherein the electrical field identification method is impedance spectroscopy.

16. The method as claimed in claim 4 wherein the first electromagnetic imaging apparatus comprises an optical microscope, the method including providing for electromagnetic detection based on optical or phase contrast microscopy.

17. The method as claimed in claim 4 wherein the input fluid comprises an alcohol water solution including isopropanol.

18. The method as claimed in claim 17 wherein the alcohol water solution consists of water and isopropanol with the isopropanol comprising at least 40% by volume.

19. The method as claimed in claim 4 wherein the emitter of electromagnetic radiation is a LED (light emitting diode) and the sensor of electromagnetic radiation is a wavelength sensitive diode or a CCD chip.

20. The method as claimed in claim 19 wherein the known biologic particles are selected from the group comprising bacteria and viruses, and the desired range of particle sizes and/or the desired range of particle shapes is selected having regard to the selected known biologic particles, wherein, when the particles are bacteria the range of particle sizes in the range of 0.5 um to 10 um, and when the particles are virus the range of particle sizes is in the range of 0.1 um to 1 um.

* * * * *